US007564584B2

(12) United States Patent
Takahashi et al.

(10) Patent No.: US 7,564,584 B2
(45) Date of Patent: Jul. 21, 2009

(54) IMAGE PROCESSING DEVICE, IMAGE PROCESSING SYSTEM, JOB PROCESSING METHOD, STORAGE MEDIUM, AND PROGRAM

(75) Inventors: Hiroyuki Takahashi, Yokohama (JP); Tomohisa Itagaki, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 11/226,883

(22) Filed: Sep. 14, 2005

(65) Prior Publication Data

US 2006/0055956 A1 Mar. 16, 2006

(30) Foreign Application Priority Data

Sep. 14, 2004 (JP) .............................. 2004-266880

(51) Int. Cl.
*G06K 15/00* (2006.01)
*G06F 15/00* (2006.01)
*G06F 3/12* (2006.01)
*G06K 1/00* (2006.01)
*H04N 1/40* (2006.01)

(52) U.S. Cl. ...................... 358/2.1; 358/1.13; 358/1.15; 358/1.9

(58) Field of Classification Search ................ 358/1.15, 358/1.16, 1.18, 1.12, 1.1, 1.13, 1.9, 401, 358/403, 2.1
See application file for complete search history.

(56) References Cited

U.S. PATENT DOCUMENTS

| | | | | |
|---|---|---|---|---|
| 5,940,186 A * | 8/1999 | Barry et al. ................. 358/296 |
| 6,227,531 B1 * | 5/2001 | Guerrero et al. .......... 270/58.31 |
| 6,267,517 B1 * | 7/2001 | Noda ........................... 400/76 |
| 6,348,971 B2 * | 2/2002 | Owa et al. ................. 358/1.15 |
| 6,421,135 B1 * | 7/2002 | Fresk et al. ................ 358/1.15 |
| 6,469,796 B1 * | 10/2002 | Leiman et al. ............ 358/1.15 |
| 6,509,074 B1 * | 1/2003 | Wyman ..................... 428/40.1 |
| 6,512,899 B2 * | 1/2003 | Shimada et al. ............... 399/82 |
| 6,606,163 B1 * | 8/2003 | Suzuki et al. .............. 358/1.15 |
| 6,633,395 B1 * | 10/2003 | Tuchitoi et al. ............ 358/1.14 |
| 6,785,727 B1 * | 8/2004 | Yamazaki ................... 709/229 |
| 6,876,825 B2 * | 4/2005 | Kurahashi et al. ............ 399/82 |
| 6,914,687 B1 * | 7/2005 | Hosoda et al. ............... 358/1.1 |
| 6,973,274 B2 * | 12/2005 | Kanamoto et al. ............ 399/20 |
| 6,985,245 B1 * | 1/2006 | Takahashi .................. 358/1.15 |
| 7,024,671 B2 * | 4/2006 | Yamashita .................. 718/102 |
| 7,031,003 B2 * | 4/2006 | Nagai et al. ................ 358/1.13 |

(Continued)

*Primary Examiner*—Twyler L Haskins
*Assistant Examiner*—Jonathan R Beckley
(74) *Attorney, Agent, or Firm*—Cowan, Liebowitz & Latman, P.C.

(57) ABSTRACT

It enables to construct a flexible device environment in consideration of POD, office and various use environments. To do so, a job processing method is applied to a system including an image processing device capable of executing printing of data of a job of a storage unit capable of storing data of plural jobs including at least one of first job of first processing condition, second job of first processing condition and third job of second processing condition. In the method, it causes the image processing device to finish the printing of the third job after both the printings of first and second jobs are executed, when the image processing device is operated in first sequence, and it causes the image processing device to start the printing of third job before at least the printing of second job is finished, when the image processing device is operated in second sequence.

38 Claims, 32 Drawing Sheets

U.S. PATENT DOCUMENTS

| | | | |
|---|---|---|---|
| 7,040,530 B2 * | 5/2006 | Watanabe et al. | 235/375 |
| 7,120,910 B2 * | 10/2006 | Matsuda et al. | 718/102 |
| 7,161,705 B2 * | 1/2007 | Klassen | 358/1.18 |
| 7,197,577 B2 * | 3/2007 | Nellitheertha | 710/6 |
| 7,254,355 B2 * | 8/2007 | Sahay | 399/82 |
| 7,265,855 B2 * | 9/2007 | Patton | 358/1.15 |
| 7,333,230 B2 * | 2/2008 | Sugishita et al. | 358/1.15 |
| 7,385,711 B2 * | 6/2008 | Watanabe | 358/1.12 |
| 7,385,729 B2 * | 6/2008 | Clark et al. | 358/1.9 |
| 7,386,246 B2 * | 6/2008 | Yabe | 399/82 |
| 7,405,843 B2 * | 7/2008 | Tanaka | 358/1.3 |
| 7,420,696 B2 * | 9/2008 | Nakagawa | 358/1.15 |
| 7,426,352 B2 * | 9/2008 | Moriyama et al. | 399/43 |
| 7,433,931 B2 * | 10/2008 | Richoux | 709/217 |
| 7,443,526 B2 * | 10/2008 | Takano et al. | 358/1.15 |
| 7,474,445 B2 * | 1/2009 | Suzuki et al. | 358/474 |
| 2004/0190057 A1 * | 9/2004 | Takahashi et al. | 358/1.15 |
| 2005/0012940 A1 * | 1/2005 | Matsuda | 358/1.1 |
| 2005/0024661 A1 * | 2/2005 | Akashi | 358/1.9 |
| 2005/0246631 A1 * | 11/2005 | Mori et al. | 715/515 |
| 2005/0264832 A1 * | 12/2005 | Baum et al. | 358/1.2 |
| 2006/0033958 A1 * | 2/2006 | d'Entrecasteaux | 358/1.16 |

\* cited by examiner

503

[DESCRIPTION OF R901]
Char_color = {0.0, 0.0, 0.0, 1.0}  ← L1111
string1 = "ABC" ;  ← L1112
put_char (0.0, 0.0, 0.2, 0.3, string1) ;  ← L1113

[DESCRIPTION OF R902]
line_color = {1.0, 0.0, 0.0, 0.0}  ← L1121
put_line = (0.9, 0.0, 0.9, 0.1) ;  ← L1122

[DESCRIPTION OF R903]
image1 = {CMYK, 8, 5, 5, C0, M0, Y0, K0,  ← L1131
                C1, M1, Y1, K1
                ⋮
                C24, M24, Y24, K24} ;
put_image (0.0, 0.5, 0.5, 0.5, image1) ;  ← L1132

LINEAR GAMMA TABLE G0

PRINTER OUTPUT CHARACTERISTIC Gp OF MFP 104a

GAMMA TABLE Ga FOR MFP 104a (HOWEVER, Ga · Gp = G0)

GAMMA TABLE Gb FOR MFP 104b

FIG. 14

| | | |
|---|---|---|
| JOB PRIORITY: | MEDIUM | ▼ |
| JOB MANAGEMENT: | SAVE JOB | ▼ |
| REPRINT MANAGEMENT: | DELETE PRINT READY FILE | ▼ |
| JOB SCHEDULING: | PRINT | ▼ |
| E-MAIL NOTIFICATION: | DISABLED | ▼ |
| E-MAIL ADDRESS: | | |
| ANNOTATION: | DISABLED | ▼ |
| ANNOTATION TEXT: | | |
| JOB SECURITY LEVEL: | HIGHT | ▼ |

JOB MANAGEMENT

FINISHING

| | | |
|---|---|---|
| STAPLING: | OFF | ▼ |
| HOLE PUNCH: | OFF | ▼ |
| BOOKLET: | OFF | ▼ |
| Z-FOLD: | OFF | ▼ |
| USE INSERTER: | OFF | ▼ |
| INSERT PAGE: | | |
| BANNER PAGE: | OFF | ▼ |
| SORTING: | COLLATE | ▼ |
| TRIMMER: | OFF | ▼ |
| TRIM OFFSET: | | |

IMAGE QUALITY

| | |
|---|---|
| SHARPNESS: | NORMAL |
| BRIGHTNESS: | NORMAL |
| COLOR MODE: | CMYK |
| TONER REDUCTION: | OFF |
| COPIER MODE: | CHARACTER |
| GLOSS ADJUSTMENT: | STANDARD |
| PURE BLACK TEXT/GRAPHICS: | OFF |
| GLOSS ADJUSTMENT: | OFF |
| FORCE BLACK OVERPRINT: | OFF |
| GRADATION SMOOTHING: | OFF |
| COMBINE SEPARATION: | OFF |
| BITS PER PIXEL: | 8 |

COLOR

| | |
|---|---|
| LINEARIZATION PROFILE: | MFP104.lud |
| ICC COLOR MATCHING: | ENABLED |
| RENDERING INTENT: | PERCEPTUAL |
| ICC PRINTER PROFILE: | MFP104.icc |
| ICC CMYK PROFILE: | SWOP.icc |
| ICC RGB PROFILE: | SRGB.icc |
| BLACK LIMIT (0-255): | 255 |
| CYAN LIMIT (0-255): | 255 |
| MAGENTA LIMIT (0-255): | 255 |
| YELLOW LIMIT (0-255): | 255 |
| TOTAL LIMIT (0-255): | 1020 |

} 1825

| FIG. 18A | FIG. 18B |

FIG. 19

| NO. | S | CONTROL | JOB NAME | PRIORITY | PAGES | COPIES | COMMENT |
|---|---|---|---|---|---|---|---|
| 1 | P | ⊗ ▦ △ | Job aaa | HIGHT | 200 | 1000 | |
| 2 | W | ⊗ ▦ △ | Job B1 | MID | 20 | 2000 | |
| 3 | W | ⊗ ▦ △ | Job C124 | MID | 150 | 500 | |
| 4 | W | ⊗ ▦ △ | Job DDD | MID | 400 | 300 | |
| 5 | W | ⊗ ▦ △ | Job E333 | MID | 30 | 2500 | |
| 6 | W | ⊗ ▦ △ | Job FFF | MID | 100 | 600 | |
| 7 | W | ⊗ ▦ △ | Job G21 | MID | 200 | 300 | |
| 8 | R | ⊗ ▦ △ | Job H23 | MID | 70 | 200 | |
| 9 | H | ⊗ ▦ △ | Job I82 | LOW | | 400 | |
| 10 | H | ⊗ ▦ △ | Job J77 | MID | | 1000 | |

<STATUS> P: PRINTING, W: WAIT FOR PRINT, R: RIPPING, H: HOLD

FIG. 29

| JOB # | | C | M | Y | K | AVERAGE | DEVIATION | |
|---|---|---|---|---|---|---|---|---|
| ON PRINTING 1 | P | 20 | 40 | 60 | 80 | 50 | 20 | |
| 2 | W | 90 | 70 | 50 | 70 | 70 | 10 | |
| 3 | W | 50 | 70 | 80 | 40 | 60 | 15 | |
| 4 | W | 60 | 30 | 20 | 10 | 30 | 15 | |
| 5 | W | 40 | 60 | 60 | 50 | 53 | 8 | |
| 6 | W | 20 | 50 | 60 | 90 | 55 | 20 | |
| 7 | W | 0 | 0 | 0 | 60 | 15 | 23 | |

⎫ 2801

| 1→2 | 110 | 110 | 110 | 150 | 120 | 15 | |
|---|---|---|---|---|---|---|---|
| 1→3 | 70 | 110 | 140 | 120 | 110 | 20 | |
| 1→4 | 80 | 70 | 80 | 90 | 80 | 5 | NEXT JOB CANDIDATE |
| 1→5 | 60 | 100 | 120 | 130 | 103 | 23 | |
| 1→6 | 40 | 90 | 120 | 170 | 105 | 40 | |
| 1→7 | 20 | 40 | 60 | 140 | 65 | 38 | |

⎫ 2802

| 1→4→2 | 170 | 140 | 130 | 160 | 150 | 15 | |
|---|---|---|---|---|---|---|---|
| 1→4→3 | 130 | 140 | 160 | 130 | 140 | 10 | |
| 1→4→5 | 120 | 130 | 140 | 140 | 133 | 8 | NEXT JOB CANDIDATE |
| 1→4→6 | 110 | 120 | 140 | 180 | 135 | 25 | |
| 1→4→7 | 80 | 70 | 80 | 150 | 95 | 28 | |

⎫ 2803

| 1→4→5→2 | 210 | 200 | 190 | 210 | 203 | 8 | NEXT JOB CANDIDATE |
|---|---|---|---|---|---|---|---|
| 1→4→5→3 | 170 | 200 | 220 | 180 | 193 | 18 | |
| 1→4→5→6 | 140 | 180 | 200 | 230 | 188 | 28 | |
| 1→4→5→7 | 120 | 130 | 140 | 200 | 148 | 26 | |

⎫ 2804

| 1→4→5→2→3 | 260 | 270 | 270 | 250 | 263 | 8 | NEXT JOB CANDIDATE |
|---|---|---|---|---|---|---|---|
| 1→4→5→2→6 | 230 | 250 | 250 | 300 | 258 | 21 | |
| 1→4→5→2→7 | 210 | 200 | 190 | 270 | 218 | 26 | |

⎫ 2805

| 1→4→5→2→3→6 | 280 | 320 | 330 | 340 | 318 | 19 | |
|---|---|---|---|---|---|---|---|
| 1→4→5→2→3→7 | 260 | 270 | 270 | 310 | 278 | 16 | NEXT JOB CANDIDATE |

⎫ 2806

| 1→4→5→2→3→7→6 | 280 | 320 | 330 | 400 | 333 | 34 | NEXT JOB CANDIDATE |
|---|---|---|---|---|---|---|---|

STORAGE MEDIUM SUCH AS FD, CD-ROM, OR THE LIKE

| DIRECTORY INFORMATION |
|---|
| 1ST DATA PROC PROGRAM<br>PROGRAM CODE GROUP CORRESPONDING TO STEPS OF FLOW CHART SHOWN IN FIG. 18 |
| 2ND DATA PROC PROGRAM<br>PROGRAM CODE GROUP CORRESPONDING TO STEPS OF FLOW CHART SHOWN IN FIG. 21 |
| 3RD DATA PROC PROGRAM<br>PROGRAM CODE GROUP CORRESPONDING TO STEPS OF FLOW CHART SHOWN IN FIG. 22 |
| 4TH DATA PROC PROGRAM<br>PROGRAM CODE GROUP CORRESPONDING TO STEPS OF FLOW CHART SHOWN IN FIG. 26 |
| 5TH DATA PROC PROGRAM<br>PROGRAM CODE GROUP CORRESPONDING TO STEPS OF FLOW CHART SHOWN IN FIG. 27 |
| 6TH DATA PROC PROGRAM<br>PROGRAM CODE GROUP CORRESPONDING TO STEPS OF FLOW CHART SHOWN IN FIG. 30 |
| 7TH DATA PROC PROGRAM<br>PROGRAM CODE GROUP CORRESPONDING TO STEPS OF FLOW CHART SHOWN IN FIG. 31 |
| 8TH DATA PROC PROGRAM<br>PROGRAM CODE GROUP CORRESPONDING TO STEPS OF FLOW CHART SHOWN IN FIG. 33 |
| 9TH DATA PROC PROGRAM<br>PROGRAM CODE GROUP CORRESPONDING TO STEPS OF FLOW CHART SHOWN IN FIG. 34 |

MEMORY MAP OF STORAGE MEDIUM

IMAGE PROCESSING DEVICE, IMAGE PROCESSING SYSTEM, JOB PROCESSING METHOD, STORAGE MEDIUM, AND PROGRAM

BACKGROUND OF THE INVENTION

1. Field of the Invention

The present invention relates to an image processing device which can execute a printing process for the data of a storage unit capable of storing the data of plural jobs, an image processing system to which the relevant image processing device is applicable, a job processing method which can be adopted by the relevant image processing device, a storage medium which can store a program to achieve the relevant method, and the program itself.

2. Related Background Art

In a conventionally proposed office environment that the image processing system including the image processing device of the above type is used, in a case where the printing and the copying are executed by the image processing device or a multifunctional peripheral (MFP) in response to the instruction from a computer, the jobs are stored in the order of input. Then, the job output processes are sequentially executed in the order of job storage.

However, such a constitution does not aim at only the mere simple job processing method. That is, it should be noted that the relevant constitution is based on the product specification which premises, for example, that the jobs are not so confused, and the job itself does not have so large page number and copy number. In other words, in the conventional output environment, the jobs and the orderers need not be specially so distinguished.

Besides, the market place, called POD (print on demand), which expertly deals with printing and copying has been considered recently. That is, in the environment for using the image processing device in the POD, it is supposed that a full-time operator handles the job requested by a customer. Under such circumstances, there is a possibility that it is required to change the priority order of the jobs in the job output operation according to the degree of urgent for job sent from the customer.

Here, in such use environments for the POD, it is supposed that the job is processed in the state (or status) that a large number of matters, e.g., a large number of pages, a large number of copies, or the like, have to be intensively processed. On the other hand, according to diversification of kinds of originals, there is a possibility that the respective POD sites are specialized and divided. In addition, there is a possibility of encountering the state that the same kind of originals are printed massively, or the same kind of originals are continuously input.

As above, it is supposed as the use environment of the device in the POD to massively process a large amount of various kinds of jobs. In such a condition, it is supposed that the printer engine may be biasedly or disproportionately used, and such biased use of the printer engine may cause destabilization of the image quality. For example, when the originals of the same type are massively printed, there is a possibility of occurring the latent image of the printer engine and the afterimage phenomenon in the various processes such as the developing, the transferring, the paper transportation, the fixing and the like. Here, it should be noted that the afterimage phenomenon is the phenomenon that, even after an external impetus was left, the records thereof still influence the later image and process. More specifically, the hysteresis phenomenon due to the drum memory or the like (see the paragraph [0001] of Japanese Patent Application Laid-Open No. H06-138784), the excess and deficiency of toner supply to the developing unit (see the paragraph [0002] of Japanese Patent Application Laid-Open No. 2002-139901), the nonuniformity of temperature adjustment of the fixing unit (see the paragraphs [0003] to [0004] of Japanese Patent Application Laid-Open No. H07-013450), and the like are supposed as the factors of the afterimage phenomenon.

Moreover, to cope with such a problem, the method of constantly activating in the image forming device the recovery program for stabilizing the image so as to always provide the certain image to the uses is supposed. Here, it should be noted that the recovery program is equivalent to the mechanism of activating various adjusting sequences prepared in the image forming device to achieve image stabilization and compensate image deterioration, and this mechanism is represented by, for example, color calibration. In any case, even if this method is adopted, there is a fear that the parts provided in the image forming device are used so hard more than necessary. Besides, for example, if the unevenness of the temperature of the fixing unit occurs in the main scan direction (i.e., far-and-near direction), there is a fear that the material (rubber or the like) of the fixing roller generally becomes short-lived. As just described, if the image forming device is biasedly or disproportionately used, there is a possibility of occurring some kind or another problem.

Moreover, in the above case, the consumable supplies such as toner and the like are biasedly or disproportionately used, there is a fear that the time necessary for exchange and maintenance of the consumable supplies lowers the whole performance.

SUMMARY OF THE INVENTION

An object of the present invention is to provide an image processing device which can solve the above conventional problems, an image processing system to which the relevant image processing device is applicable, a job processing method which can be adopted by the relevant image processing device, a storage medium which can store a program to achieve the relevant method, and the program itself.

Another object of the present invention is to provide an image processing device which can construct a flexible device environment in consideration of various use environments such as a POD environment, an office environment and the like, an image processing system to which the relevant image processing device is applicable, a job processing method which can be adopted by the relevant image processing device, a storage medium which can store a program to achieve the relevant method, and the program itself.

Still another object of the present invention is to provide an image processing device which can deal with a problem which occurs in the state (or status) that the print jobs having the similar attributes are massively processed, an image processing system to which the relevant image processing device is applicable, a job processing method which can be adopted by the relevant image processing device, a storage medium which can store a program to achieve the relevant method, and the program itself.

Still another object of the present invention is to provide an image processing device which can adjust the job schedules so as to prevent deterioration of image quality and increase durability of each unit by smoothing the use conditions of the respective units of executing a print job, an image processing system to which the relevant image processing device is applicable, a job processing method which can be adopted by the relevant image processing device, a storage medium which can store a program to achieve the relevant method, and the program itself.

Still another object of the present invention is to provide an image processing device which can efficiently execute a high-reliability image process capable of acquiring a stable and high-quality print result in an image processing environment of massively processing a large amount of print jobs, an image processing system to which the relevant image processing device is applicable, a job processing method which can be adopted by the relevant image processing device, a storage medium which can store a program to achieve the relevant method, and the program itself.

Other objects and features of the present invention will be apparent from the following description taken in conjunction with the accompanying drawings, in which like reference characters designate the same or similar parts throughout the figures thereof.

BRIEF DESCRIPTION OF THE DRAWINGS

FIG. 14 is a plan view for explaining the configuration of the Web submission screen capable of being displayed on the display device of the client computer shown in FIG. 1;

FIG. 15 is a plan view for explaining the configuration of the Web submission screen capable of being displayed on the display device of the client computer shown in FIG. 1;

FIG. 16 is a plan view for explaining the configuration of the Web submission screen capable of being displayed on the display device of the client computer shown in FIG. 1;

FIG. 17 is a plan view for explaining the configuration of the Web submission screen capable of being displayed on the display device of the client computer shown in FIG. 1;

FIG. 19 is a diagram showing the job status screen (GUI) to be displayed on the LCD portion shown in FIG. 8;

FIG. 29 is a diagram for explaining an example of the job order determination process to be executed with respect to the prediction values of toner consumption in the respective jobs shown in FIG. 28;

FIG. 35 is a diagram for explaining the memory map of the storage medium which stores various data processing programs capable of being read by the image processing device according to the present invention.

DETAILED DESCRIPTION OF THE PREFERRED EMBODIMENTS

Hereinafter, the preferred embodiments of the present invention will be explained with reference to the attached drawings.

Explanation of System Construction

First Embodiment

Figure 1:
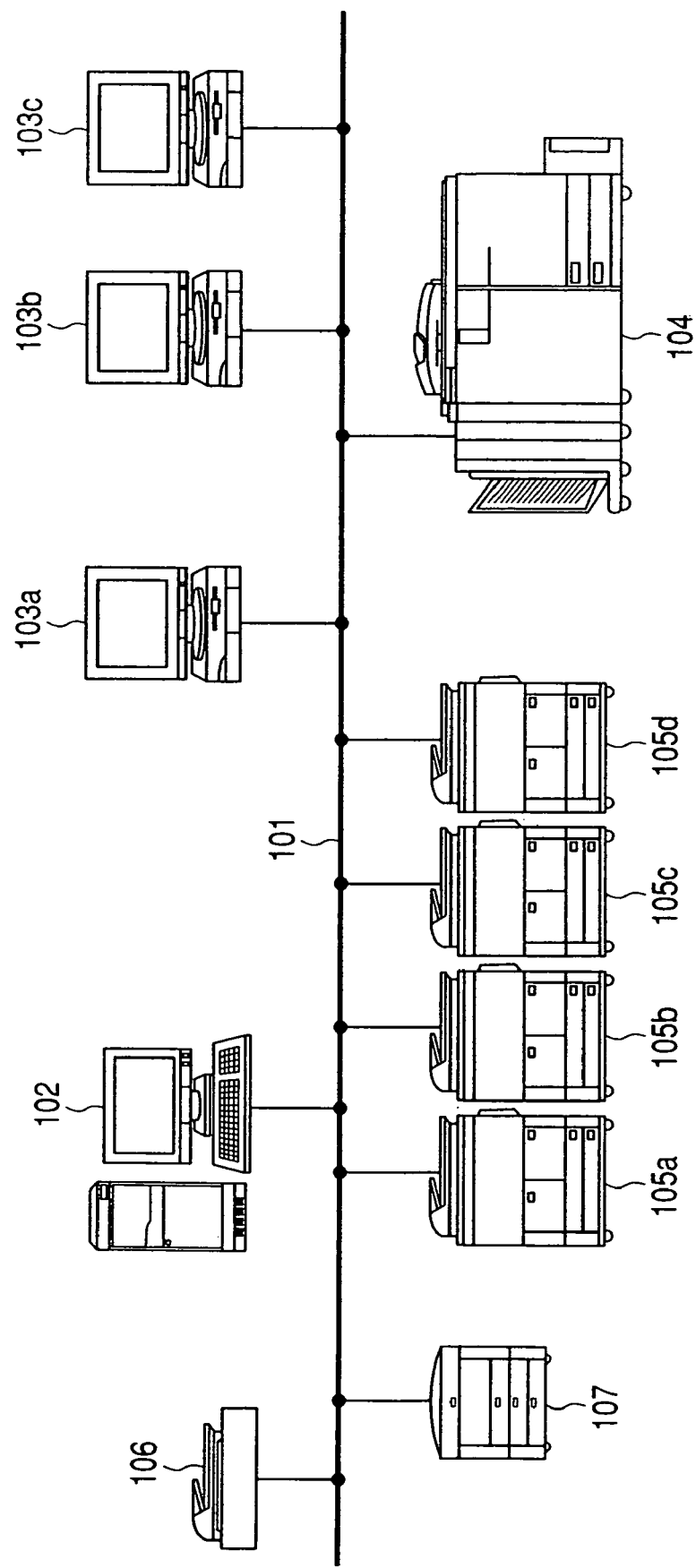
FIG. 1 is a diagram for explaining the constitution of an image processing system to which an image processing device according to the first embodiment of the present invention is applicable.

FIG. 1 is a conceptual diagram for explaining the constitution of an image processing system to which the image processing device according to the first embodiment of the present invention is applicable.

In FIG. 1, a server computer 102 which manages the jobs and the like and client computers 103a, 103b and 103c are connected to a network 101. Here, it should be noted that many other not shown client computers are connected to the network 101, and a client computer 103 is used in the following explanation on behalf of the respective client computers 103a, 103b, 103c and the like.

In addition, MFP's 104, 105a, 105b, 105c and 105d, a printer 107, a scanner 106 and the like are connected to the network 101. Here, it should be noted that an MFP 105 is used in the following explanation on behalf of the respective MFP's 105a, 105b, 105c and 105d.

Here, the MFP 104 is the four-drum image forming device capable of executing scanning or printing in full color, and the MFP 105 is the one-drum image forming device capable of executing scanning or printing in full color.

On the client computer 103, the application software for executing so-called DTP (desktop publishing) is operated, whereby various documents and figures are created and edited. Then, the created documents and figures are transformed into PDL (page description language) data by the client computer 103, and the acquired data is transmitted to the MFP's 104 and 105 through the network 101 and then printed.

Each of the MFP's 104 and 105 comprises the communication means capable of exchanging the information with the server computer 102 through the network 101, whereby the information and the statuses of the MFP's 104 and 105 are sequentially transmitted to the server computer 102 or the client computer 103 through the network 101. Moreover, the server computer 102 (or the client computer 103) has the utility software which operates by receiving the transmitted information. Thus, the MFP's 104 and 105 are managed and controlled by the server computer 102 (or the client computer 103).

Construction of Each of MFP's 104 and 105

Subsequently, the construction of each of the MFP's 104 and 105 will be explained with reference to FIG. 2. However, it should be noted that the MFP 104 will be explained first, and then, only the points in the MFP 105 different from those in the MFP 104 will be explained. In addition, the general monochrome device will be explained as needed.

Figure 2:
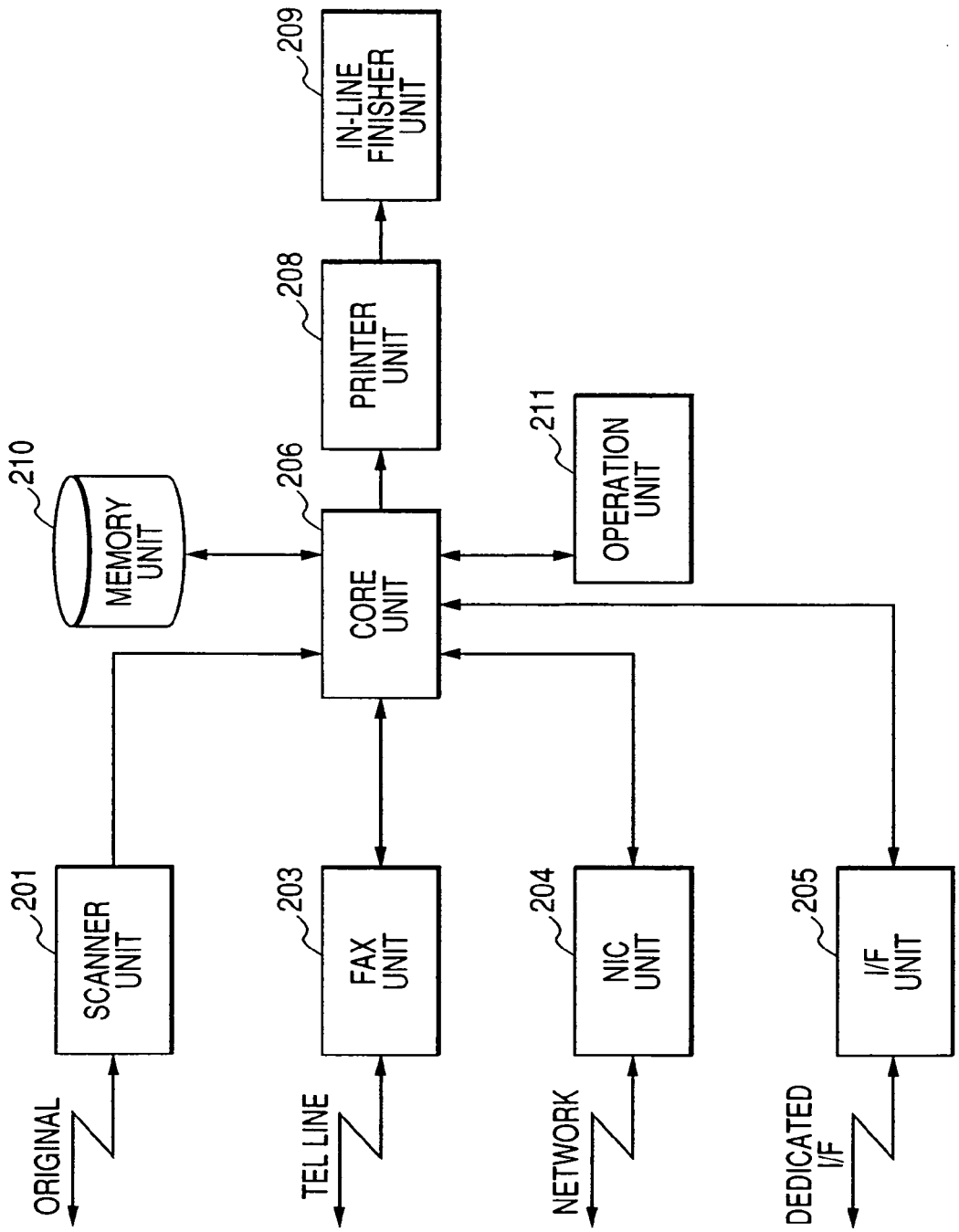
FIG. 2 is a block diagram showing the whole flow of the data in the MFP shown in FIG. 1.

FIG. 2 is the block diagram showing the whole flow of the data in each of the MFP's 104 and 105 shown in FIG. 1.

In FIG. 2, each of the MFP's 104 and 105 comprises a scanner unit 201 for reading the image and executing the image process to the read image data, a facsimile unit 203 such as a facsimile machine or the like for transmitting and receiving the image through a telephone network, an NIC (network Interface card) unit 204 for exchanging the image data and the device information by using the network, and a dedicated I/F (interface) unit 205 for exchanging the information with other devices and media.

In each of the MFP's 104 and 105, the data acquired from the scanner unit 201, the facsimile unit 203, the NIC unit 204 and the I/F unit 205 are once transferred to a core unit 206, and the image data output from the core unit 206 is transferred to a printer unit 208 to be subjected to the image formation process (i.e., the printing process). Then, the recording medium subjected to the printing process is transferred to a finisher unit 209, whereby the sorting process and the finishing process are executed to the transferred recording media.

Here, it should be noted that the core unit 206 controls the traffic on the bus, and the path is switched based on the following functions (A) to (I), according to how to use the MFP. Moreover, it is known that the compression data such as JPEG (Joint Photographic Experts Group) data, JBIG (Joint Bi-level Image experts Group) data, ZIP data or the like is used generally in case of transferring the data through the network. In such a case, after the data is input to the MFP, the input compression data is decompressed (or extracted) by the core unit 206.

In any case, the function (A) indicating the copy function is activated by the path of the scanner unit 201→the core unit 206→the printer unit 208, the function (B) indicating the network scanner function is activated by the path of the scanner unit 201 the core unit 206→the NIC unit 204, and the function (C) indicating the network printer function is activated by the path of the NIC unit 204→the core unit 206→the printer unit 208.

Moreover, the function (D) indicating the facsimile transmission function is activated by the path of the scanner unit 201→the core unit 206→the facsimile unit 203, the function (E) indicating the facsimile function is activated by the path of the facsimile unit 203→the core unit 206→the printer unit 208, and the function (F) indicating the box reception function 1 is activated by the path of the NIC unit 204→the core unit 206→a memory unit 210.

In addition, the function (G) indicating the box reception function 2 is activated by the path of the scanner unit 201→the core unit 206→the memory unit 210, the function (H) indicating the box transmission function 1 is activated by the path of the memory unit 210→the core unit 206→the NIC unit 204, and the function (I) indicating the box transmission function 2 is activated by the path of the memory unit 210→the core unit 206→the printer unit 208.

Here, it should be noted that the box reception implies the data input and storage by using the memory unit 210, and the box transmission implies the output of the stored data. More specifically, the box reception/box transmission function is the function for dividing the memory with respect to each job and/or each user, primarily storing the data in the divided memories, and then transmitting/receiving the data by appropriately combining the user ID's and the passwords. Incidentally, numeral 211 denotes a later described operation unit.

Construction of Core Unit 206

Figure 3:
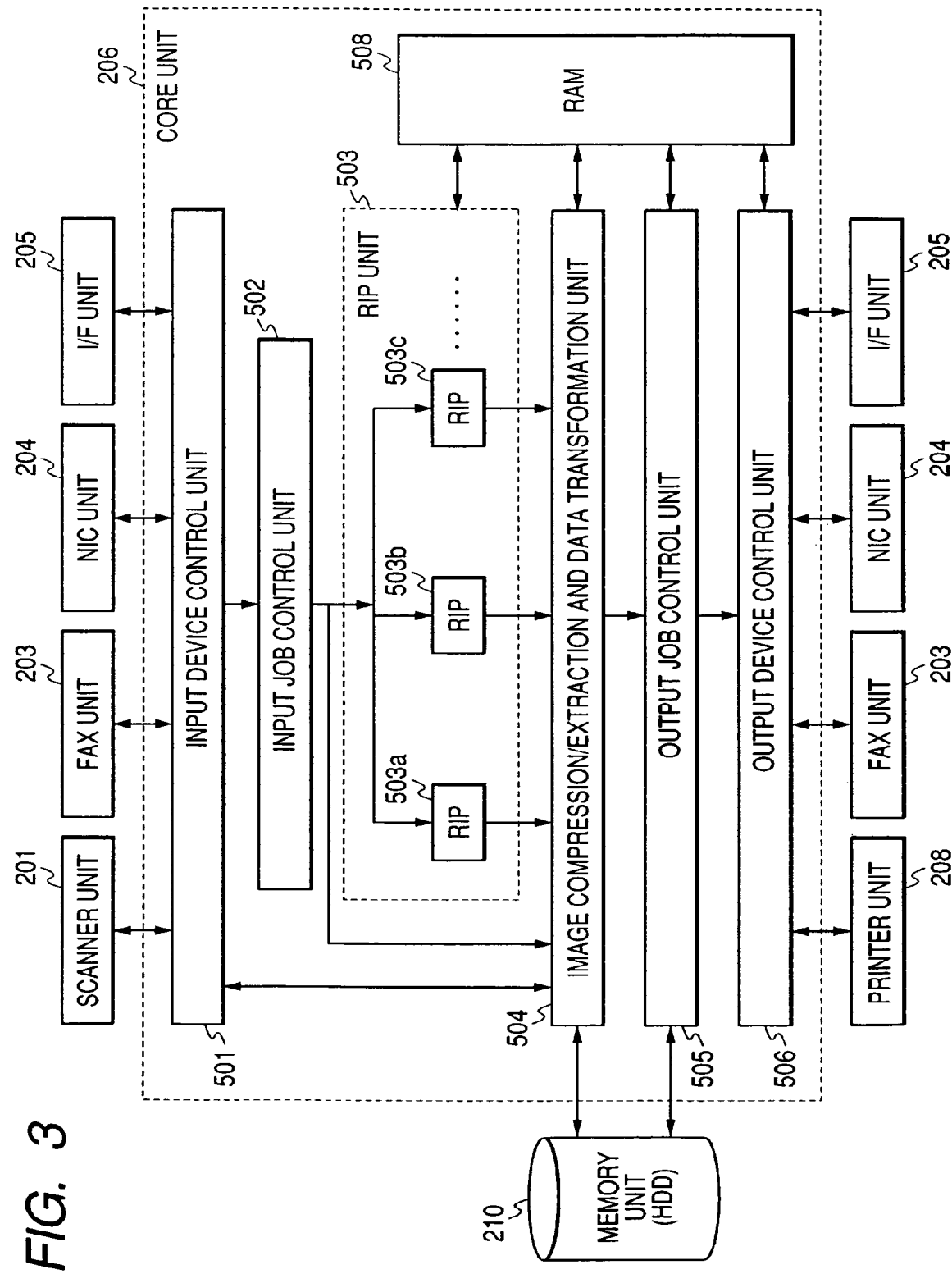
FIG. 3 is a block diagram for explaining the job processing state (or status) by the core unit shown in FIG. 2.

FIG. 3 is a block diagram for explaining the job processing state by the core unit shown in FIG. 2.

In FIG. 3, as explained with respect to FIG. 2, the data are input from the scanner unit 201, the facsimile unit 203, the NIC unit 204 and the I/F unit 205 to an input device control unit 501 provided in the core unit 206.

The input device control unit 501 grasps the conditions and the information of the respective devices by mutually communicating with these devices. Here, an input job control unit 502 has the three functions, that is, the input job routing (function) for determining the route of the job, the input job split (function) for controlling whether or not to divide the input data for the process of the RIP unit, and the input job scheduling (function) for determining the processing order and the priority order of the job.

In general, the data input from the NIC unit 204 consists of the PDL data and the JCL (job control language) data, and these data are extracted by an RIP unit 503. Although the RIP unit 503 includes plural RIP's 503a, 503b, 503c and the like in FIG. 3, the number of RIP's can be increased according to need. In any case, it should be noted that the RIP unit 503 is used in the following explanation on behalf of the respective RIP's 503a, 503b, 503c and the like. The RIP unit 503 executes the rasterizing of the PDL data of various jobs to create the bitmap images of appropriate sizes and resolutions. Here, it should be noted that, the RIP unit 503 can execute the rasterizing processes of various formats such as the PostScript™ format, the PCL format, the TIFF (Tag Image File Format), the JPEG format, the PDF (Portable Document Format), and the like.

Numeral 504 denotes an image compression/extraction and data transformation unit which compresses the bitmap image data generated by the RIP unit 503, extracts (or decompresses) the compressed and input data, and executes the format transformation. Moreover, the image compression/ extraction and data transformation unit 504 transforms the image data into the optimum image data suitable for the respective input devices, the output devices and the memories.

Numeral 505 denotes an output job control unit which has the three functions, that is, the output job routing (function) for determining the output route of the job, the output job split (function) for controlling whether or not to divide the image data to be output, and the output job scheduling (function) for determining the processing order and the priority order of the output job.

An output device control unit 506 always grasps the conditions and the states of the respective devices by mutually communicating with the MFP's 104 and 105, so as to be able to execute the suitable printing.

Incidentally, each of a RAM 508 and the memory unit 210 acts as the storage device to be used for the temporary data storage, the image data extraction, the image data compression, the data transformation, and the like. More specifically, each of the RAM 508 and the memory unit 210 temporarily stores or holds for a long period the bitmap image data, the objects, the page data, the jobs, their attribute information, and the like.

RIP Unit 503

Figure 4:
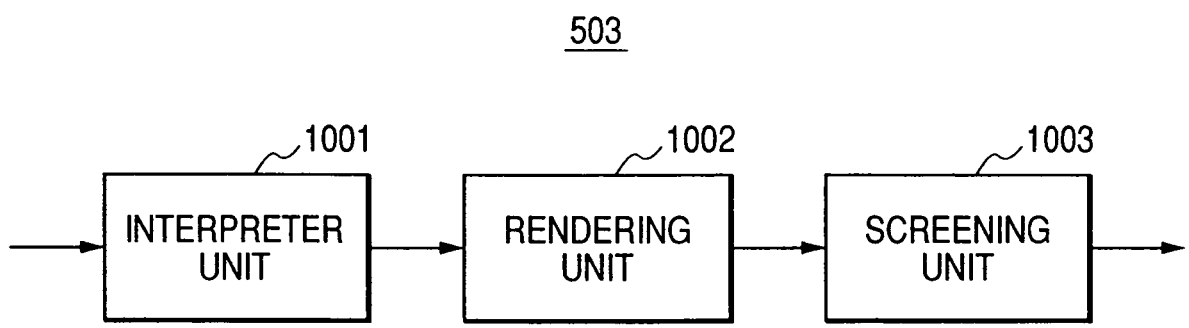
FIG. 4 is a block diagram for explaining the constitution of the RIP (raster image processor) unit shown in FIG. 3.

FIG. 4 is a block diagram for explaining the constitution of the RIP unit 503 shown in FIG. 3.

In FIG. 4, generally, the RIP unit 503 consists of an interpreter unit 1001 which analyzes the PDL data, a rendering unit 1002 which executes the color matching based on the drawing information transferred from the interpreter unit 1001, and a screening unit 1003 which executes the gamma correction process.

The interpreter unit 1001 interprets the PDL data, and generates the linear information called a display list based on the interpreted PDL data. Then, the rendering unit 1002 executes the color depiction to the display list, and then executes the bitmap extraction of the display list. Subsequently, in case of outputting the data to the MFP 104 or 105 shown in FIG. 1, the screening unit 1003 executes the binarization process and creates the screen of predetermined period and angle. Moreover, in case of outputting the data to the MFP 104 or 105, the consideration is executed including even the gamma table to be used for calibration.

In any case, the interpreter unit 1001 will be explained hereinafter.

That is, the interpreter unit 1001 is the portion which interprets the PDL data. The PDL such as the Postscript™ language by Adobe Systems is classified into the following three elements, that is, the image description by the character code, the image description by the graphic code, and the image description by the raster image data.

In other words, the PDL is the language which describes the image composed by combining these elements, and the data which is described by the PDL is called the PDL data.

Figures 5A, 5B:
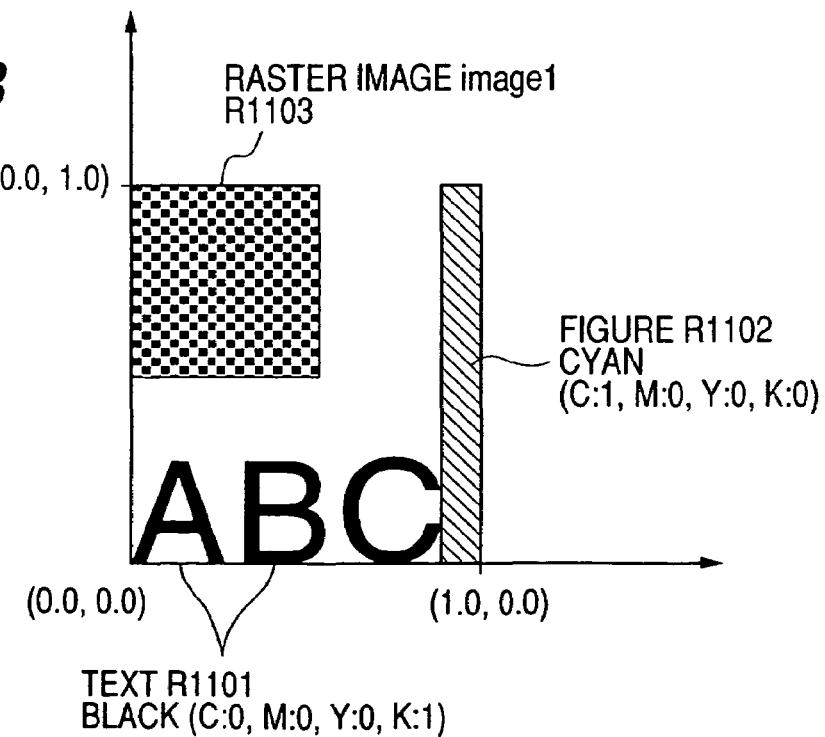
FIGS. 5A and 5B are diagrams for explaining the correspondence between the description of drawing information analyzed by the interpreter unit shown in FIG. 4 and a drawing example thereof.

FIGS. 5A and 5B are diagrams for explaining the correspondence between the description of drawing information analyzed by the interpreter unit 1001 shown in FIG. 4 and a drawing example thereof. More specifically, FIG. 5A corresponds to the description example of the PDL data, and FIG. 5B corresponds to the drawing example of the PDL data shown in FIG. 5A.

In the example shown in FIGS. 5A and 5B, the character information R1101 is represented by the codes L1111 to L1113, that is, the character information consists of the character color, the character string and the coordinates. Further, with respect to the character color, the cyan density, the magenta density, the yellow density and the black density are represented in sequence within the brackets corresponding to the code L1111. Here, it should be noted that the minimum density is represented by 0.0, and the maximum density is represented by 1.0. In conclusion, the code L1111 designates the example that it is designated to make the character black.

Next, in the code L1112, the character string "ABC" is substituted for the variable "string". Then, in the code L1113, the first and second parameters respectively represent the x and y coordinates of the location on the paper from which the layout of the character string starts, the third parameter represents the size of the character, the fourth parameter represents the character interval, and the fifth parameter represents the character string to be laid out. In brief, the code L1113 totally indicates that the character string "ABC" of the size 0.2 and the interval 0.3 is laid out from the coordinates (0.0, 0.0).

Next, with respect to the graphic information R1102, as well as the code L1111, the code L1121 designates the color (cyan in this case) of the line. The code L1122 designates to draw the line. More specifically, in the code L1122, the first and second parameters respectively represent the x and y coordinates from which the line is drawn, the third and fourth parameters respectively represent the x and y coordinates to which the line is drawn, and the fifth parameter represents the thickness of the line.

Moreover, with respect to the description of the raster image information, the raster image is substituted for the variable "image1" in the code L1131. More specifically, in the code L1131, the first parameter represents the image type and the number of color components of the image, the second parameter represents the number of bits for each color component, the third and fourth parameters represent the image sizes in the x and y coordinates respectively, and the fifth parameter and the following represent the raster image data. Here, it should be noted that the number of raster images is determined by the product of the number of color components constituting one pixel and the image sizes in the x and y directions. In the code L1131, since a CMYK image is composed of the four color components (cyan, magenta, yellow and black components), the number of raster image data is 100 (=4×5×5). Then, in the code L1132, it is designated that the variable "image1" of the size 0.5×0.5 is laid out from the coordinates (0.0, 0.5).

FIG. 5B shows the image which is obtained by interpreting, in one page, the three image descriptions shown in FIG. 5A and extracting the interpreted data to the raster image data. In FIG. 5B, symbols R1101, R1102 and R1103 respectively denote the data extracted from the PDL data.

In practice, the raster image data is extracted in the RAM 508 (or the memory unit 210) with respect to each of the C, M, Y and K color components. For example, with respect to the portion of the data R1101, C=0, M=0, Y=0 and K=255 are respectively written in the C, M, Y and K memories. Moreover, with respect to the portion of the data R1102, C=255, M=0, Y=0 and K=0 are respectively written in the C, M, Y and K memories.

Subsequently, the rendering unit 1002 shown in FIG. 4 will be explained.

Figure 6:
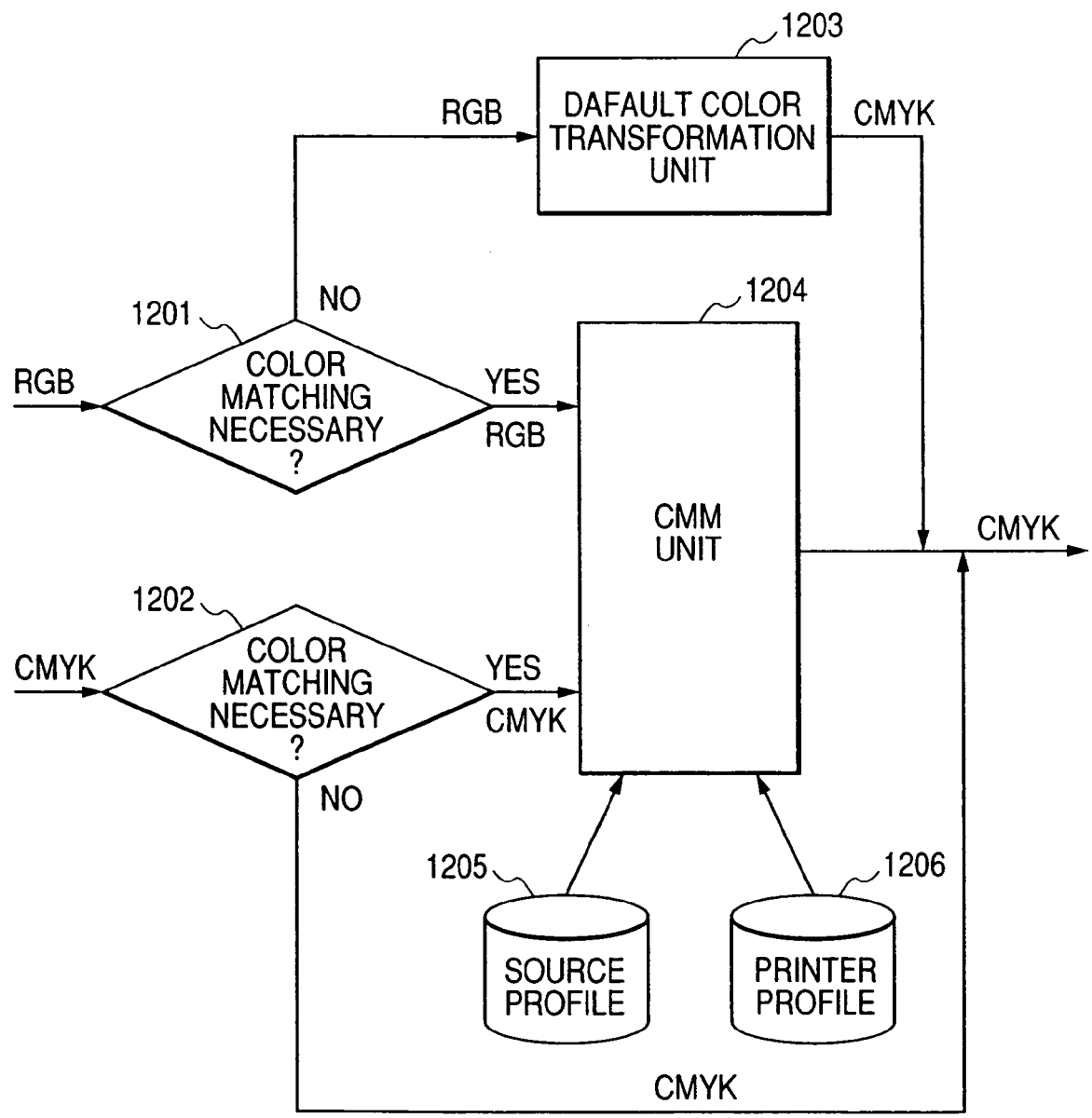
FIG. 6 is a diagram for explaining an example of the color matching process by the rendering unit shown in FIG. 4.

FIG. 6 is a diagram for explaining an example of the color matching process to be executed by the rendering unit 1002 shown in FIG. 4.

In FIG. 6, there is a possibility that the image data to be output from the interpreter unit 1001 corresponds to various color spaces including a gray scale, an RGB color space, a CMYK color space and the like. Thus, these color spaces are discriminated (or judged) by judgment units 1201 and 1202. Then, if the relevant color space corresponds to another color space, the relevant data is once transformed into the data in the CMYK color space based on a CRD (color rendering dictionary) by a default color transformation unit 1203, and then the acquired data is subjected to the color matching.

In the color matching, the input RGB or CMYK data is subjected to the color adjustment based on the ICC (International Color Consortium) profile by a CMM (color management module) unit 1204.

The ICC profile consists of a source profile 1205 and a printer profile 1206. Here, the source profile 1205 is used to once transform the RGB (or CMYK) data into the data in the standardized L*a*b* space, and the acquired L*a*b* data is again transformed into the data in the CMYK color space suitable for the target printer.

Further, the source profile consists of the RGB profile and the CMYK profile. Here, if the input image is the RGB image (that is, application software by Microsoft, a JPEG image, a TIFF image, etc.), the RGB profile is selected. Meanwhile, if the input image is the CMYK image (that is, the partial data of Photoshop™ and Illustrator™ by Adobe Systems, etc.), the CMYK profile is selected.

Here, it should be noted that the printer profile has been created in conformity with the color characteristic of each printer. That is, if the input image is the RGB image, it is preferable to select "perceptual" (giving priority to color) or "saturation" (giving priority to brightness). Meanwhile, if the input image is the CMYK image, "calorimetric" (minimum color difference) is frequently selected to output the optimum image.

Incidentally, the ICC profile has been created generally in the form of lookup table. Thus, in the source profile, if the RGB (or CMYK) data is input, the input data is uniquely transformed into the L*a*b* data, and, in the printer profile, the L*a*b* data is transformed into the CMYK data suitable for the printer.

FIGS. 7A, 7B, 7C and 7D are diagrams for explaining the gamma correction process to be executed by the screening unit 1003 shown in FIG. 4.

Figure 7A:
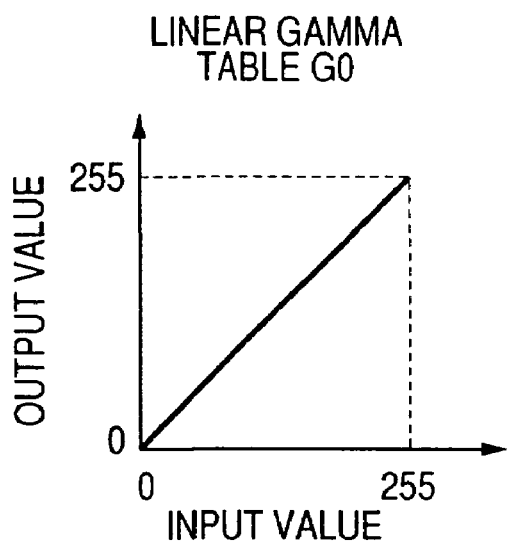
FIGS. 7A, 7B, 7C and 7D are diagrams for explaining the gamma correction process by the screening unit shown in FIG. 4.
Figure 7B:
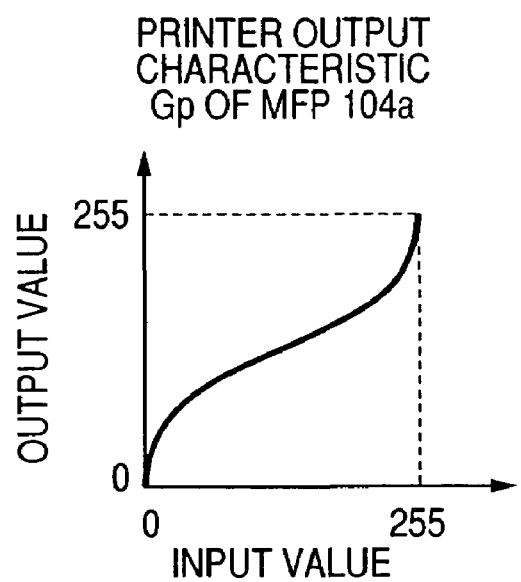
Figure 7C:
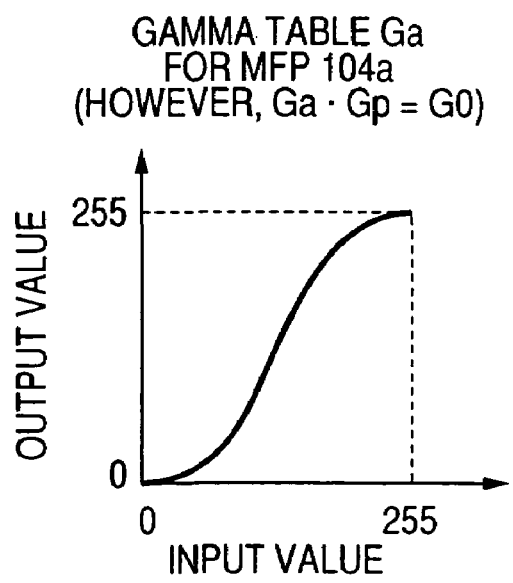
Figure 7D:
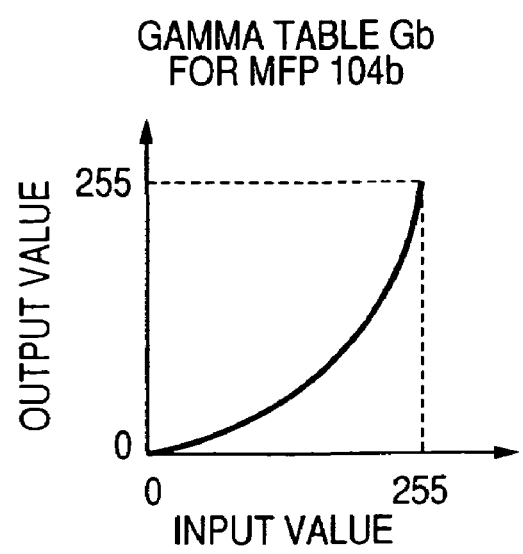

Here, the liner gamma curve as shown in FIG. 7A is prepared as the default on the gamma table, whereby it is necessary to prepare the gamma table according to the printer characteristic. For example, if the output characteristic Gp of the MFP 104 has the value as shown in FIG. 7B, the output characteristic Ga as shown in FIG. 7C which is the inverse function of the characteristic Gp is multiplied, whereby the output characteristic can be corrected to be the linear value as shown in FIG. 7A. Moreover, if the characteristic such as the output characteristic Gb (FIG. 7D) suitable for the printing is selected, for example, the table of the value Ga×Gb may be multiplied.

Moreover, to create the above gamma tables, the calibration function is generally known in which the scanner unit, the densitometer and the like of the MFP 104 are used.

Operation Screen of MFP

Figure 8:
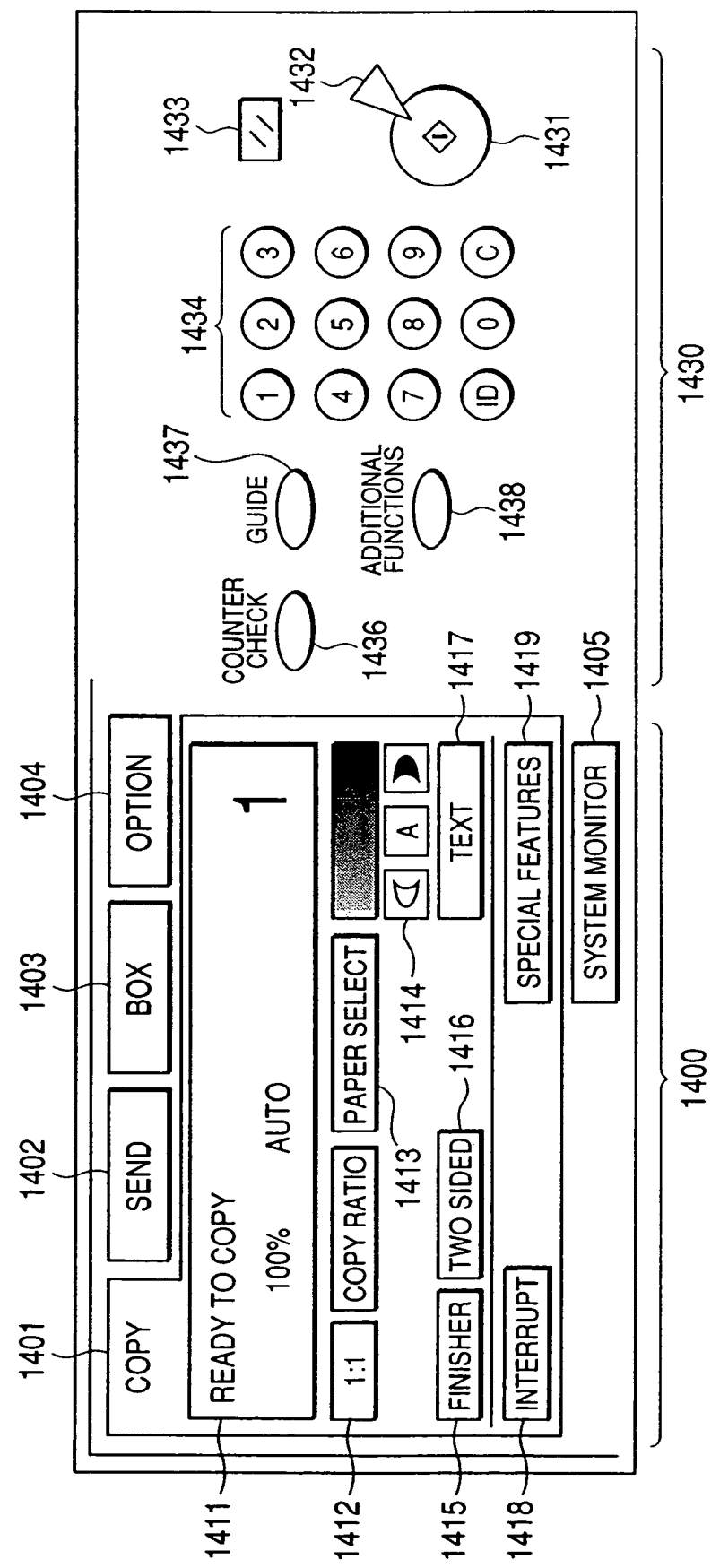
FIG. 8 is a diagram showing an example of the operation unit of the MFP shown in FIG. 1.

FIG. 8 is a diagram showing an example of the operation unit of each of the MFP's 104 and 105 shown in FIG. 1.

In FIG. 8, numeral 1400 denotes an LCD portion of touch panel type. Besides, on the LCD portion 1400, the key operations (handling) can be executed according to the indications sequentially displayed on the screen thereof.

It should be noted that the LCD portion 1400 has the tab construction. More specifically, the LCD portion 1400 includes a copy tab 1401 by which the copy operation is controlled, a send tab (or a transmission tab) 1402 by which the transmission (sending) operation of the scanned data is executed, a box tab 1403 by which the data input to the MFP is primarily stored, an option tab (or an expansion tab) 1404 by which the expansion mode of the MFP is set, and a system monitor key 1405 by which the state of the MFP is displayed.

Numeral 1411 denotes a setting display portion which displays the setting state, numeral 1412 denotes a magnification setting portion, numeral 1413 denotes a paper size setting portion, numeral 1414 denotes a density setting portion, numeral 1415 denotes a post-process setting portion, numeral 1416 denotes a two-sided process setting portion, numeral 1417 denotes an image mode setting portion, numeral 1418 denotes an interruption setting portion, and numeral 1419 denotes a specific function (or special feature) setting portion. Moreover, other function setting portions are also displayed on the LCD portion due to the layer construction, whereby it is possible to execute the detailed setting according to need.

On the other hand, numeral 1430 denotes a key input portion. In the key input portion 1430, numeral 1431 denotes a start key, numeral 1432 denotes a stop key, numeral 1433 denotes a reset key, and numeral 1434 denote numeric keys for executing various settings. Here, the numeric keys 1434 include a clear key. Numeral 1436 denotes a counter check key for storing the number of output copies, numeral 1437 denotes a help (or guide) key for guidance and help, and numeral 1438 denotes a user mode key for executing the system setting with respect to each user.

Job State Screen

Figure 9:
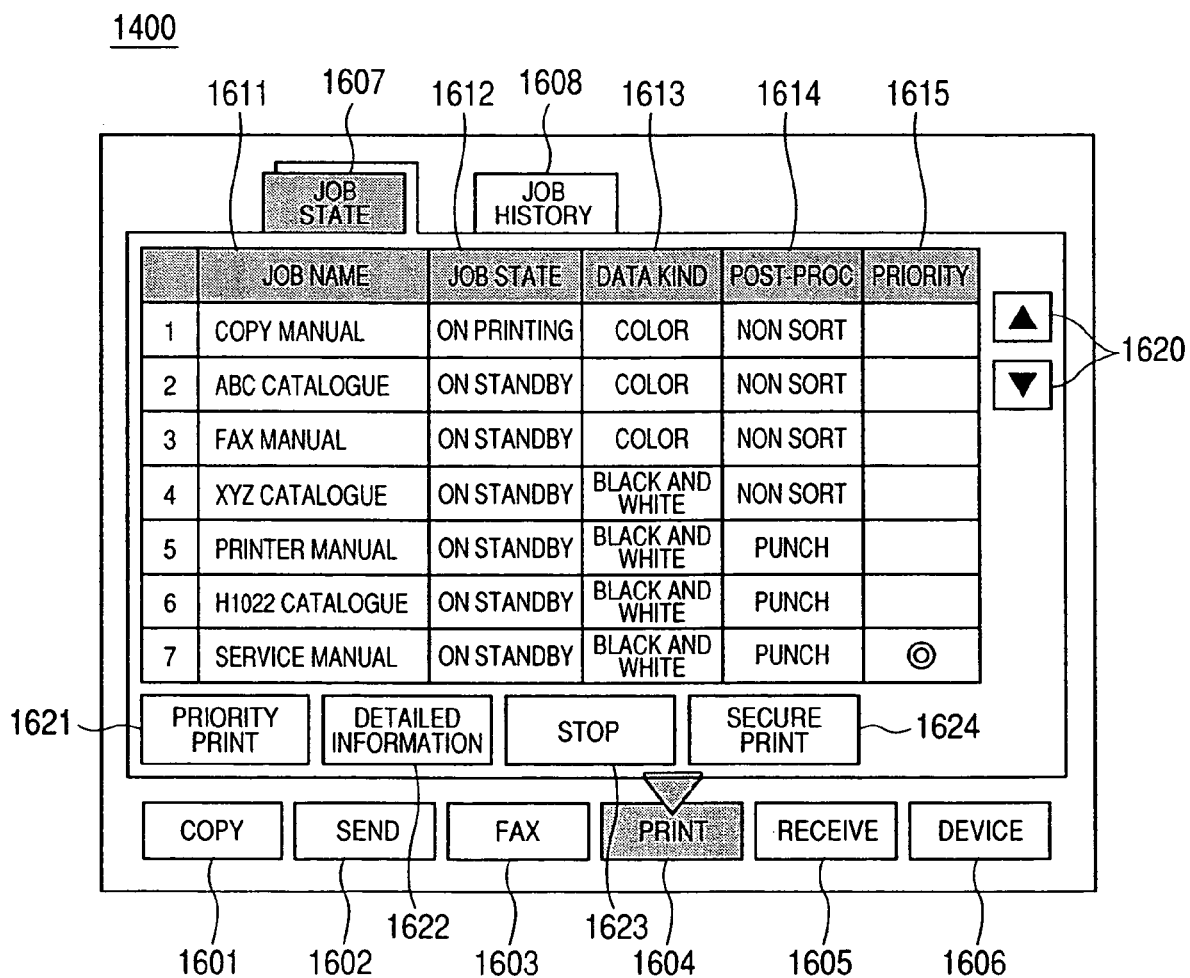
FIG. 9 is a diagram for explaining an example of the system state display screen to be displayed on the LCD portion shown in FIG. 8.

FIG. 9 is a diagram for explaining an example of the system state display screen to be displayed on the LCD portion 1400 shown in FIG. 8. On the system state display screen shown in FIG. 9, when a not shown display control module is executed by the core unit 206 and the respective tabs are depressed by an operator, it is possible to enter into the copy mode, the transmission (send) mode, the box mode, the expansion mode and the system monitor mode. Thus, it is possible to execute the screen display, the setting and the operation.

Incidentally, in case of confirming the state of the job input to the MFP 104 or 105, the display screen shown in FIG. 9 is displayed by depressing the system monitor key 1405.

In FIG. 9, if the system monitor key 1405 shown in FIG. 8 is depressed by the operator, the device enters into the system monitor mode whereby it is possible to see the states of the jobs in the MFP.

In FIG. 9, numeral 1601 is a key which is depressed to monitor the state of the copy job, numeral 1602 is a key which is depressed to monitor the state of the transmission (send) job, numeral 1603 is a key which is depressed to monitor the state of the facsimile job, numeral 1604 is a print key which is depressed to monitor the state of the print job, and numeral 1605 is a key which is depressed to monitor the state of the reception box job. Numeral 1606 denotes a device key which is depressed to know the state of the device itself. Incidentally, the screen shown in FIG. 9 corresponds to the state that the print key 1604 is depressed. On the current screen, the jobs which have been stored in the memory unit 210 or the RAM 508 and will be printed later are displayed in due order from above. More specifically, the names of the jobs are displayed in a column 1611, and the states of the jobs are displayed in a column 1612. In addition, as the parameters, the data kinds are displayed in a column 1613, the kinds of post-processes are displayed in a column 1614, and the priorities are displayed in a column 1615. Besides, numeral 1612 denotes up and down keys which are depressed to shift the displayed jobs upward and downward. In addition, numeral 1607 denotes a tab of the job state, and numeral 1608 denotes a tab of the job history.

In addition, if the row of the arbitrary job is selected and a priority print key 1621 is depressed, the priority order of the relevant job can be changed. Further, if the row of the arbitrary job is selected and a detailed information key 1622 is depressed, the detailed information of the relevant job can be displayed. Moreover, the relevant job can be cancelled if a stop key 1623 is depressed, and the secure print can be executed if a secure print key 1624 is depressed.

Printer Driver

Figure 10:
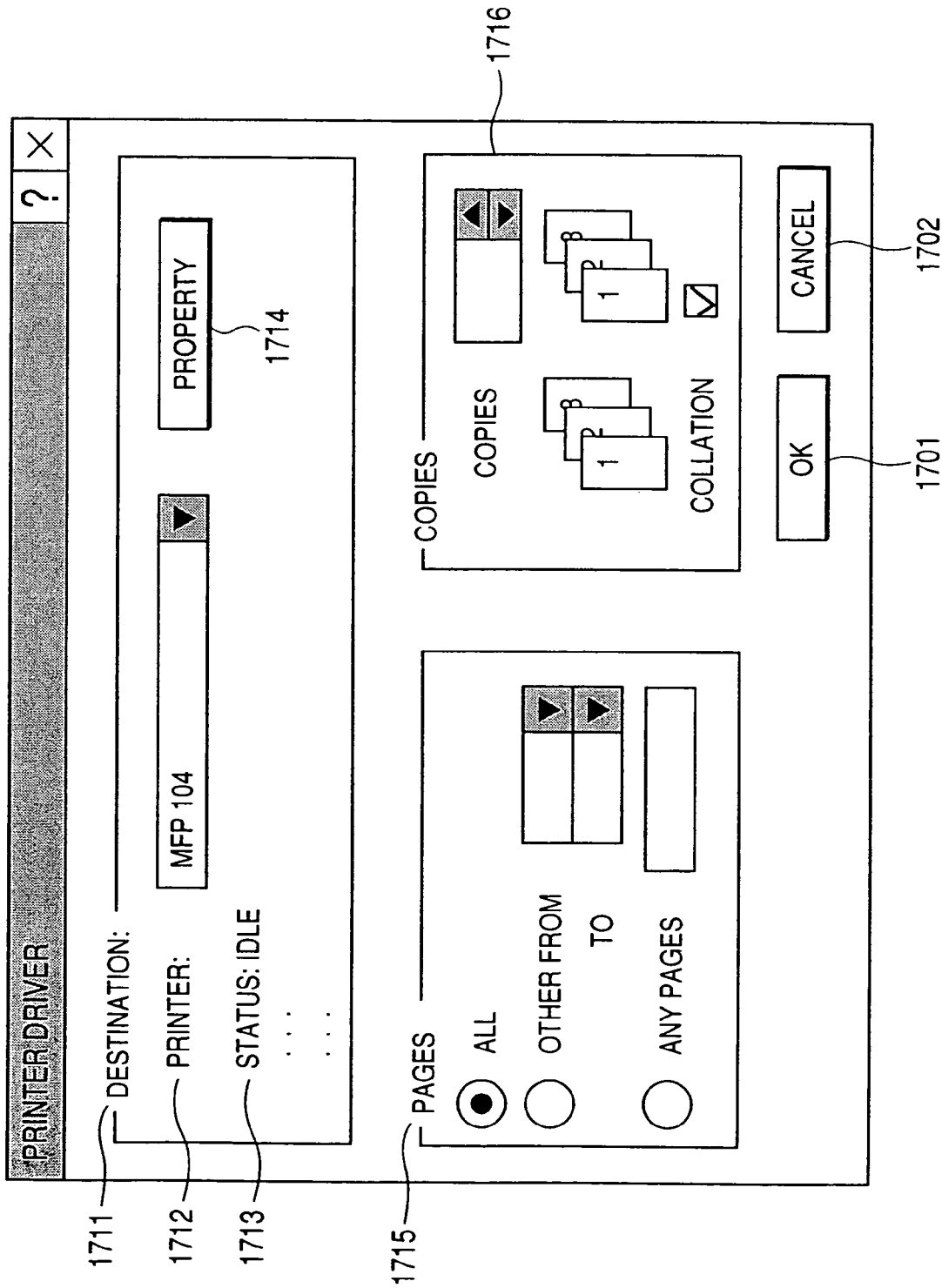
FIG. 10 is a typical diagram showing an example of the screen set by the printer driver on the client computer shown in FIG. 1.
Figure 11:
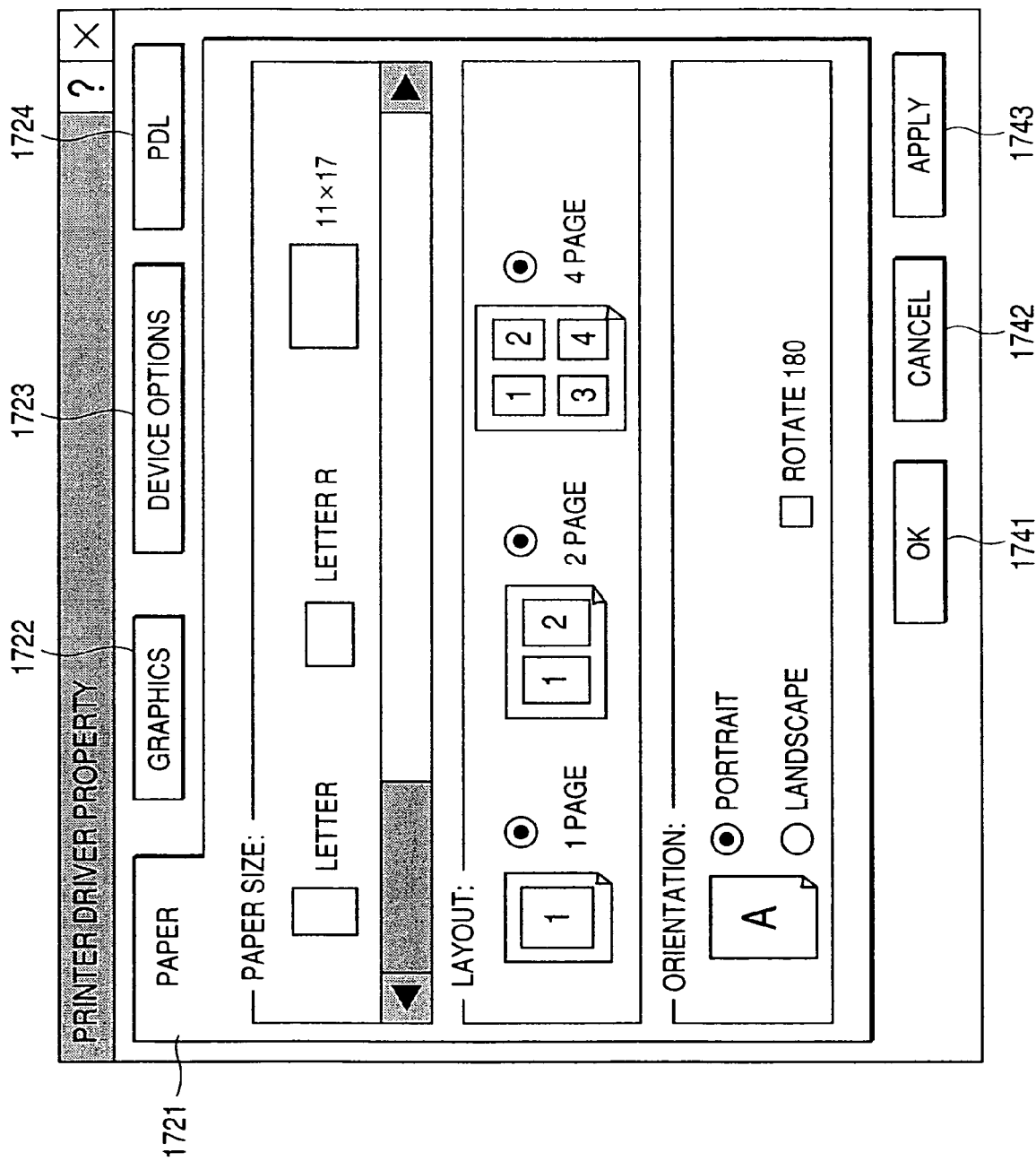
FIG. 11 is a diagram showing an example of the screen (GUI: graphical user interface) to be displayed when the property key shown in FIG. 10 is clicked.
Figure 12:
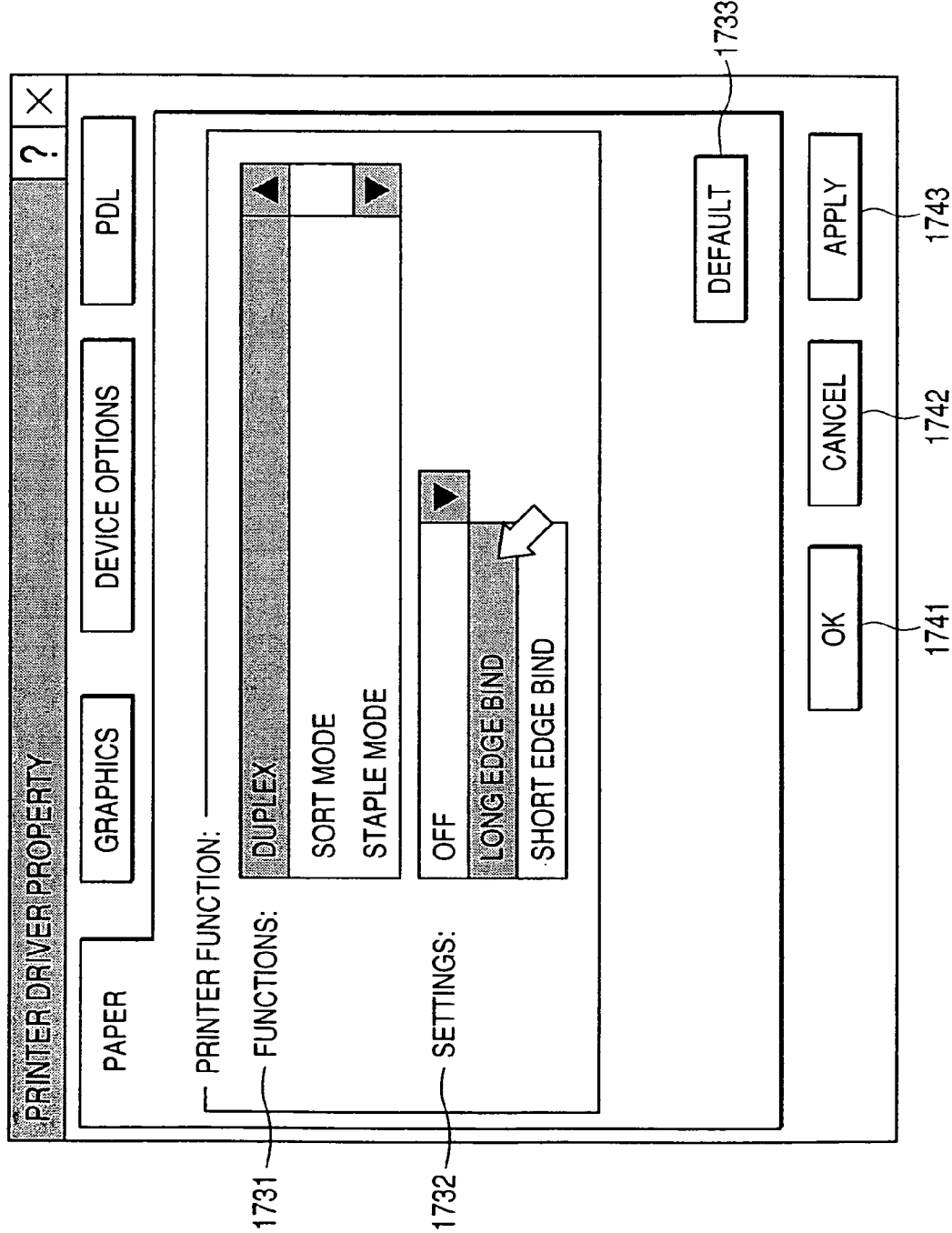
FIG. 12 is a diagram showing an example of the screen (GUI) to be displayed when the property key shown in FIG. 10 is clicked.

FIGS. 10 to 12 are typical diagrams showing an example of the screen set by the printer driver on the client computer 103 shown in FIG. 1.

Here, if the printer driver is indicated through the GUI for indicating the print operation, the user can designate the desired setting parameter and transmit the desired image to the transmission destination such as the printer or the like. Incidentally, it should be noted that the relevant GUI is displayed by indicating the display of the property concerning "printer" on the GUI for the print setting displayed when the printing is indicated from the application or the like.

Moreover, the printer driver can set the number of copies, the color designation, the paper post-process, the paper size and the like with respect to the arbitrary job.

FIG. 10 shows the window of the printer driver which includes a target output destination 1711, a selection column 1712 of the transmission destination (printer) to be selected, and a status (state) display 1713 showing the state of the relevant printer. In the present embodiment, the MFP's 104 and 105 and the like are the targets to be selected.

Numeral 1715 denotes a page setting column by which the output page is selected from the job. More specifically, it is determined in the page setting column 1715 which page of the image created by the application software operating on the client computer 103 should be output. Numeral 1716 denotes a copy number setting column by which the number of copies is designated. That is, if the cursor is shifted to the copy number setting column 1716 and the shown arrow of the scroll bar is clicked or the number of copies is manually set, the number of copies can be increased or decreased. Numeral 1714 denotes a property key by which the detailed setting concerning the device (printer) at the transmission destination selected through the selection column 1712 is executed.

In any case, if the property key 1714 is depressed, the screens shown in FIGS. 11 and 12 and the like can be displayed.

Then, after finishing the desired setting, it is possible to start the printing by depressing an OK key 1701. Here, if a cancel key 1702 is depressed, the printing can be cancelled.

Each of FIGS. 11 and 12 shows the example of the screen (GUI) displayed when the property key 1714 shown in FIG. 10 is clicked.

In the screens shown in FIGS. 11 and 12, for example, a paper tab 1721, a graphics tab 1722, a device option tab 1723, a PDL tab 1724 and the like are provided. Thus, if these tabs are appropriately designated by using a not shown pointing device or the like, the respectively different settings can be executed.

For example; FIG. 11 shows the example of the paper tab 1721, by which the paper size, the various layouts, and the orientations of paper can be set. Besides, if the device option tab 1723 is selected, the setting information inherent in the relevant device can be adjusted. For example, it is possible to finely adjust the setting of the finishing such as stapling or the like, the image process of changing the parameter such as color or the like by the printer, and the like.

As shown in FIG. 12, the desired values are set to a function 1731 and its setting value 1732 to execute the selection. Incidentally, numeral 1733 denotes a default key for returning the setting value to the default value.

Incidentally, although it is not specifically shown in the drawings, it is likewise possible by the graphics tab 1722 to select the resolution and the halftone setting, and it is also possible by the PDL tab 1724 to select the output format or the like of the PDL.

Numeral 1741 denotes an OK key which is depressed (or indicated) to validate the property setting and then return the screen to that shown in FIG. 10, and numeral 1742 denotes a cancel key which is depressed (or indicated) to invalidate the property setting and then return the screen to that shown in FIG. 10. Moreover, numeral 1743 denotes an apply key which is depressed (or indicated) to validate the property setting as maintaining the property screen.

Ordinarily, the printer driver can input the setting value inherent in the device shown by the device option tab 1723, whereby, with respect to the setting value inherent in the device, it is necessary to prepare a PPD (PostScript Printer Description) file or the like and thus set the printer driver. In the PPD file, for example, the setting items for controlling the relevant printer and the initial values of the setting items are described, or the suitability of the combination of the settings is described. In any case, since the PPD file is provided to each printer as the inherent file, it is necessary in the computer of the operator oneself to previously prepare the PPD file and the print driver as linking them.

Web Submission

FIGS. 13, 14, 15, 16 and 17 are plan views for explaining the configuration of the Web submission screen capable of being displayed on the display device of the client computer 103 shown in FIG. 1.

Figures 18, 18A:
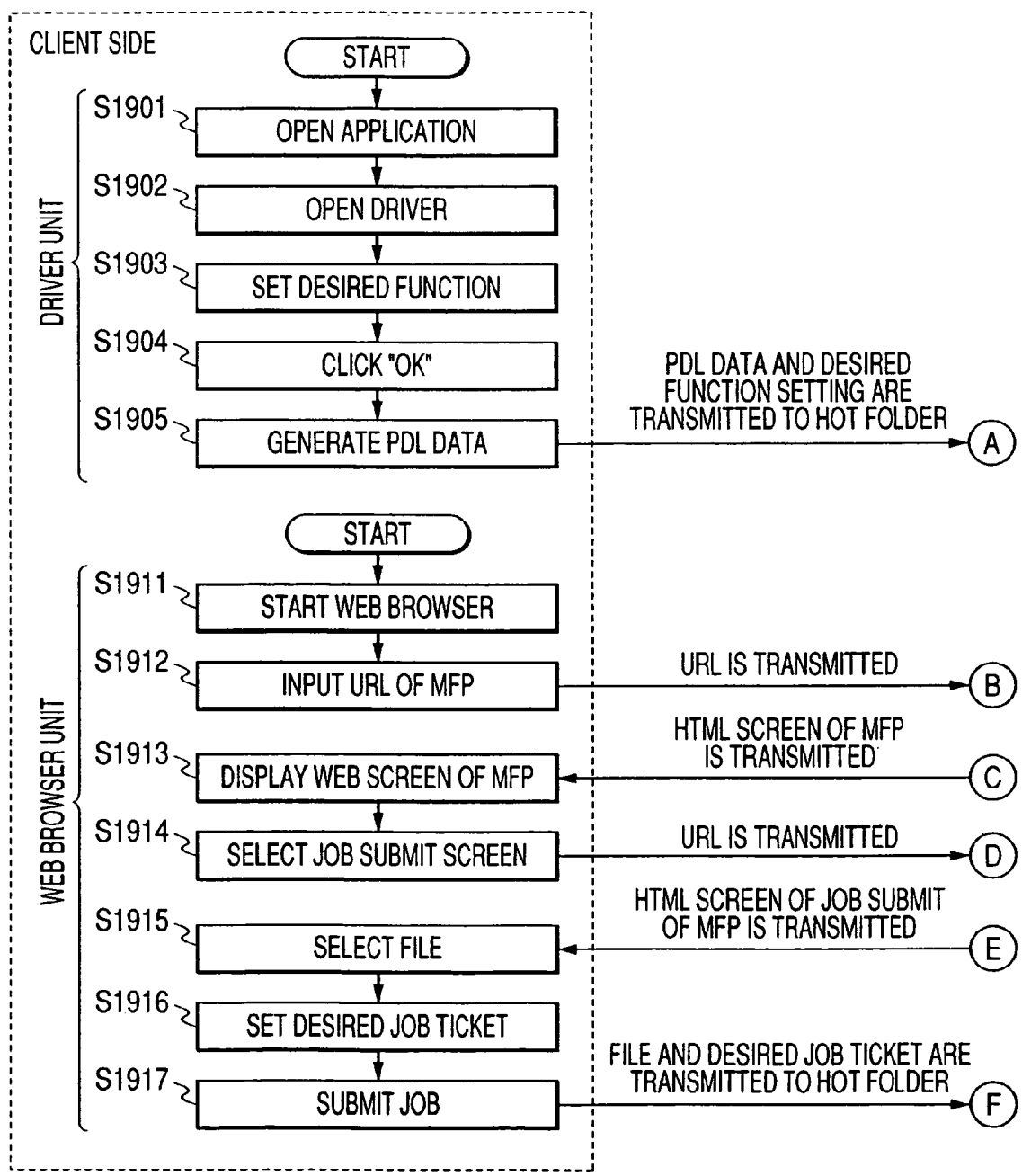
FIG. 18 is comprised of FIGS. 18A and 18B illustrating flow charts showing an example of the data processing procedure to be executed in the image processing system according to the present invention.
Figure 18B:
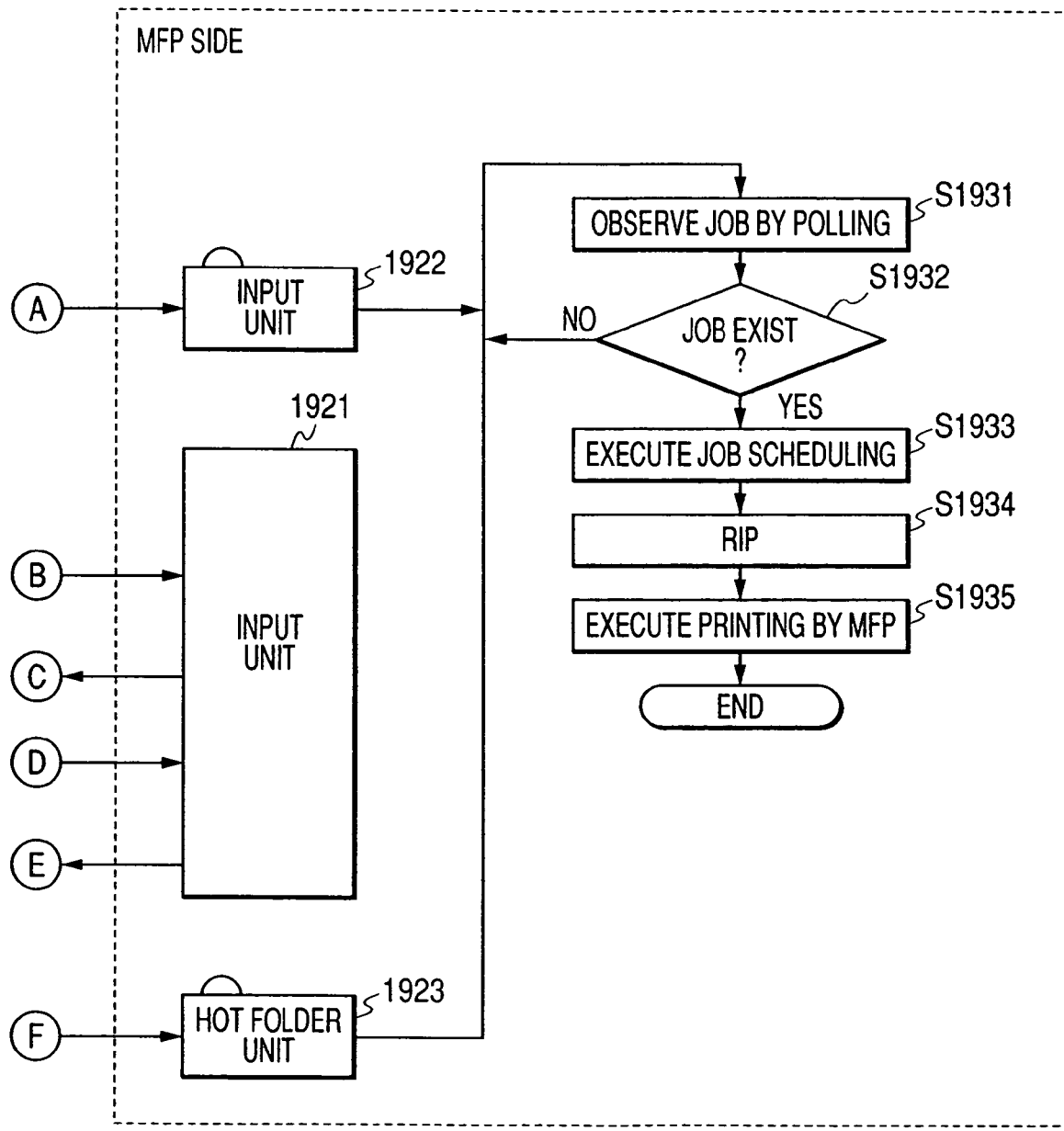

FIGS. 18A and 18B are a flow chart showing an example of a first data processing procedure to be executed in the image processing system according to the present invention. Here, it should be noted that the first data processing procedure corresponds to a series of processing procedures for outputting the job from the printer driver or the Web submission tool to the MFP and acquiring the print result. Incidentally, steps S1901, S1902, S1903, S1904 and S1905 correspond to the processes to be executed by the printer driver, steps S1911, S1912, S1913, S1914, S1915, S1916 and S1917 correspond to the processes to be executed by the Web submission tool, and numerals 1921, 1922 and 1923 and steps S1931, S1932, S1933, S1934 and S1935 correspond to the steps to be executed on the MFP side.

In the system according to the present embodiment, in addition to the indication of the printing by the printer driver, it is also possible to drag and drop the indication icon to the submission tool (also called downloader or submitter) or the hot folder.

In the present embodiment, the submission tool is the tool to be used for bringing the job into the server, the MFP or the like. In particular, the Web submission in which the http protocol is used will be explained here.

The Web submission is equivalent to the method of directly transferring the file to the RIP side through the Web by designating the file such as the PDF or the like from the client side. That is, the Web submission is the tool for indicating the printer setting item (that is, the setting item substantially equivalent to the setting of the PPD described above) which is called the job ticket and bringing it together with the data file, by using the UI on the Web.

Meanwhile, with respect to the hot folder, the file is dragged and dropped to the previously prepared shared holder. Here, there is no sequential job ticket setting, that is, the job ticket has previously been set by the user. For this reason, in case of bringing numbers of files by the same job ticket by indicating the complicated setting, the hot folder is significantly convenient.

Incidentally, the Web server is prepared in each of the MFP's 104 and 105. That is, the Web server corresponds to the Web server program such as the IIS (Internet Information Server) available by Microsoft Co., Ltd. More specifically, if the user inputs the URL (Uniform Resource Locator) address through the Web browser based on the http protocol, the Web server provides the service screen (Web page) on the Web browser.

For example, in a case where the job is submitted from the client computer 103 to the MFP 104 or 105 through the printer driver, the desired application is opened on the client computer 103 in the step S1901, and the print setting screen is displayed by the printer driver in the step S1902, whereby the print setting is executed as shown in FIGS. 11 and 12. Incidentally, it should be noted that the Web browser unit exchanges the data with the Web server unit 1921 on the MFP side.

Then, if the OK key 1741 shown in FIG. 11 or FIG. 12 is clicked in the step S1904, the printer driver generates the PDL data by which the MFP can interpret the drawing information from the application and then transmits the generated PDL data together with the desired function setting to the input unit 1922 of the MFP in the step S1905.

For example, when the job is brought from the client computer 103 into the MFP 104 or 105 by using the Web submission tool, the Web browser is started on the side of the client computer 103 (step S1911). Then, if the URL of the Web server 1921 on the side of the MFP 104 or 105 is designated (step S1912), the screen of the Web submission tool is displayed (step S1913).

Figure 13:
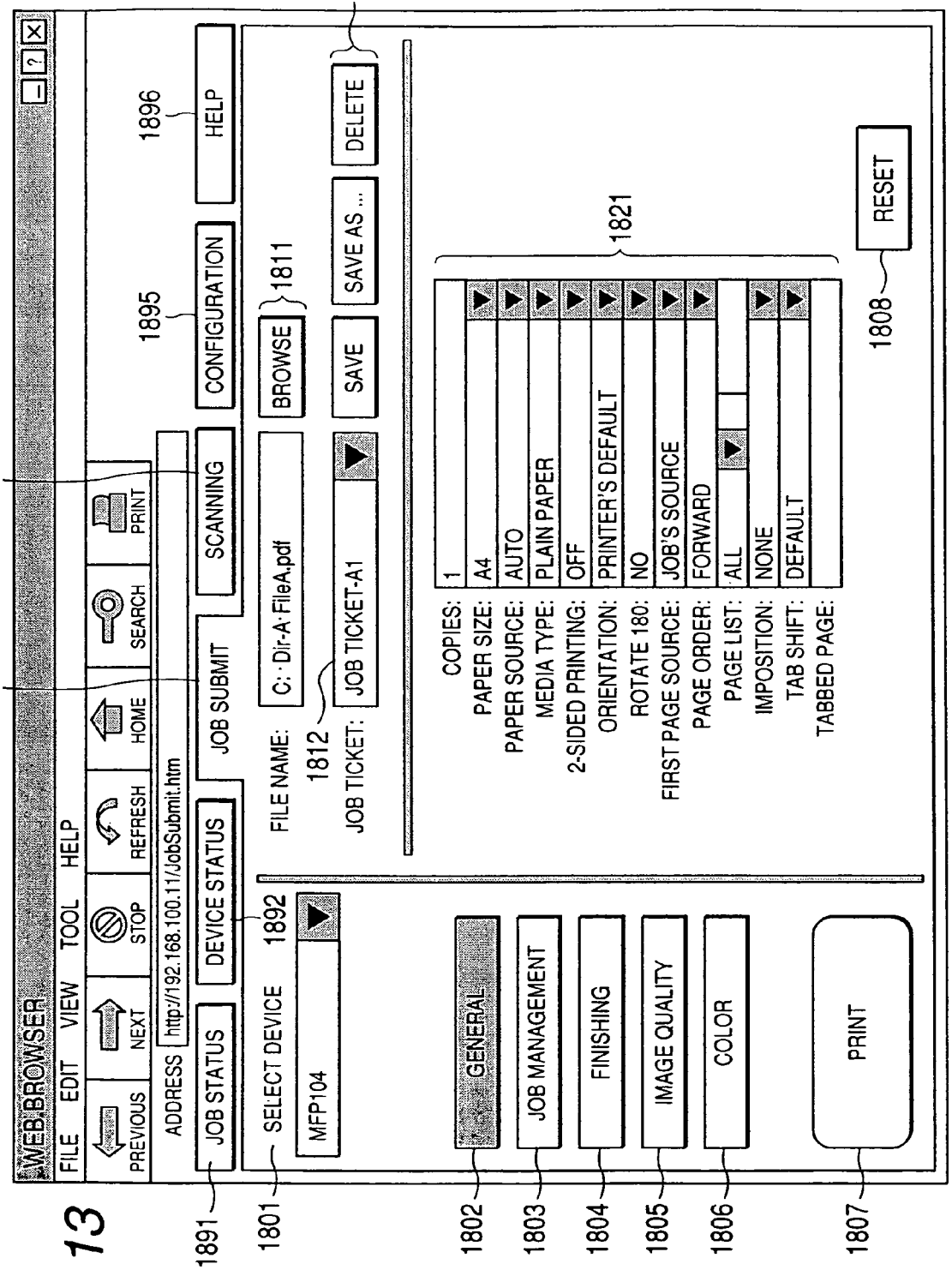
FIG. 13 is a plan view for explaining the configuration of the Web submission screen capable of being displayed on the display device of the client computer shown in FIG. 1.

For example, the screen of the Web submission tool is shown in FIG. 13. That is, on the screen shown in FIG. 13, the destination into which the job is brought is selected in a device selection portion 1801, and the job to be brought is designated by a browse button 1811. Incidentally, it should be noted that the file to be designated may be either the file on the client computer 103 or the file on the network, if it is selectable.

Next, the job ticket is selected. That is, the used job ticket is saved and deleted by job ticket buttons 1813, and the previously used job ticket can be called out and re-used by a call button 1812.

Numerals 1802, 1803, 1804, 1805 and 1806 denote selection buttons for designating the classification of the job ticket. That is, according to the selection by the selection buttons 1802 to 1806, the contents of the job ticket in a display portion 1821 are changed respectively as denoted by numerals 1822 (FIG. 14), 1823 (FIG. 15), 1824 (FIG. 16) and 1825 (FIG. 17).

For example, if the selection button 1802 is clicked, the job information 1821 shown in FIG. 13 is displayed, whereby the number of copies, the paper size and the like can be set by the general setting. Moreover, if the selection button 1803 is clicked, the job management shown in FIG. 14 is displayed, whereby the priority order of the job or the like can be set.

A job submit tab 1893 is selected from among tabs 1891, 1892, 1893, 1894, 1895 and 1896 (step S1914), the file is designated by the Web submission tool (step S1915), the desired job ticket is set (step S1916), and a print key 1807 is clicked, thereby bringing the job into the MFP (step S1917). It should be noted that this operation is called "job submission". Incidentally, numeral 1808 denotes a rest button.

Meanwhile, in the image processing system shown in FIG. 1, the transmitted job is transferred to the input unit 1922 or the hot folder unit 1923 on the side of the MFP 104 or 105 to always monitor whether or not the job exists (step S1931). Then, it is judged by the core unit 206 whether or not the job exists (step S1932), and it waits for the job if it is judged that the job does not exist.

On the other hand, it is judged by the core unit 206 that the job exists (step S1932), the relevant job is subjected to the scheduling as described later (step S1933), the scheduled job is subjected to the RIP process (step S1934), and the acquired data is printed by the printer unit 208 (step S1935). Then, the process ends.

Job Status by Web Browser

The job scheduled in the step S1933 of FIGS. 18A and 18B and the status (state) change of the relevant job are managed inside the server.

The statues of the managed job can be displayed and thus confirmed by clicking the job status key 1891 shown in FIG. 13. More specifically, the job status screen as shown in FIG. 19 is displayed on the LCD portion 1400 of the operation unit 211, whereby it is possible to confirm the displayed screen and control the displayed job by canceling, pausing and re-starting it.

FIG. 19 is the diagram showing an example of the job status screen (GUI) to be displayed on the LCD portion 1400 shown in FIG. 8.

In FIG. 19, a job number 2001, a job status (state) 2002, a job control 2003 (capable of operating job canceling, pausing, re-starting, etc.), a job name 2004, job priority order 2005 (depending on the job priority set in FIG. 14), job page number 2006, and job copy number 2007 are provided sequentially from the left. In addition to the above items, other necessary items may be provided, and, in this case, a comment 2008 is provided.

In the job status 2002, symbol "P" denotes "in printing", symbol "W" denotes "waiting for printing", symbol "R" denotes "in RIP process", and symbol "H" denotes "in holding" or "waiting for RIP process".

Moreover, by clicking the title bar of each item, it is possible to rearrange the items with respect to each attribute in ascending or descending order.

Hereinafter, the schedule adjustment of the job to be executed in a case where the job output order stored in the image processing device is biased with respect to each attribute will be explained in detail.

In Case Where Color Job and Monochrome Job are Biasedly Input

Then, the case where the color job and the monochrome job (or the black-and-white job) are biasedly input will be explained.

Figure 20A:
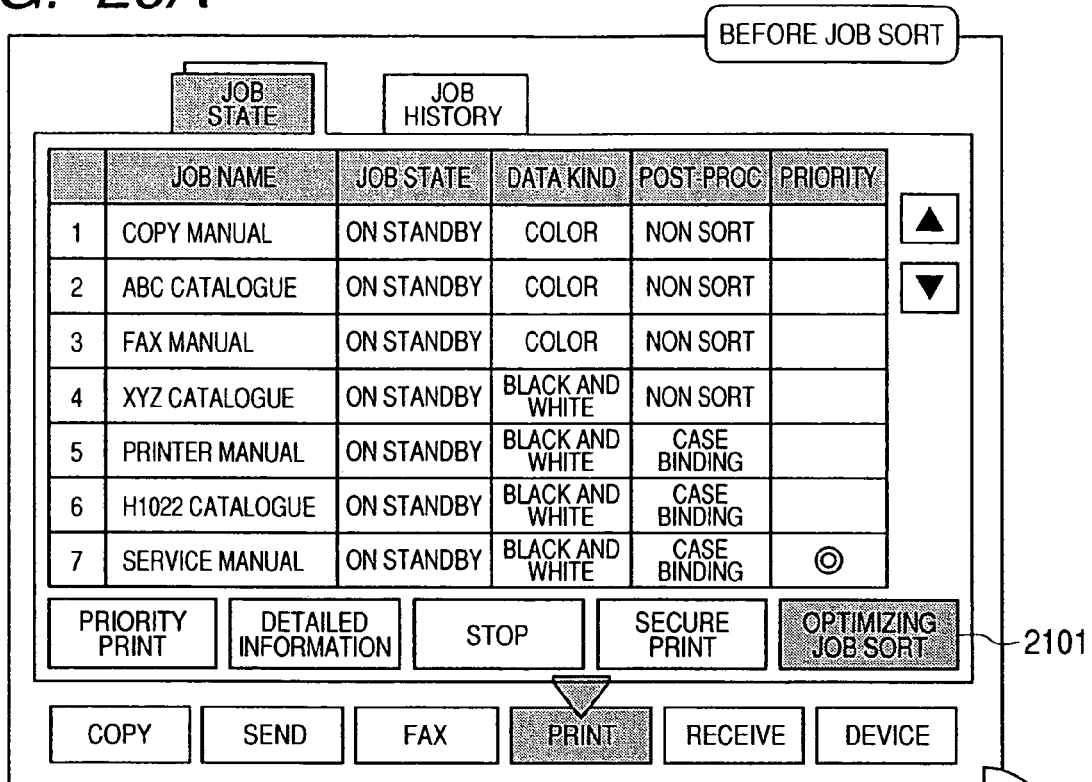
FIGS. 20A and 20B are diagrams showing the job status screen (GUI) to be displayed on the LCD portion shown in FIG. 8.
Figure 20B:
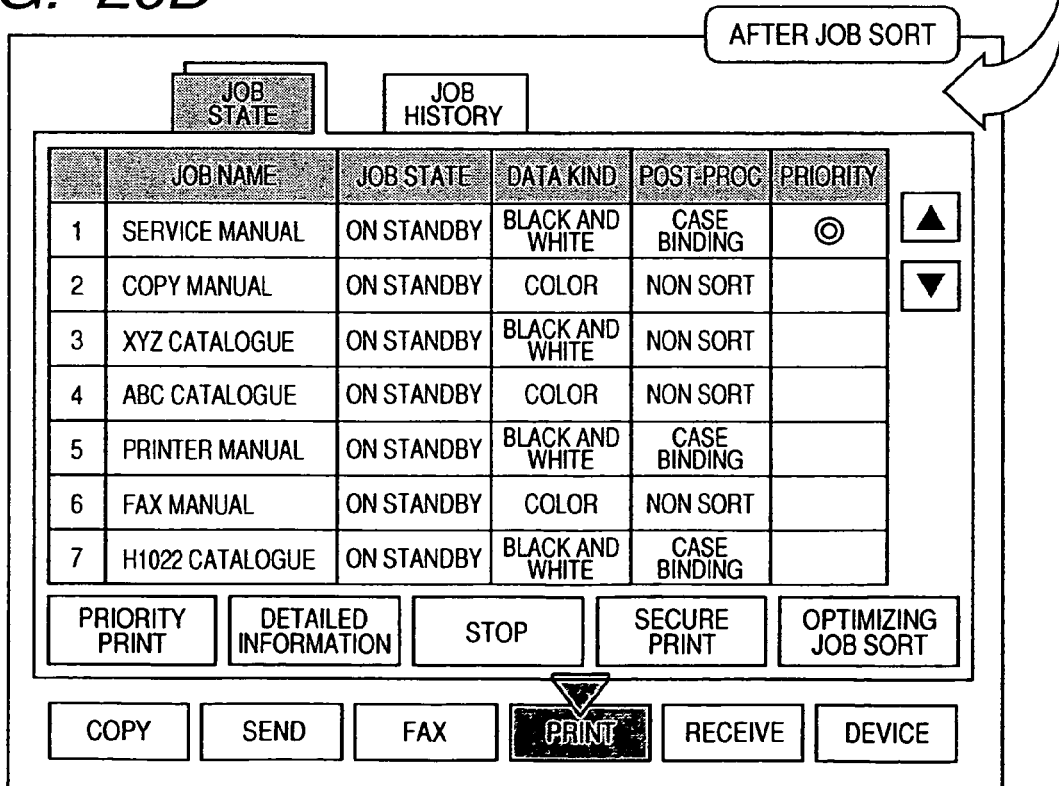

FIGS. 20A and 20B are diagrams showing an example of the job status screen (GUI) to be displayed on the LCD portion 1400 shown in FIG. 8. Incidentally, for example, the shown job status screen corresponds to the screen on which the job status (state) in the operation unit of the MFP explained in FIG. 9 can be confirmed, and the jobs currently displayed on the screen are scheduled so that the three color jobs continue first, and the four monochrome jobs continue subsequently.

However, in the typical POD market, each job tends to have a large paper (sheet) number (that is, the number of pages× the number of copies), whereby there is a fear that the problem as described in the related background art occurs.

Figure 21:
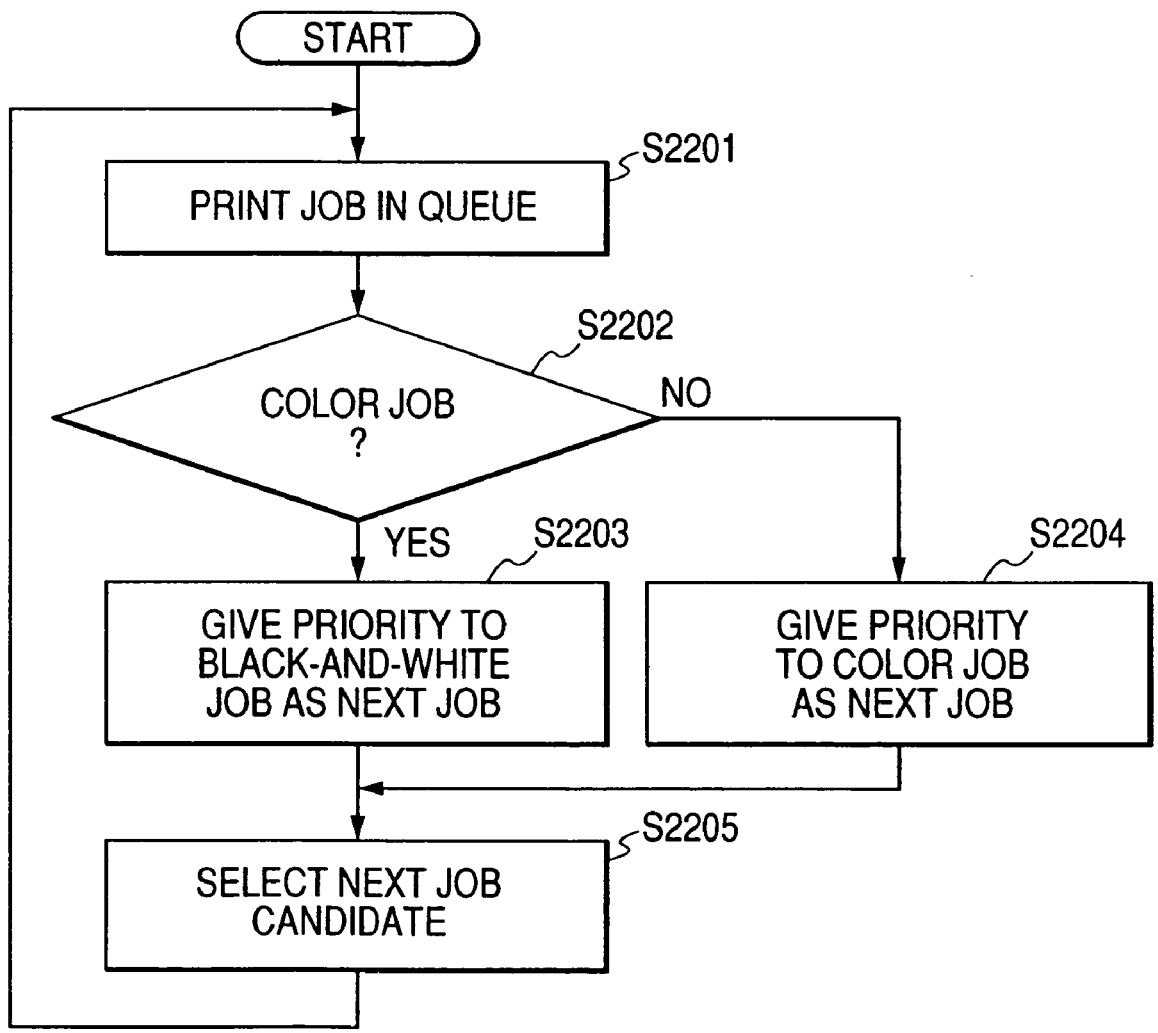
FIG. 21 is a flow chart showing an example of a first data processing procedure to be executed in the image processing device according to the present invention.
Figure 22:
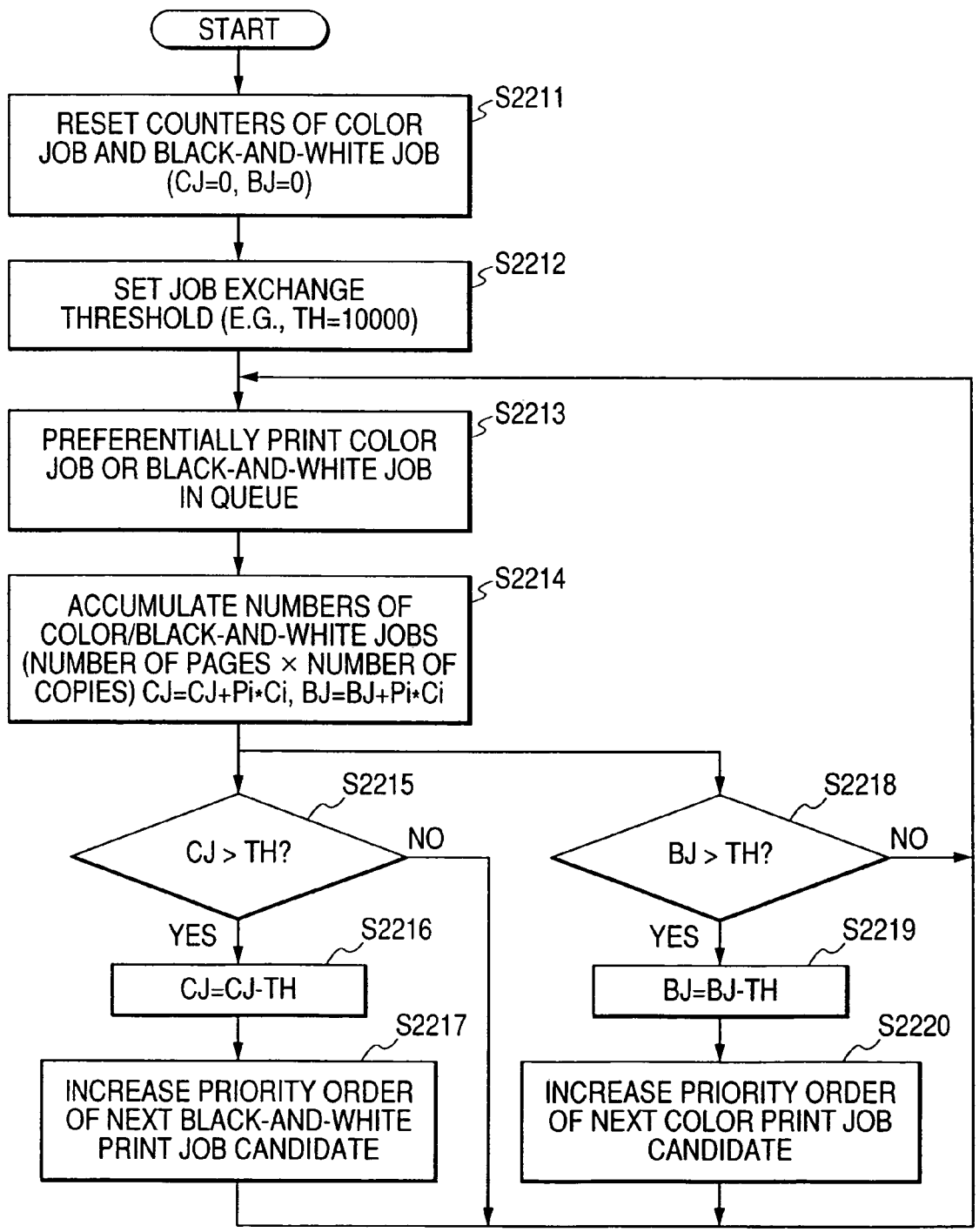
FIG. 22 is a flow chart showing an example of a second data processing procedure to be executed in the image processing device according to the present invention.

Consequently, the job scheduling process as shown in FIGS. 21 and 22 is applied in the present embodiment. That is, in the job scheduling process, the job output order primarily scheduled in the order of reception is controlled based on the attributes of the jobs (that is, the bias of the attributes) so as to be able to reduce the loads to the image quality of the MFP and the image quality control.

FIG. 21 is the flow chart showing an example of a first data processing procedure to be executed in the image processing device according to the present invention. Here, it should be noted that the first data processing procedure corresponds to the processing procedure for adjusting the job output schedule based on the job processing module read from the memory unit 210 by the core unit 206. Incidentally, symbols S2201, S2202, S2203, S2204 and S2205 denote respective steps.

Initially, the process starts, the job having the highest priority order is selected from among the plural jobs already subjected to the process of the RIP and thus standing by for the printing, and the selected job is printed by the printer unit 208 under the control of the core unit 206 (step S2201). At that time, it is judged by the core unit 206 whether the job is the color job or the black-and-white (monochrome) job (step S2202). Then, if it is judged that the job is the color job, it gives priority to the black-and-white job as the next job (step S2203), the black-and-white job being the candidate of the next job is selected (step S2205), and the flow returns to the step S2201.

Meanwhile, if it is judged in the step S2202 that the job is not the color job, it gives priority to the color job as the next job (step S2204), the color job being the candidate of the next job is selected (step S2205), and the flow returns to the step S2201.

As above, in the present embodiment, one of the attributes of the job is judged, that is, it is judged whether the job is the color job or the black-and-white job, and the job scheduling is executed so as to give, in the next job, priority to the job opposite to the judged job.

However, the actual process is not so simple as above. That is, there are some cases where the priority ordering of the jobs has previously been executed according to the job priority (see FIGS. 14 and 9).

For example, if the priority order is set to "1" with respect to the case where the job priority in the job ticket is "high", it is necessary in the steps S2203 and S2204 to make a difference in increments of "0.1" for giving the priority to the next job.

FIG. 22 is a flow chart showing an example of a second data processing procedure to be executed in the image processing device according to the present invention. Here, it should be noted that the second data processing procedure corresponds to the processing procedure for adjusting the job output schedule based on the job processing module read from the memory unit 210 by the core unit 206. Incidentally, symbols S2211, S2212, S2213, S2214, S2215, S2216, S2217, S2218, S2219 and S2210 denote respective steps.

Initially, in the step S2211, the counter CJ for counting the number of color jobs and the counter BJ for counting the number of black-and-white (monochrome) jobs both set in the memory unit 210 are reset to "0" by the core unit 206.

Next, in the step S2212, the job exchange threshold TH is set to, e.g., "10000" by the core unit 206. Then, in the step S2213, the color jobs or the black-and-white jobs in the output queue in the RAM 508 are output from the printer unit 208 in priority order.

Subsequently, in the step S2214, the attribute of the job is analyzed and the respective paper (sheet) numbers (that is, the number of pages× the number of copies) of the color jobs and the black-and-white jobs are accumulated by the core unit 206, and the respective paper (sheet) numbers CJ (CJ+Pi×Ci) and BJ (BJ+Pi×Ci) are counted up.

Next, in the step S2215, it is judged by the core unit 206 whether or not the accumulated value of the color job CJ exceeds the set threshold TH (CJ>TH). If it is judged that the accumulated value of the color job CJ exceeds the set threshold TH, the threshold TH is subtracted from the count value of counting the color job CJ (CJ=CJ−TH), thereby adjusting the count value. Then, in the step S2217, the priority order of the candidate of the next black-and-white print job is increased, and the flow returns to the step S2213.

Likewise, after the step S2214, it is judged by the core unit 206 in the step S2218 whether or not the accumulated value of the black-and-white job BJ exceeds the set threshold TH (BJ>TH). If it is judged that the accumulated value of the black-and-white job BJ exceeds the set threshold TH, the threshold TH is subtracted from the count value of counting the black-and-white job BJ (BJ=BJ−TH) in the step S2219, thereby adjusting the count value. Then, in the step S2220, the priority order of the candidate of the next color print job is increased, and the flow returns to the step S2213.

In FIG. 22, the jobs are not only alternately disposed. That is, the threshold (TH) capable of being set is previously prepared also in consideration of the paper number (the number of pages× the number of copies) of the job, and it is determined whether or not to change the job order according to whether or not the paper number of the color job or the black-and-white job exceeds the threshold (TH).

At that time, CJ indicates the paper number of the color job and BJ indicates the paper number of the black-and-white job, and, if CJ or BJ exceeds the threshold, the exceeded threshold is subtracted, and then the counting is again executed.

Besides, in FIG. 22, the counting is executed in units of paper (sheet) number. However, the present invention is not limited to this. That is, the counting may be executed in units of objects or in units of bits.

Moreover, to discriminate color and black-and-white, when the description of the PDL, the information of the display list is judged when the process of the RIP is executed. Alternatively, when the job is extracted into the bitmap, it is judged whether the relevant job is the color job or the blackand-white job. In that case, the following three kinds are thought as the judgment timing.

That is, the judgment is executed at the timing when preflight is executed before the process of the RIP, at the timing when the process of the RIP is executed, or at the timing when counting is executed from the video signal to be transmitted to a laser, an LED array or the like in case of the printing. Here, it should be noted that the preflight is the operation which is executed before the process of the RIP, and which analyzes only the information necessary for the preconfirmation from the PDL information and reports the improper portions beforehand.

Incidentally, when the preflight is executed, although the additional process has to be executed beforehand, the performance in the process of the RIP is not lowered. On the other hand, when the process of the RIP is executed, although there is a fear that the performance is lowered, the judgment can be executed in the series of job processes. Besides, when the counting is executed from the video signal (this is also called video counting), since it is impossible, until the actual printing is executed, to judge whether the job is the color job or the black-and-white job, there is a drawback that the reflection to the next job scheduling is delayed.

For these reasons, it is most preferable to execute the judgment at the timing when the process of the RIP is executed. However, to select whether to give priority to the performance or to select the job sort which is gentle or good for the device, an optimization job sort key 2101 shown in FIG. 20A is prepared in the present embodiment. That is, if it is judged by the core unit 206 that the optimization job sort key 2101 is selected by the user, the schedule of the jot output order is adjusted according to the processes shown in the flow charts of FIGS. 21 and 22. Thus, as shown in FIG. 20B, the color jobs and the black-and-white jobs are mixedly sorted and output in due order.

Here, for example, it is supposed that, after the several black-and-white jobs were input, the color job is input.

In general, to maintain a certain image level, the image processing device brings in its control sequences the adjustments of the printer engine (that is, the potential control, the ATR (automatic toner replenisher) control (development), the maximum density control of the laser power or the like, and the gradation control of the LUT (lookup table) or the like). Thus, the number of output copies and the accumulated number of video counting are counted and the above adjustment sequence is periodically entered therein. Moreover, the peripheral temperature, humidity and the like are always measured, and the above adjustment sequence is entered when the environments change.

At that time, since the operation of the four-drum image forming device is different from that of the one-drum image forming device, each of these two operations will be explained separately. Here, the four-drum image forming device has the quadplex drums and executes the operation sequence of forming and outputting images of necessary colors, and the one-drum image forming device executes the four-rotation sequence when forming a color image and executes only the one-rotation sequence when forming a black-and-white (monochrome) image.

In the four-drum image forming device, generally, the CMY drum and the development sleeve are always rotated even if the black-and-white job is executed or the color job is executed (except for the image forming device having the separation mechanism for the CMY process parts). For this reason, in a case where the color jobs and the black-and-white jobs are brought into the MFP with the ratio thereof biased, if only the black-and-white (K) job is biasedly output, then the CMY development sleeve is agitated more than needs. Therefore, the image quality deteriorates due to the densities of the CMY toners to be output immediately after the agitation. Moreover, the lifetime of the development sleeve decreases if the sleeve is repeatedly rotated although it is unused.

In the one-drum image forming device, even if only the black-and-white (K) job is biasedly output, the lifetime of the CMY development sleeve does not decrease because the pause state of this sleeve continues. However, if the color job is brought into the MFP as the next job, the CMY development sleeve is agitated suddenly. For this reason, it is observed that the rise of gradation deteriorates because the agitation is not in time and the color thus changes. On the other hand, if the CMY development sleeve is additionally agitated to forcedly adjust the color, the agitation for a long time is necessary. Thus, the performance decreases immediately after the job was transformed into the color job, and the durability of the developing unit deteriorates if the agitation further continues. On the other hand, according to the present embodiment, as described above, it is possible to absorb such problems to some extent by appropriately scheduling the black-and-white jobs and the color jobs in a balanced manner.

Moreover, in the one-drum image forming device, as described in Japanese Patent Application Laid-Open No. 2000-075722, the degree of temperature fall in the black-and-white monochrome output is different from the degree of temperature rise in the color output. Here, in consideration of the fixing unit, the paper passing frequency in the black-and-white monochrome output is higher than the paper passing frequency in the color output. This is because, in the one-drum image forming device, it is necessary to form CMYK images, whereby the paper passing intervals become wide to some extent. For this reason, in the case where the black-and-white monochrome output continues, as described in Japanese Patent Application Laid-Open No. 2000-075722, there is the problem that it is controlled to interrupt the output until the adjusted temperature rises and reaches the defined temperature. On the other hand, according to the present embodiment, it is possible to absorb the above problem to some extent by appropriately scheduling the black-and-white jobs and the color jobs in a balanced manner.

Second Embodiment

In the above first embodiment, the attribute of the job is judged, that is, it is judged whether the job color information represents the color job or the black-and-white (monochrome) job, the judged job color information is stored in the memory unit 210 or the like, and the schedule of the job output order in the queue is adjusted based on the stored information. Thus, it is possible to limit that the driving of the hardware resources of the MFP is biasedly controlled, and it is also possible to adjust the job output schedule to be able to suppress that the color characteristic to be reproduced changes. Aside from this, unevenness in gloss at the edge of the image, a change of color at the edge of the image and high-temperature offset at the edge of the image as described in the related background art occur due to unevenness of the surface temperature of the fixing unit (that is, the hardware resource) based on the selection of the paper size as the job attribute, whereby the image quality deteriorates.

Therefore, according to the second embodiment, it is possible to judge the bias of the paper sizes in the attributes of the job and adjust and control the schedule of the output jobs so as to eliminate that the certain papers (e.g., A4R papers) are continuously output irrespective of the job output order. Hereinafter, the second embodiment will be explained.

Figure 23:
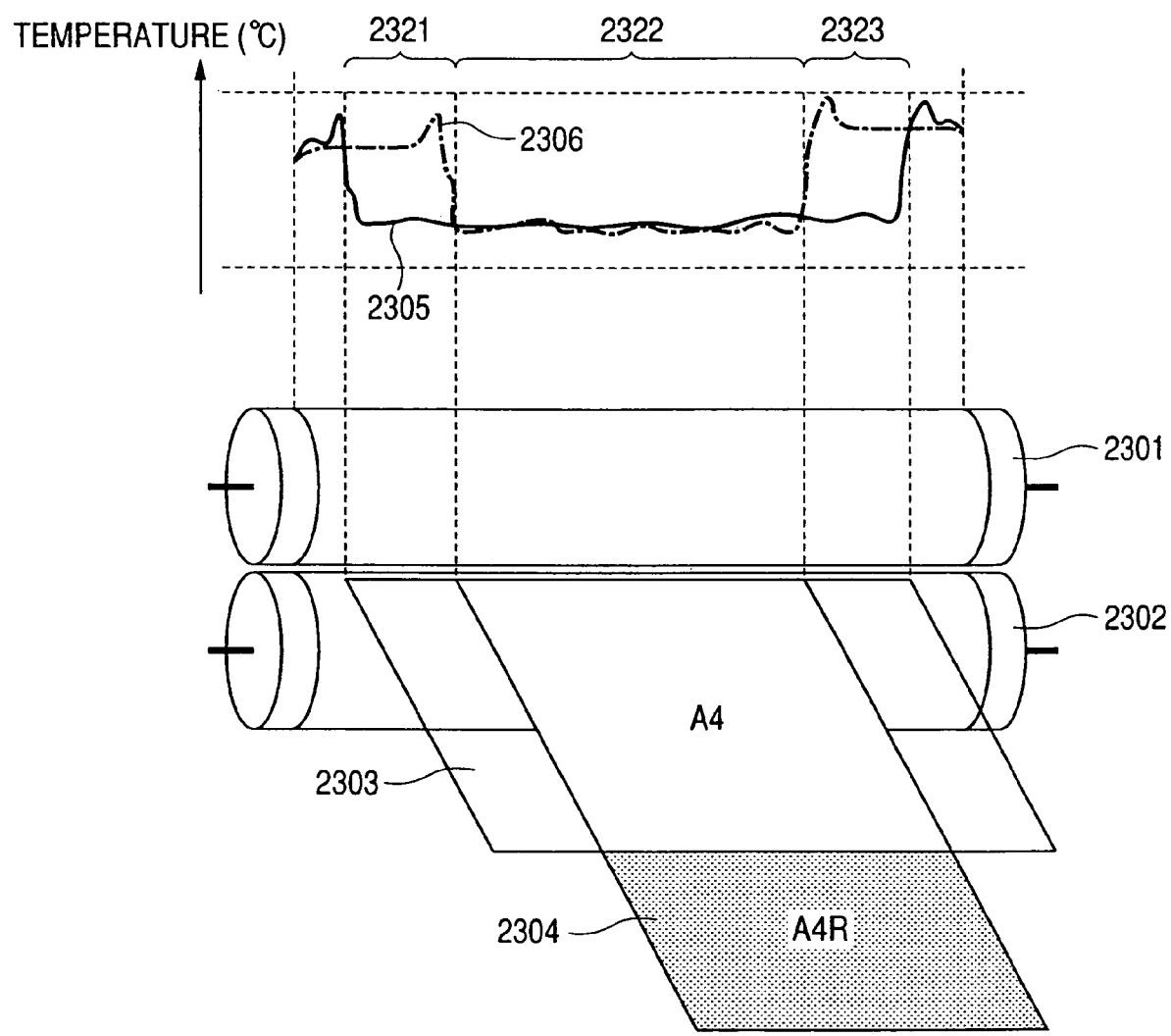
FIG. 23 is a diagram for relatively explaining the paper passing state in the fixing unit of the printer shown in FIG. 2 and the surface temperature characteristic of the fixing unit.

FIG. 23 is a diagram for relatively explaining the paper passing state in the fixing unit of the printer unit 208 shown in FIG. 2 and the surface temperature characteristic of the fixing unit.

In the printer unit 208 shown in FIG. 2, the fixing unit for fixing the developed toner image on the paper of the selected size is provided at the predetermined location, and the fixing unit typically comprises an fixing upper roller 2301 and a fixing lower roller 2302. Thus, the paper of the selected size passes between the fixing upper roller 2301 and the fixing lower roller 2302. Here, numeral 2303 denotes a paper of A4 size (or letter size), and numeral 2304 denotes a paper of A4R size (or letter R size).

At that time, generally, each of the fixing upper roller 2301 and the fixing lower roller 2302 is uniformly heated by the fixing heater provided therein. However, when the A4 paper 2303 or the A4R paper 2304 passes between the fixing upper roller 2301 and the fixing lower roller 2302, it is well known that the heat is absorbed by the paper, the toner on the paper, and the like. For this reason, when the plural papers continuously pass between the rollers 2301 and 2302, the surface temperature of the roller decreases with respect to the portion on which the papers passed as shown by the upper side of FIG. 23. At that time, a solid line 2305 is equivalent to the temperature in case of the A4 paper 2303, and a dashed line 2306 is equivalent to the temperature in case of the A4R paper 2304.

Figure 24:
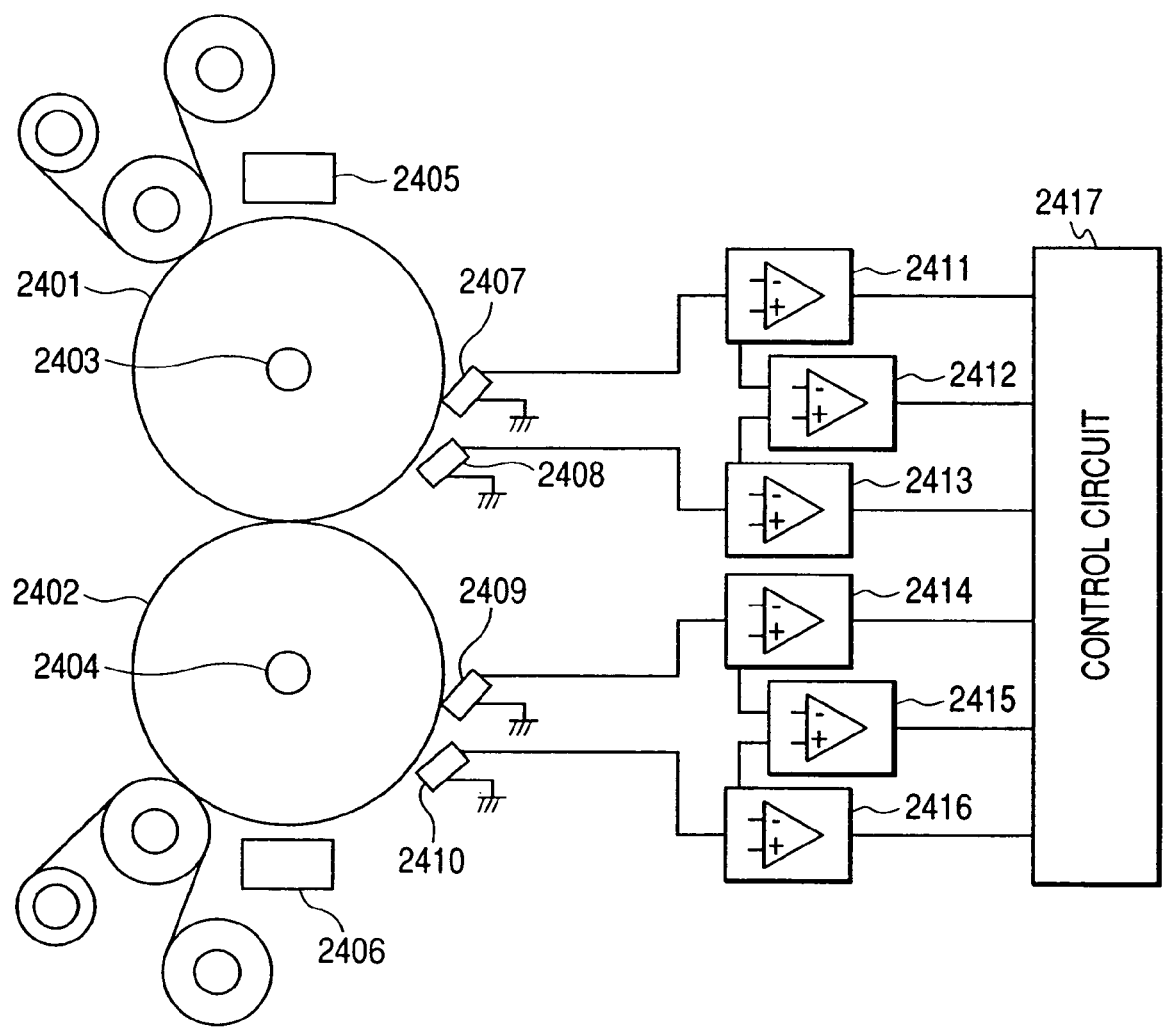
FIG. 24 is a block diagram for explaining the construction of the temperature control circuit of the fixing upper roller and the fixing lower roller shown in FIG. 23.

FIG. 24 is a block diagram for explaining the construction of the temperature control circuit of the fixing upper roller 2301 and the fixing lower roller 2302 shown in FIG. 23.

The temperature of the fixing upper roller 2301 shown in FIG. 23 is controlled by a upper fixing roller 2401, a fixing heater 2403 provided inside the upper fixing roller 2401, thermistors (TH1) 2407 and (TH2) 2408 both provided in the vicinity of the upper fixing roller 2401, and a thermo-switch 2405 for interrupting the power supply to the fixing heater 2403 in case of abnormal temperature rise or the like. Likewise, the temperature of the fixing lower roller 2302 shown in FIG. 23 is controlled by a lower fixing roller 2402, a fixing heater 2404 provided inside the lower fixing roller 2402, thermistors (TH3) 2409 and (TH4) 2410 both provided in the vicinity of the lower fixing roller 2402, and a thermo-switch 2406 for interrupting the power supply to the fixing heater 2404 in case of abnormal temperature rise or the like.

Moreover, in FIG. 24, numerals 2411, 2413, 2414 and 2416 denote high-temperature detection circuits, and numerals 2412 and 2415 denote disconnection detection circuits. That is, if abnormality is detected by the detection circuit, the detected abnormality is discriminated by a control circuit 2417, whereby, for example, the power supply to the heater is appropriately stopped and/or a serviceman call is appropriately generated according to need.

However, as described in the above related background art, if a large amount of papers of the short jobs pass in the main scan direction (A4R or the like), or if the papers pass at the same temperature for a long period of time, the surface temperature characteristics on the fixing upper roller 2301 and the fixing lower roller 2302 have the distributions as shown in FIG. 23. Thus, a difference in temperature occurs between an area 2322 of A4R and areas 2321 and 2323 other than the area 2322 of A4R, whereby the unevenness in gloss at the edge of the image, the change of color at the edge of the image and the high-temperature offset at the edge of the image (that is, the phenomenon that the toner is absorbed by the fixing unit), and the like occur, whereby the image quality deteriorates.

For this reason, to prevent such phenomena, if a large amount of papers of the same size continuously pass between the rollers (in particular, the short jobs in the main scan direction), as well as the first embodiment, the scheduling is executed not to bias the job of A4R or the like as much as possible in such a way that the job order is exchanged.

Moreover, to prevent the image deterioration, it is necessary to execute the control so as not to bias the jobs in units of number of copies or number of pages, that is, not in units of jobs.

Figure 25:
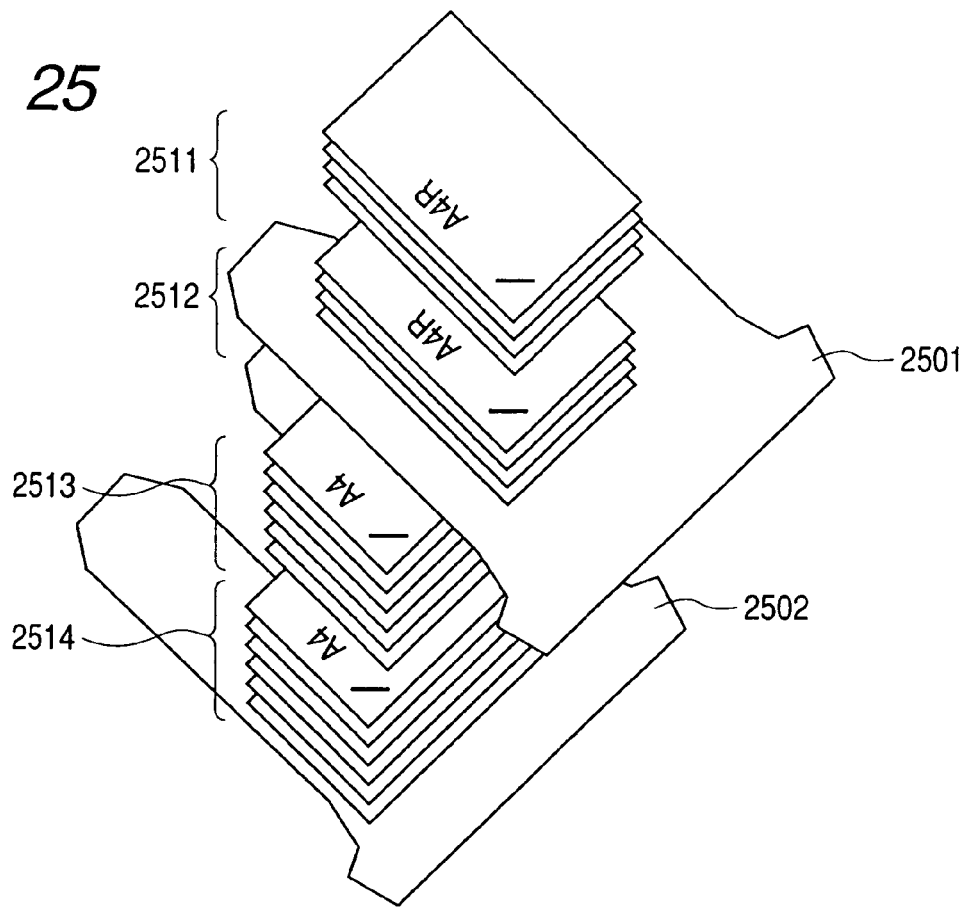
FIG. 25 is a main portion perspective diagram showing an arrangement example of the paper discharge trays provided in the printer shown in FIG. 2.

For this reason, according to the present embodiment, as shown in FIG. 25, the plural paper discharge trays are provided in the printer unit 208. Thus, the core unit 206 analyzes the job attribute, and adjusts and controls the job output schedule so that, for example, the papers are discharged alternately to a paper discharge tray 2501 and a paper discharge tray 2502, as the jobs of different paper sizes in the stored jobs.

FIG. 25 is the main portion perspective diagram showing an arrangement example of the paper discharge trays provided in the printer unit 208 shown in FIG. 2.

In FIG. 25, output jobs 2511 and 2512 of which the paper size is A4R and output jobs 2513 and 2514 of which the paper size is A4 are adjusted and controlled according to the later described control procedures shown in FIGS. 26 and 27, so that, for example, the sequence of the output job 2512→the output job 2514→the output job 2511→the output job 2513 is satisfied.

Figure 26:
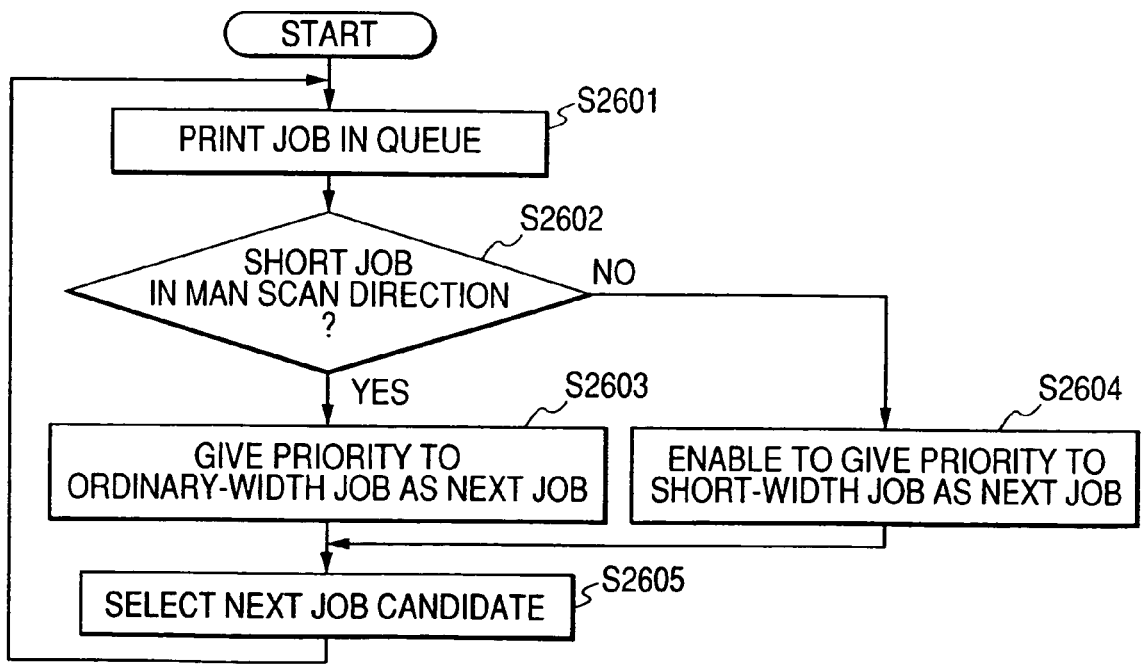
FIG. 26 is a flow chart showing an example of a third data processing procedure to be executed in the image processing device according to the present invention.

FIG. 26 is the flow chart showing an example of a third data processing procedure to be executed in the image processing device according to the present invention. Here, it should be noted that the third data processing procedure corresponds to the processing procedure for adjusting the job output schedule based on the job processing module read from the memory unit 210 by the core unit 206. Incidentally, symbols S2601, S2602, S2603, S2604 and S2605 denote respective steps.

Initially, in the step S2601, the two or more jobs are subjected to the RIP extraction by the RIP unit 503 shown in FIG. 3. Subsequently, the extracted jobs are stored beforehand in the memory unit (HDD) 210 or the RAM 508 and then printed by the printer unit 208 with respect to each paper number (or copy number of page number) by which any unevenness does not occur on the temperature of the fixing unit.

Then, in the step S2602, it is judged by the core unit 206 whether or not the paper size of the output job is short in the main scan direction, based on the attribute of the printed job. If it is judged that the paper size is short in the main scan direction, it gives priority to the job of the ordinary width as the next job in the step S2603. Then, in the step S2605, the next job candidate is selected from the job queue, and the flow returns to the step S2601.

Meanwhile, if it is judged by the core unit 206 in the step S2602 that the paper size is not short in the main scan direction, it gives priority to the job of the short width as the next job in the step S2604. Then, the floe advances to the step S2605.

Incidentally, the jobs to be output are classified by using the paper discharge trays, and it is controlled that the outputs of the two jobs do not admix with each other.

Figure 27:
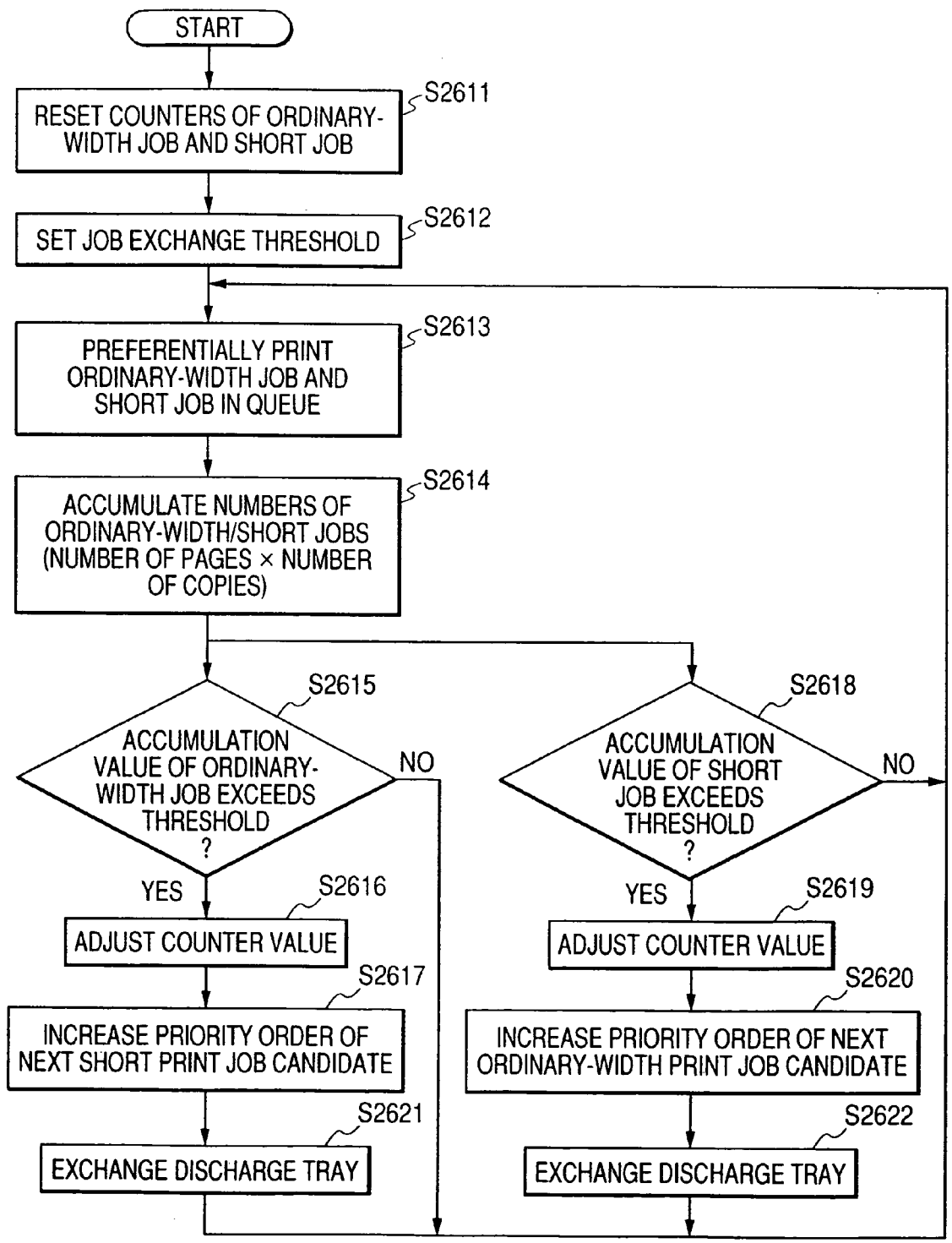
FIG. 27 is a flow chart showing an example of a fourth data processing procedure to be executed in the image processing device according to the present invention.

FIG. 27 is a flow chart showing an example of a fourth data processing procedure to be executed in the image processing device according to the present invention. Here, it should be noted that the fourth data processing procedure corresponds to the processing procedure for adjusting the job output schedule based on the job processing module read from the memory unit 210 by the core unit 206. Incidentally, symbols S2611, S2612, S2613, S2614, S2615, S2616, S2617, S2618, S2619, S2620, S2621 and S2622 denote respective steps.

Initially, in the step S2611, the counter value of the jobs of the ordinary width and the counter value of the jobs of the short width, stored in the RAM 508, are reset by the core unit 206. Then, in the step S2612, the threshold value to be used to determine the exchange of the jobs of the ordinary width and the short width is set on the RAM 508.

Subsequently, in the step S2613, the job of the ordinary width or the job of the short width in the job list of the output queue managed on the RAM 508 is subjected to the printing sequentially in priority order by the printer unit 208. Next, in the step S2614, the output paper numbers of the jobs (the number of pages× the number of copies) in the output queue managed on the RAM 508 are accumulated.

Then, in the step S2615, it is judged by the core unit 206 whether or not the accumulated value of the jobs of the ordinary width stored on the RAM 508 exceeds the threshold for determining the exchange. If it is judged that the accumulated value of the jobs of the ordinary width does not exceed the threshold, the flow returns to the step S2613.

Meanwhile, if it is judged by the core unit 206 that the accumulated value of the jobs of the ordinary width exceeds the threshold for determining the exchange, for example, the threshold for determining the exchange is calculated from the accumulated value of the jobs of the ordinary width set on the RAM 508, and the accumulated value is adjusted (step S2616). Then, in the step S2617, the priority order of the job candidate for the next job of the short width is increased. Subsequently, in the step S2621, the paper discharge tray 2502 is changed to the paper discharge tray 2501 as shown in FIG. 25, and the flow returns to the step S2613.

Likewise, in the step S2618, it is judged by the core unit 206 whether or not the accumulated value of the jobs of the short width exceeds the threshold for determining the exchange. If it is judged by the core unit 206 that the accumulated value of the jobs of the short width does not exceed the threshold, the flow returns to the step S2613.

Meanwhile, if it is judged by the core unit 206 in the step S2618 that the accumulated value of the jobs of the short width exceeds the threshold for determining the exchange, for example, the threshold for determining the exchange is calculated from the accumulated value of the jobs of the short width set on the RAM 508, and the accumulated value is adjusted (step S2619). Then, in the step S2620, the priority order of the job candidate for the next job of the ordinary width is increased. Subsequently, in the step S2622, the paper discharge tray 2501 is changed to the paper discharge tray 2502 as shown in FIG. 25, and the flow returns to the step S2613.

Thus, based on the attribute of the job, that is, whether the job of which the paper size is ordinary or short in the main scan direction, it is possible to adjust the output schedule of the output job, thereby improving the unevenness of the image quality due to the fixing unit.

Moreover, in the case where the jobs of which the paper size is biased are continuously brought into the MFP as described above, for example, when it is supposed that the job of A4 (or letter) size is brought into the MFP after the jobs of A4R (or letter R) size continued, if the papers of "R (A4R, letter R, etc.)" size continue, the portion where the paper exists normally operates, but the temperature rise of the fixing unit occurs more than needs at the portion where the paper does not exist, whereby productivity decreases because it is necessary to cool down the relevant temperature rise.

Moreover, immediately after then, if the image formation is executed on the paper of large size (A4, letter, A3, 11×17, etc.), the unevenness in gloss at the edge of the image, the change of color at the edge of the image and the high-temperature offset at the edge of the image (that is, the phenomenon that the toner is absorbed by the fixing unit), and the like occur, whereby the image quality deteriorates.

In addition, with respect to the problem that the lifetime of the rubber material of the roller becomes short if the temperature rise at the edge of the fixing roller occurs repeatedly (see Japanese Patent Application Laid-Open No. H06-011994), in the present embodiment, the job scheduling is executed in the main scan direction (front-and-rear direction) so that the paper sizes are averaged, whereby it is expected to flexibly deal with the relevant problem.

Incidentally, in case of averaging the paper sizes, several methods to do so can be supposed. For example, the small size such as "R" size or the like is selected in the main scan direction and the papers of the selected size are subjected to the mapping. Besides, the histogram of the distributions of papers and images is acquired in the main scan direction and the averaging is executed based on the acquired histogram.

Third Embodiment

In the above first embodiment, the attribute of the job is judged, that is, it is judged whether the job color information represents the color job or the black-and-white (monochrome) job, the judged job color information is stored in the memory unit 210 or the like, and the schedule of the job output order in the queue is adjusted based on the stored information. Thus, it is possible to limit that the driving of the hardware resources of the MFP is biasedly controlled, and it is also possible to adjust the job output schedule to be able to suppress that the color characteristic to be reproduced changes. Aside from this, it is possible to calculate, as the job attribute, the unevenness in consumption of each coloring agent in case of the color output based on the pixel information in the rendering by the RIP unit 503, and adjust and control the schedule of the output jobs based on the calculated unevenness so as not to bring the job in which the consumption of any color toner (coloring agent) is biased into the MFP. Hereinafter, the third embodiment will be explained.

Figure 28:
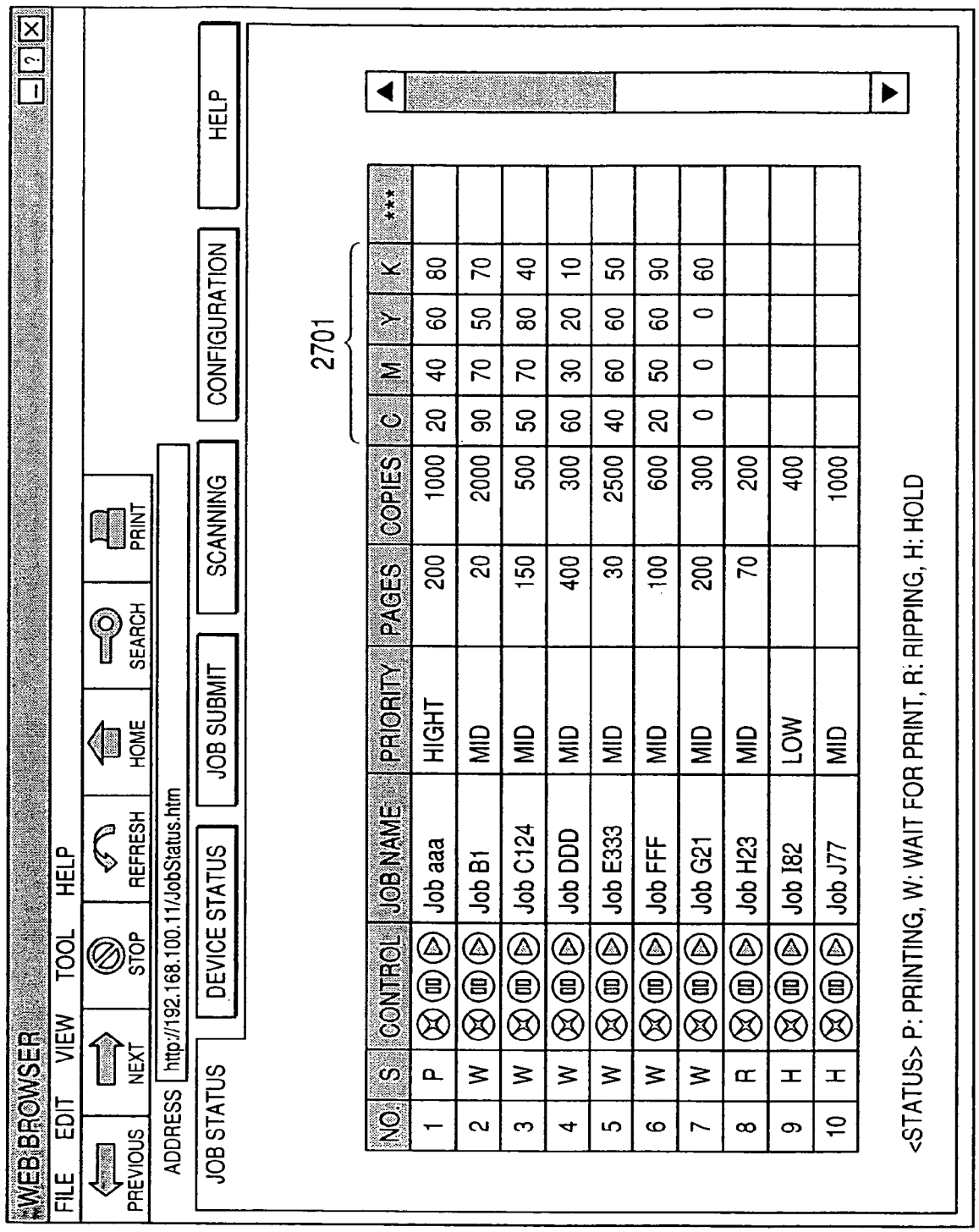
FIG. 28 is a diagram showing an example of the job status screen to be stored on the RAM shown in FIG. 3.

FIG. 28 is a diagram showing an example of the job status (state) screen to be stored on the RAM 508 shown in FIG. 3. Here, it should be noted that the job status screen is displayed on the operation unit 211 of FIG. 2 and shows the status (state) of the current print job.

As shown in FIG. 28, the job status screen includes the job #1 which is in the printing and the six jobs #2 to #7 which were subjected to the process of the RIP and are standing by for the printing. Here, with respect to each job subjected to the process of the RIP, the predicted amount of toner consumption of each of the C, M, Y and K toners is calculated beforehand by the core unit 206 at the time of the process of the RIP (or the above preflight). Here, it should be noted that the predicted amount is calculated based on the value acquired by multiplying the length of the line segment of the display list handled by the RIP unit 503 and the density together, or the value acquired by multiplying the bitmap data after the color matching and each density together. Alternatively, how to acquire the toner consumption amount in the actual print output is described in Japanese Patent Application Laid-Open No. 2002-283675. More specifically, the bitmap data after the color matching of the screening unit 1003 shown in FIG. 4 is transformed into the signal which is linearly relative to the toner consumption amount by using the LUT stored in the memory unit 210, the in-plane accumulated amount thereof is calculated, and the acquired amount is divided by the in-plane tonal pixel number.

Incidentally, it is also possible to approximately calculate the consumption amount of the tonal jobs from the partial consumption amount, and it is also possible to predict the amount for all pages from the amount for several pages.

FIG. 29 is a diagram for explaining an example of the job order determination process to be executed with respect to prediction values 2701 of the toner consumption in the respective jobs shown in FIG. 28.

In the example of FIG. 29, with the six jobs #2 to #7, as paying attention to the attributes (that is, the toner consumption amounts in the present embodiment), the job output order in which the bias of the toner consumption is suppressed is determined.

In FIG. 29, numeral 2801 denotes a toner consumption amount table on which the toner consumption prediction values of the jobs #1 to #7, the average value of the toner consumption prediction values of the C, M, Y and K toners in each job, and the deviations of the average values are set.

Currently, since the job #1 has been already in the printing, the job output order of the job #1 cannot be changed. However, since the six jobs #2 to #7 were subjected to the process of the RIP by the RIP unit 503 shown in FIG. 3 and are standing by for the printing, any job from among the six jobs #2 to #7 may be printed preferentially.

Thus, the toner consumption prediction value of the job #1 is respectively accumulated to the six jobs #2 to #7 as the attributes (toner consumption amounts), and the acquired jobs are provided as the candidates to be next printed in a toner consumption amount table 2802. Then, from among the candidates of the toner consumption amount table 2802, it is possible to find from the deviations thereof that the toner consumption unevenness in the C, M, Y and K toners is least with respect to the job #4. Therefore, the job #4 is set as the candidate of the next job.

Then, after the job #1→the job #4 are selected, a toner consumption table 2803 should be checked. Here, it should be noted that the toner consumption table 2803 is used to judge which job should be selected next to minimize the unevenness. In any case, it is possible to find from the toner consumption table 2803 that the deviation is least with respect to the job #5. Thus, by repeating such operations with respect to toner consumption amount tables 2804, 2805, 2806 and 2807, it is possible to know that the job #1→the job #4→the job #5→the job #2→the job #3→the job #7→the job #6 should be selected in due order to minimize the unevenness.

Figure 30:
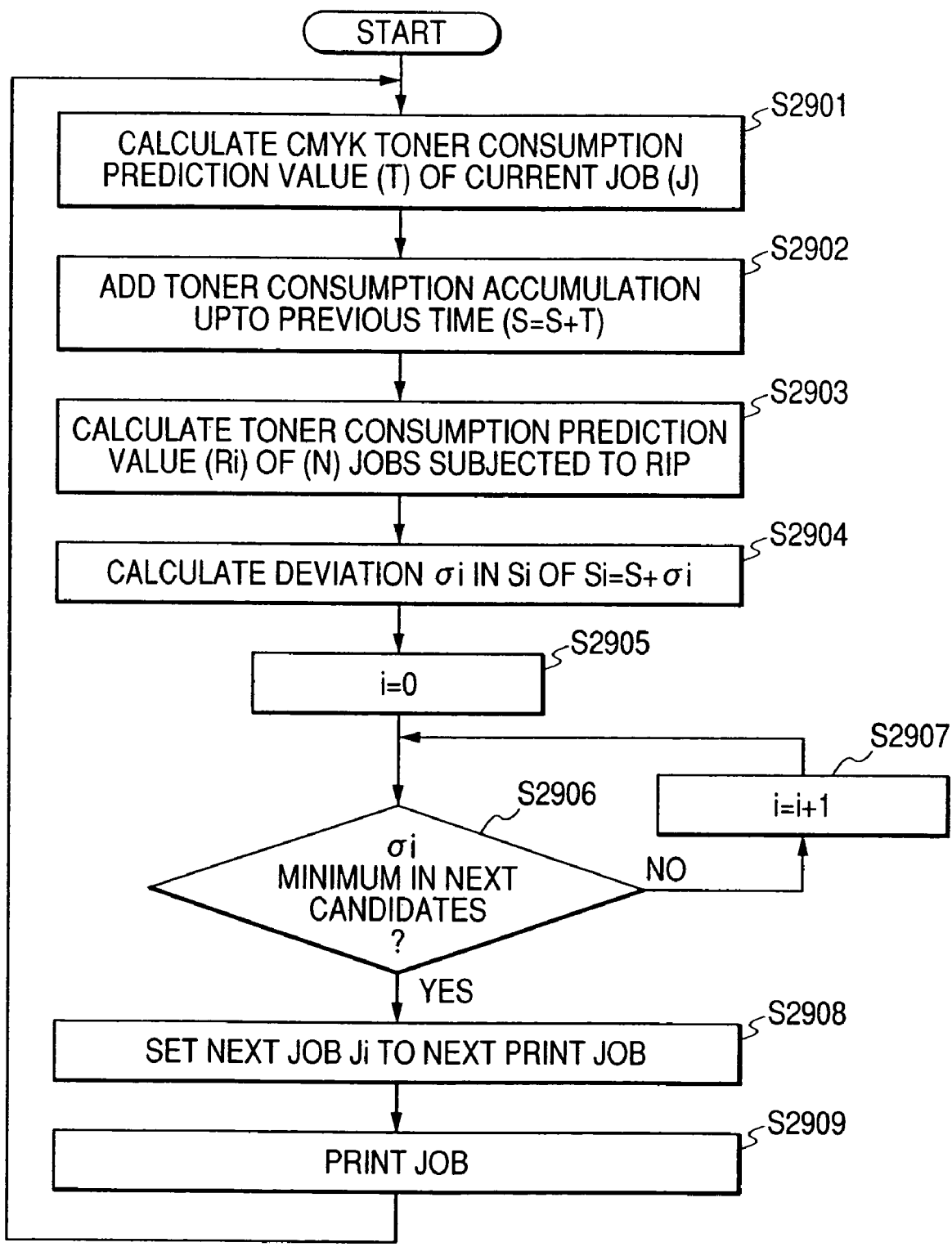
FIG. 30 is a flow chart showing an example of a fifth data processing procedure to be executed in the image processing device according to the present invention.

FIG. 30 is a flow chart showing an example of a fifth data processing procedure to be executed in the image processing device according to the present invention. Here, it should be noted that the fifth data processing procedure corresponds to the processing procedure for adjusting the job output schedule based on the job processing module read from the memory unit 210 by the core unit 206. Incidentally, symbols S2901, S2902, S2903, S2904, S2905, S2906, S2907, S2908 and 2909 denote respective steps.

Initially, in the step S2901, the CMYK toner consumption prediction value (T) of the current job (J) is calculated by the core unit 206 with reference to the pixel information handled by the RIP unit 503. Next, in the step S2902, the toner consumption accumulation value (S) up to the previous job is subjected to the addition process (S=S+T) by the core unit 206. Subsequently, in the step S2903, the toner consumption prediction values (Ri) of the jobs (N jobs) already subjected to the process of the RIP and stored in the RAM 508 are calculated by the core unit 206 with reference to the pixel information handled by the RIP unit 503.

Next, in the step S2904, the deviation σi at Si (Si=S+Ri) is calculated by the core unit 206 based on the toner consumption prediction value (Ri).

Then, in the step S2905, the parameter i is set to "0" by the core unit 206, and, in the step S2906, it is judged by the core unit 206 whether or not the deviation σi is minimum in the next candidates. If it is judged by the core unit 206 that the deviation σi is not minimum, the flow advances to the step S2907. In the step S2907, the parameter i is incremented by "1" by the core unit 206, and the flow returns to the step S2906.

Meanwhile, if it is judged in the step S2906 that the deviation σi is minimum in the next candidates, the flow advances to the step S2908. In the step S2908, the next job Ji is set as the next print job by the core unit 206, and, in the step S2909, the next job Ji is subjected to the printing by the printer unit 208. Then, the flow returns to the step S2901.

Incidentally, it should be noted that, in the present embodiment, the job of which the deviation σi is simply minimum is selected as the next candidate.

However, in the actual control operation shown in FIG. 30, the process by the RIP unit 503 and the printing by the printer unit 208 are executed simultaneously. Thus, if these processes are repeated, there is a fear that the job not subjected to the printing and the job always operated later come out, whereby it is necessary to change the process as shown in FIG. 31.

Figure 31:
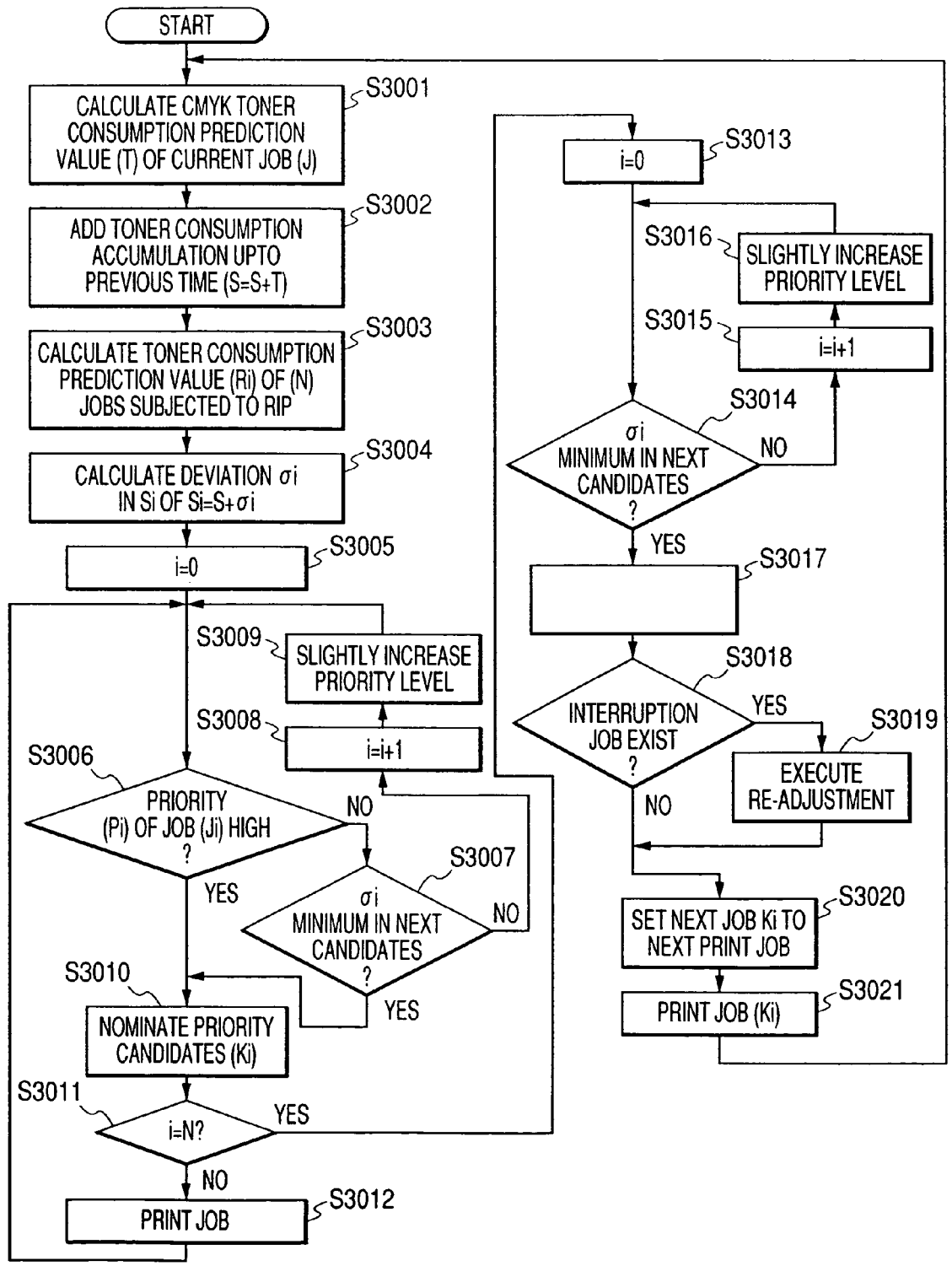
FIG. 31 is a flow chart showing an example of a sixth data processing procedure to be executed in the image processing device according to the present invention.

FIG. 31 is the flow chart showing an example of a sixth data processing procedure to be executed in the image processing device according to the present invention. Here, it should be noted that the sixth data processing procedure corresponds to the processing procedure for adjusting the job output schedule based on the job processing module read from the memory unit 210 by the core unit 206. Incidentally, symbols S3001, S3002, S3003, S3004, S3005, S3006, S3007, S3008, S3009, S3010, S3011, S3012, S3013, S3014, S3015, S3016, S3017, S3018, S3019, S3020 and S3021 denote respective steps.

Initially, in the step S3001, the CMYK toner consumption prediction value (T) of the current job (J) is calculated by the core unit 206 with reference to the pixel information handled by the RIP unit 503. Next, in the step S3002, the toner consumption accumulation value (S) up to the previous job is subjected to the addition process (S=S+T) by the core unit 206. Subsequently, in the step S3003, the toner consumption prediction values (Ri) of the jobs (N jobs) already subjected to the process of the RIP and stored in the RAM 508 are calculated by the core unit 206 with reference to the pixel information handled by the RIP unit 503.

Next, in the step S3004, the deviation σi at Si (Si=S+Ri) is calculated by the core unit 206 based on the toner consumption prediction value (Ri).

Then, in the step S3005, the parameter i is set to "0" by the core unit 206, and, in the step S3006, it is judged by the core unit 206 whether or not the priority (Pi) of the job (Ji) is high. If it is judged by the core unit 206 that the priority (Pi) of the job (Ji) is not high, the flow advances to the step S3007. In the step S3007, it is judged by the core unit 206 whether or not the deviation σi is minimum in the next candidates. If it is judged by the core unit 206 that the deviation σi is not minimum, the flow advances to the step S3008. In the step S3008, the parameter i is incremented by "1". Then, the priority level is slightly increased in the step S3009, and the flow returns to the step S3006.

Meanwhile, if it is judged in the step S3007 that the deviation σi is minimum in the next candidates, or if it is judged in the step S3006 that the priority (Pi) of the job (Ji) is high, the primary candidate job (Ki) is nominated in the step S3010. Then, it is judged in the step S3011 whether or not the parameter i conforms to N. If it is judged that the parameter i does not conform to N, the parameter i is incremented by "1" in the step S3012, and the flow returns to the step S3006.

Meanwhile, if it is judged in the step S3011 that the parameter i conforms to N, then the parameter i is incremented to "0" in the step S3013. Subsequently, in the step S3014, it is judged whether or not the deviation σi is minimum in the next candidates. If it is judged that the deviation σi is not minimum, the flow advances to the step S3015. In the step S3015, the parameter i is incremented by "1". Then, the priority level is slightly increased in the step S3016, and the flow returns to the step S3014.

Meanwhile, if it is judged in the step S3014 that the deviation σi is minimum in the next candidates, the primary candidate job (Ki) is nominated as the candidate of the next job in the step S3017. Then, it is judged by the core unit 206 in the step S3018 whether or not the interruption job currently occurs, with reference to the job management table recorded on the RAM 508. If it is judged that the interruption job does not currently occur, the primary candidate job (Ki) is set as the next print job in the step S3020. Then, in the step S3021, the primary candidate job (Ki) is subjected to the printing by the printer unit 208, and the flow returns to the step S3001.

Meanwhile, if it is judged in the step S3018 that the interruption job currently occurs, the job schedule is reset in the step S3109. More specifically, the priority level of the interruption job is increased, and the output order of the jobs managed on the table are re-adjusted. Then, the flow advances to the step S3020.

Thus, in the job scheduling process by the core unit 206, the priority order of the job which has taken a backseat is increased in the step S3009, whereby the print order of the relevant job turns sooner or later.

In fact, when it is detected in the step S3018 that the interruption job of which the priority level has been increased beforehand is brought into the MFP, it is important in the step S3019 to adapt to such a change of the job request. More specifically, it is important to review the job output order even in the print queue already ordered.

Also, when the jobs of which the whole densities are high continue, or even when the jobs of which the whole densities are low continue, the image quality deteriorates at the transition point, and/or the lifetime of the image forming device becomes short.

Figure 32:
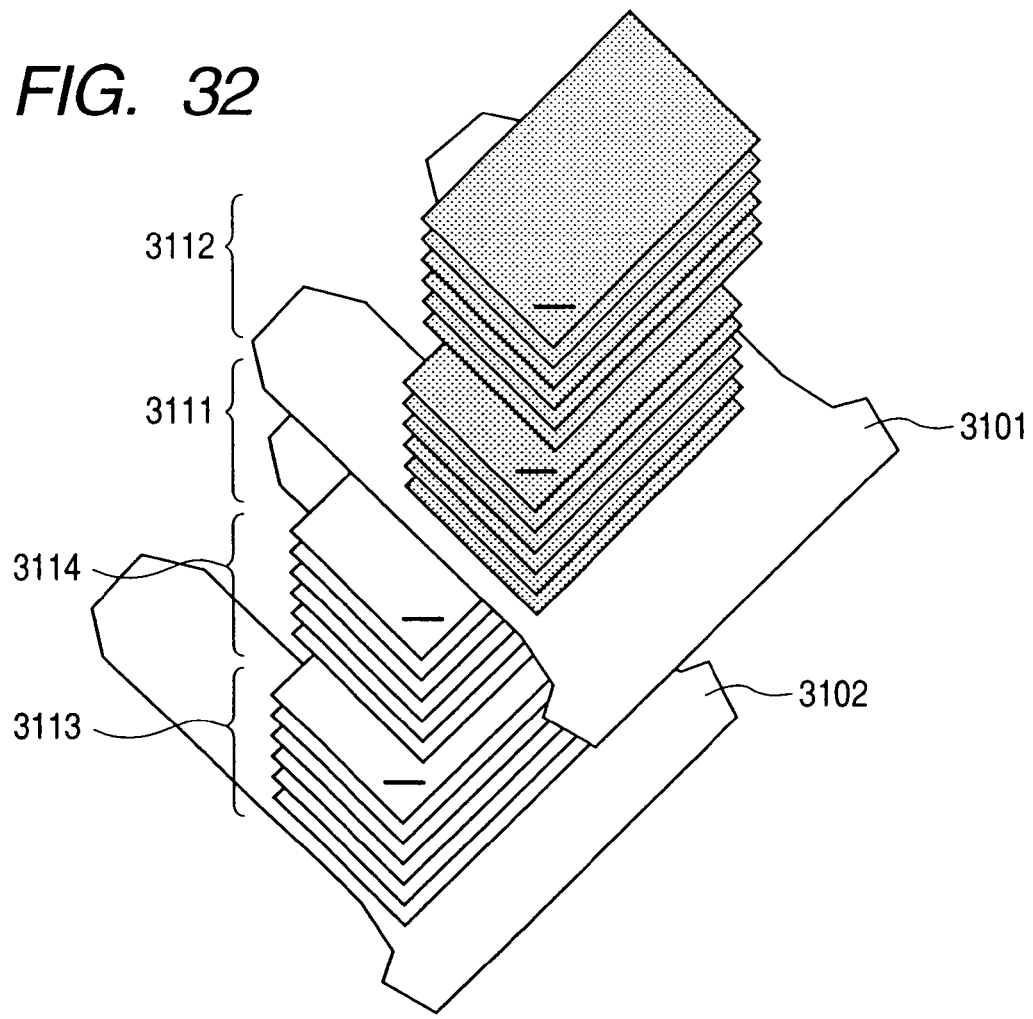
FIG. 32 is a main portion perspective diagram for explaining the jot output paper discharge state of the printer shown in FIG. 2.

Therefore, as shown in FIG. 32, when the job of the high density (or called the high-density job) and the job of the low density (or called the low-density job) are discharged, if it is controlled by the core unit 206 to discharge these jobs in the order of a fist copy 3111 of the high-density job, a first copy 3113 of the low-density job, a second copy 3112 of the high-density job and a second copy 3114 of the low-density job, then it is possible to eliminate such a problem as above. Incidentally, numerals 3101 and 3102 respectively denote trays.

FIG. 32 is the main portion perspective diagram for explaining the jot output paper discharge state of the printer shown 208 in FIG. 2.

Here, it is supposed that the job of which the toner consumption amount is extremely large and the job of which the toner consumption amount is extremely small are alternately brought into the MFP. In such a case, when the image for which the toner consumption amount is small is formed, the supply of the toner into the developing unit becomes excessive easily. Thus, so-called toner packing occurs due to the aggregation of the toner in the vicinity of the development sleeve. Then, if the toner packing continues, it becomes difficult for the toner to be supplied to the development sleeve. In addition, the load to the toner becomes large, whereby the toner itself deteriorates.

Meanwhile, when the image for which the toner consumption amount is large is formed, the supply of the toner into the developing unit becomes short. Thus, the unevenness occurs in the pitch of the agitation screw, whereby the whole image will deteriorate. In addition, since the toner amount in the development unit has to be returned to the defined state, it is necessary to supply the necessary toner to the development unit as interrupting the JOB, whereby the performance is sacrificed.

In any case, it is important to execute, in consideration of the toner consumption, the scheduling of the jobs in a balanced manner. To do so, the toner consumption prediction amount is calculated in the preflight before the process of the RIP or the process of the RIP, and/or the number of bits of the video is counted in the actual printing. Then, if the calculated value and/or the counted value reach a certain reference value, the jobs are exchanged and/or the scheduling is executed beforehand so that the toner consumption is distributed in a balanced manner, whereby it is possible to flexibly deal with the relevant problems.

Fourth Embodiment

As described above, in case of changing the gloss by the fixing speed, it is possible to prevent the decrease of the productivity due the decrease of the fixing temperature if the fixing speed is alternatively changed in such a manner as high→low→high→low→high→low→high→low.

Here, the higher the fixing speed is, the more abrupt the temperature decrease is. For this reason, it is necessary to output the job on the condition that the performance is the highest from the overall viewpoint.

In consequence, in case of controlling the job output schedule in the above manner, the scheduling of the jobs is executed by the core unit 206 so that the high-gloss printing and the low-gloss printing are averaged.

Thus, to change the gloss, it is important how the heat capacity to be applied to the toner should be changed by changing, for example, the fixing temperature or the fixing speed. In general, a certain period of time is necessary to increase or decrease the fixing temperature. For this reason, when it intends to execute the control based on the fixing temperature, the productivity decreases if the control is not executed in such a manner as high→high→high→high→temperature change→low→low→low→low.

On the contrary, in case of changing the heat capacity by changing the fixing speed, it is possible to prevent the decrease of the productivity due to the decrease of the fixing temperature by changing the fixing speed alternatively in such a manner as high→low→high→low→high→low→high→low. Here, the higher the fixing speed is, the more abrupt the temperature decrease is. For this reason, it is necessary to output the job on the condition that the performance is the highest from the overall viewpoint. That is, to solve such a problem, according to the present embodiment, in case of changing the fixing speed, the job scheduling is executed so that the gloss conditions are concentrated or converged. On the other hand, in case of changing the fixing speed, the job scheduling is executed so that the high-gloss printing and the low-gloss printing are averaged. Thus, it is possible to flexibly deal with the relevant problem.

Fifth Embodiment

Further, in a case where a glue bind process to be used in the post-process such as case binding or the like is executed, it is well known that it often takes time until a glue dries. For this reason, a finish becomes beautiful or fair if the time between the successive jobs is prolonged as much as possible.

Thus, if the jobs of the non-sort process and the jobs of the case binding are biasedly input as shown in the post-process column of FIG. 20A, the jobs are averaged as much as possible as shown in FIG. 20B, whereby it is possible to solve such a problem.

Incidentally, the glue bind process in the case binding is explained in the present embodiment. However, if it is better to execute the scheduling by executing the averaging in another process such as a stapling process, a punching process or the like, it is possible to exchange the job order in that process as well as the above.

Sixth Embodiment

In the above first embodiment, the attribute of the job is judged, that is, it is judged whether the job color information represents the color job or the black-and-white (monochrome) job, the judged job color information is stored in the memory unit 210 or the like, and the schedule of the job output order in the queue is adjusted based on the stored information. Thus, it is possible to limit that the driving of the hardware resources of the MFP is biasedly controlled, and it is also possible to adjust the job output schedule to be able to suppress that the color characteristic to be reproduced changes. Aside from this, as shown in FIGS. 20A and 20B, if two or more parameters, such as the color job and the black-and-white job in the data classification, the non-sort process and the case binding process in the post-process, and the like, are mixed as the job attributes, it is possible to give the priority order to each of these parameters and execute the job smoothing scheduling process, and it is also possible to set the threshold with respect to each parameter and execute the job scheduling on the ground that the order of the job is exchanged every time the parameter exceeds the relevant threshold. Hereinafter the sixth embodiment will be explained.

Figure 33:
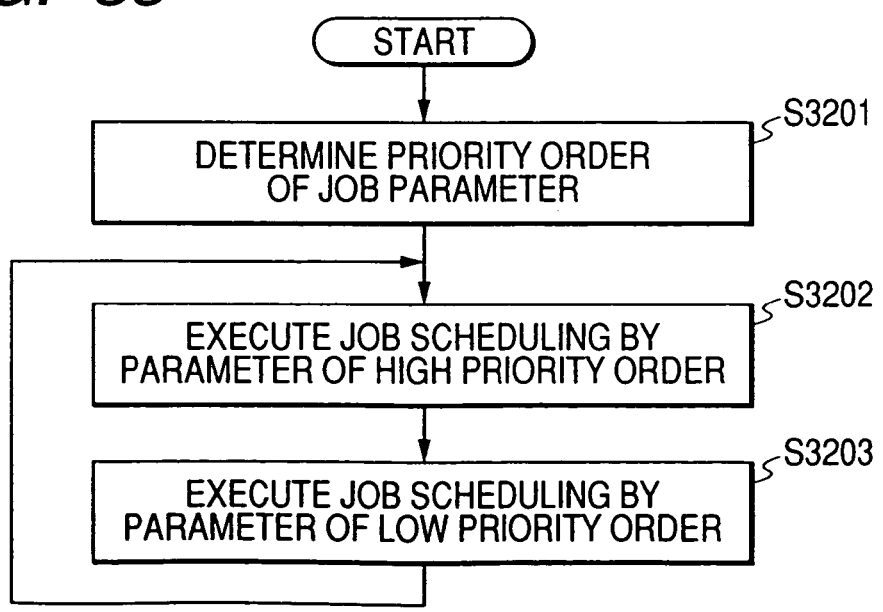
FIG. 33 is a flow chart showing an example of a seventh data processing procedure to be executed in the image processing device according to the present invention.

FIG. 33 is a flow chart showing an example of a seventh data processing procedure to be executed in the image processing device according to the present invention. Here, it should be noted that the seventh data processing procedure corresponds to the processing procedure for adjusting the job output schedule based on the job processing module read from the memory unit 210 by the core unit 206. Incidentally, symbols S3201, S3202 and S3203 denote respective steps.

First, in the step S3201, the priority order of the job parameter concerning the job status (for example, the parameter displayed as the job status shown in FIG. 2.8) stored in the RAM 508 is determined by the core unit 206. Then, in the step S3202, the job scheduling of the job which has been stored with the job parameter of the high priority order is executed.

Next, in the step S3203, the job scheduling of the job which has been stored with the job parameter of the low priority order is executed, and the flow returns to the step S3202.

Figure 34:
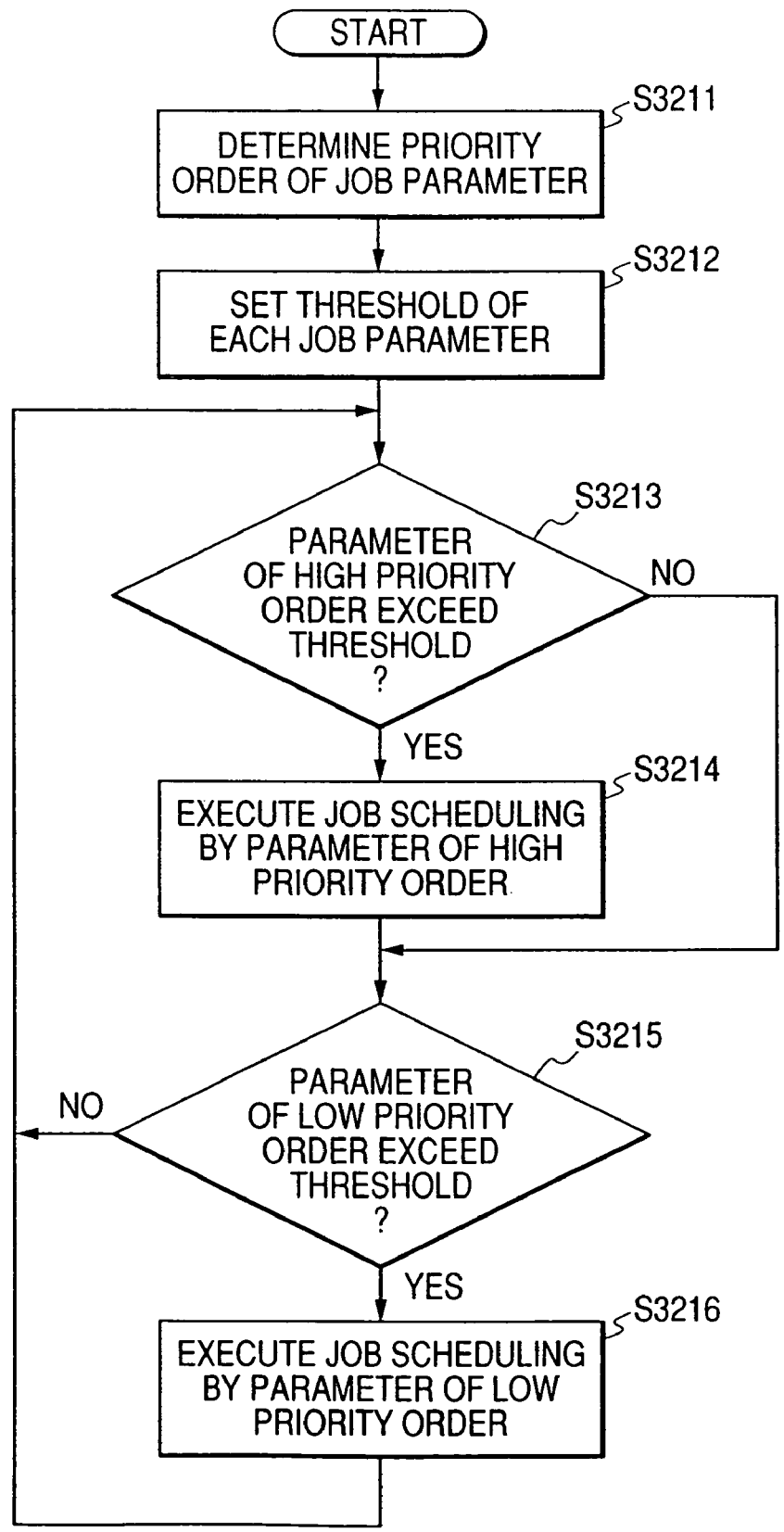
FIG. 34 is a flow chart showing an example of an eighth data processing procedure to be executed in the image processing device according to the present invention.

FIG. 34 is a flow chart showing an example of an eighth data processing procedure to be executed in the image processing device according to the present invention. Here, it should be noted that the eighth data processing procedure corresponds to the processing procedure for adjusting the job output schedule based on the job processing module read from the memory unit 210 by the core unit 206. Incidentally, symbols S3211, S3212, S3213, S3214, S3215 and S3216 denote respective steps.

First, in the step S3211, the priority order of the job parameter concerning the job status (for example, the parameter displayed as the job status shown in FIG. 28) stored in the RAM 508 is determined by the core unit 206. Then, in the step S3212, the threshold of each job parameter is set. Next, in the step S3213, it is judged whether or not the parameter of the high priority order exceeds the relevant threshold. If it is judged that the parameter of the high priority order does not exceed the relevant threshold, the flow advances to the step S3215.

Meanwhile, if it is judged in the step S3213 that the parameter of the high priority order exceeds the relevant threshold, the flow advances to the step S3214. In the step S3214, the job scheduling of the job which has been stored with the job parameter of the high priority order is executed by the core unit 206.

Subsequently, in the step S3215, it is judged whether or not the parameter of the low priority order exceeds the relevant threshold. If it is judged that the parameter of the low priority order does not exceed the relevant threshold, the flow advances to the step S3213.

Meanwhile, if it is judged in the step S3215 that the parameter of the low priority order exceeds the relevant threshold, the flow advances to the step S3216. In the step S3216, the job scheduling of the job which has been stored with the job parameter of the low priority order is executed by the core unit 206. After then, the flow returns to the step S3213.

As above, the various constructions according to the present invention are explained. In addition, several examples of the characteristic constructions will be explained hereinafter.

For example, the storage unit is controlled by the control unit (e.g., the core unit 206 shown in FIG. 2) according to the embodiments of the present invention. For example, the data of the plural jobs such as the first job in which the first processing condition was set, the second job in which the first processing condition was set, the third job in which the second processing condition different from the first processing condition was set, and the like are stored in the storage unit. Besides, the control unit causes the printer unit to execute the printing process.

As one example of the job processing method which is premised on the construction of the image processing system including the above image processing device, the following control can be executed by the control unit. More specifically, in the case where the image processing device is operated in the first sequence of the first sequence and the second sequence, it is controlled to cause the image processing device to finish the printing process of the third job after both the printing process of the first job and the printing process of the second job are executed. On the other hand, in the case where the image processing device is operated in the second sequence of the first sequence and the second sequence, it is controlled to cause the image processing device to start the printing process of the third job before at least the printing process of the second job is finished.

Moreover, on the premise of the above construction, the following control is executed by the control unit in the following case. For example, in both the case where the image processing device is operated in the first sequence and the case where the data of the third job is stored in the storage unit after the data of the first job and the data of the second job were stored in the storage unit, the control unit controls to cause the image processing device to finish the printing process of the third job after both the printing process of the first job and the printing process of the second job are executed. On the other hand, in both the case where the image processing device is operated in the second sequence and the case where the data of the third job is stored in the storage unit after the data of the first job and the data of the second job were stored in the storage unit, the control unit controls to cause the image processing device to start the printing process of the third job at least before the printing process of the second job is finished.

Moreover, on the premise of the above construction, the following control is executed by the control unit in the case where the image processing device is operated in the first sequence. For example, the control unit controls to cause the image processing device to execute the printing process of the third job on the premise of causing the image processing device to execute the printing process of the second job after the first job. On the other hand, in the case where the image processing device is operated in the second sequence, the control unit controls to cause the image processing device to start the printing process of the third job after executing the printing process of the first job and before starting the printing process of the second job.

Moreover, on the premise of the above construction, the control unit handles the following jobs as the jobs to be controlled. For example, the first job includes the job that color printing has been set as the first processing condition, the second job includes the job that the color printing has been set as the first processing condition, and the third job includes the job that monochrome printing has been set as the second processing condition.

Besides, the control unit handles the following jobs in addition to the above jobs. For example, the first job includes the job that a predetermined paper (sheet) process (for example, the finishing process such as the case binding, the punching process or the like) has been set as the first processing condition, the second job includes a job that the predetermined paper (sheet) process has been set as the first processing condition, and the third job includes a job that the predetermined paper (sheet) process is not set as the second processing condition.

Moreover, the control unit controls the storage unit to be able to store the data of the plural jobs including at least any one of the data of the job from the original reader and the data of the job from the external device. Then, the control unit controls the image processing device to be able to execute the print process of the data of the job of such kinds.

Moreover, on the premise of the above construction, the control unit causes the operation unit of the image processing device and/or the display unit of the external device such as the host computer or the like, being the example of the user interface unit, to display the list concerning the jobs to be printed from among the jobs stored in the storage unit.

Moreover, on the premise of the above construction, the control unit causes the user, through the user interface unit, to be able to select, from the first sequence and the second sequence, the sequence to be executed.

Moreover, on the premise of the above construction, after causing the user interface unit to execute the list display of the jobs, the control unit enables from the user to receive through the user interface unit the indication to select either one of the first sequence and the second sequence.

Thus, it is possible to attain the various effects according to the embodiments of the present invention, and it is also possible to further improve the usability.

As above, the various examples and the embodiments of the present invention are explained. However, the purposes and the scope of the present invention are not limited to the specific explanations described in the present application. That is, it is needless to say that the present invention may include the following embodiments.

For example, the image processing device (or the whole system) in which the plural print jobs transmitted from the plural data processing devices through the predetermined communication medium can be stored in the storage unit (for example, the memory unit 210) is controlled by the control unit (for example, the core unit 206 shown in FIG. 2). Here, the control unit analyzes the attribute of each print job stored in the storage unit, and then adjusts the output schedule of each print job stored in the storage unit so that the print jobs respectively having the similar attributes are not continuously printed (see the process of the step S1933 in the flow chart of FIGS. 18A and 18B).

Thus, it is possible to prevent the deterioration of the image quality because of the processing of a large amount of jobs of the similar attributes. Moreover, it is possible to adjust the job schedule so as to improve the durability of each unit, by smoothing the use conditions of each unit of executing the print job. In addition, in the image processing environment of processing a large amount of print jobs, it is possible to acquire the stable and high-quality print results.

Moreover, on the premise of the above construction, the control unit causes to adjust the output schedule of each print job by switching the first output sequence as the first sequence of outputting the print jobs in the order of storage in the storage unit and the second output sequence as the second sequence of outputting the print jobs in the order different from the order of storage in the storage unit.

Thus, it is possible to prevent the deterioration of the image quality because of the processing of a large amount of jobs of the similar attributes, whereby it is possible to eliminate the situation that the print jobs of the similar attributes are biasedly output.

Moreover, on the premise of the above construction, the control unit judges whether or not there is a certain bias in the similarity of the attributes of the print jobs (for example, see the steps S2215 and S2218 of FIG. 22 to be executed by the core unit 206 of FIG. 2). Then, the control unit selects the second output sequence when it is judged that there is the certain bias in the similarity of the attributes of the print jobs. Meanwhile, the control unit selects the first output sequence when it is judged that there is no certain bias in the similarity of the attributes of the print jobs. That is, the control unit controls such sequence switching (for example, see the steps S2215 and S2218 of FIG. 22 to be executed by the core unit 206 of FIG. 2).

Thus, if there is the certain bias in the similarity of the attributes of the print jobs, it is possible to adjust the job schedule so as to interrupt the continuity of these jobs and fit therein another job having no similarity. Therefore, it is possible to reduce the degradation of the image quality and the load of the durability due to the biased similarity of the attributes of the print jobs.

Moreover, on the premise of the above construction, the control unit judges whether or not the output mode (the job in the step S2202 of FIG. 21 being the color mode) indicated by the attribute of the print job stored in the storage unit or the use range (for example, the step S2602 of FIG. 26) of the predetermined unit operating in case of outputting the print job is biased.

Thus, if the similar output modes as the attributes of the print jobs continue, it is possible to interrupt such continuity. Also, it is possible to adjust the job schedule so as to fit in the continued output modes the job of the output mode having no similarity. By the above construction, it is possible to reduce the degradation of the image quality and the load of the durability due to the biased similarity of the attributes of the print jobs.

Moreover, on the premise of the above construction, in the case where the jobs of which the attributes of using one of the plural units for a long period of time are similar are continuously output, the control unit judges that there is the certain bias in the similarity of the attributes of the print jobs.

Thus, in addition to the transitional similarity, if the similar output modes of using the same unit for a long period of time continue, it is possible to interrupt such continuity. Moreover, it is possible to adjust the job schedule so as to fit therein the job of the output mode having no similarity. By the above construction, it is possible to reduce the degradation of the image quality and the load of the durability due to the biased similarity of the attributes of the print jobs.

Moreover, on the premise of the above construction, in the case where the jobs of which the attributes of using one of plural output modes for a long period of time are similar are continuously output, the control unit judges that there is the certain bias in the similarity of the attributes of the print jobs.

Thus, in addition to the transitional similarity, if the similar output modes of using the same output mode for a long period of time continue, it is possible to interrupt such continuity. Moreover, it is possible to adjust the job schedule so as to fit therein the job of the output mode having no similarity. By the above construction, it is possible to reduce the degradation of the image quality and the load of the durability due to the biased similarity of the attributes of the print jobs.

Moreover, on the premise of the above construction, the control unit causes the image processing device to execute the job process in the various output modes including the color output mode and the black-and-white (monochrome) output mode.

Thus, in addition to the transitional similarity, if the similar output modes of using the color output mode for a long period of time continue, it is possible to interrupt such continuity. Moreover, it is possible to adjust the job schedule so as to fit therein the job of the black-and-white output mode having no similarity. By the above construction, it is possible to reduce the degradation of the image quality and the load of the durability due to the biased similarity of the attributes of the print jobs.

Moreover, on the premise of the above construction, the control unit handles, as the control target job, the job which uses any one of the various units including the plural paper feeding units of respectively feeding the different sized recording media and the post-processing unit of executing the predetermined post-process to the recording media.

Thus, if the similar output modes of using the post-processing unit for a long period of time continue based on the setting of the print job, it is possible to interrupt such continuity. Moreover, it is possible to adjust the job schedule so as to fit therein the job of not using the post-processing unit having no similarity. By the above construction, it is possible to reduce the degradation of the image quality and the load of the durability due to the biased similarity of the attributes of the print jobs.

Moreover, on the premise of the above construction, the control unit calculates the amount of consumption of each coloring agent to be developed, by analyzing the print job (see the processes of the steps S2901 to S2904 of the flow chart of FIG. 30 to be executed by the core unit 206 of FIG. 2). Then, the control unit judges based on the calculated result that there is the certain bias in the amount of consumption of each coloring agent in the color output mode.

Thus, in the case where the similar output modes of using the color output mode for a long period of time continue, if the consumption states of the respective color toners become scattered, it is possible to change the order of the print jobs. Moreover, it is possible to adjust the job schedule of the output jobs of the color mode so as to smoothen the consumption states of the respective color toners. Thus, it is possible to reduce the degradation of the image quality and the load of the durability due to the biased similarity of the attributes of the print jobs.

Moreover, on the premise of the above construction, the control unit judges that there is the bias in the use range of the predetermined unit based on the relative relationship between the transportation-direction width of the recording medium selected based on the attribute of the print job and the passing width of the effective fixing area of the heat fixing unit of executing the heat fixing process to the recording medium.

Thus, in addition to the transitional similarity, if the similar output modes of continuing for a long period of time the state that the recording medium of which the width is shorter than the effective fixing area of the heat fixing unit is supplied, it is possible to interrupt such continuity. Moreover, it is possible to adjust the job schedule so as to fit therein the job in which the recording medium (paper) of which the whole width is equivalent to the effective fixing area of the heat fixing unit is designated. Thus, it is possible to reduce the degradation of the image quality and the load of the durability due to the biased similarity of the attributes of the print jobs.

Moreover, on the premise of the above construction, the control unit judges whether or not there is the bias in the plural parameters of determining the output mode of the print job (for example, see the processes of the steps S3201 to S3203 of the flow chart of FIG. 33 to be executed by the core unit 206 of FIG. 2). Then, the control unit changes the output order of the respective print jobs by setting the priority order to the respective parameters, based on the result of the judgment of the bias.

Thus, the output order of the respective print jobs is changed by setting the priority order to the respective parameters, whereby it is possible to adjust the job schedule as judging the comprehensive affection by weighting the parameters of loading the image quality and the durability due to the continuity of the use state of the output modes or the units. Thus, it is possible to reduce the degradation of the image quality and the load of the durability due to the biased similarity of the attributes of the print jobs.

As the job processing method in the image processing system including the above image processing device, the characteristic construction may be provided as in the above embodiments.

By adopting the above constructions, it is possible to deal with the problems described in the related background art. Moreover, for example, it is possible to construct the flexible device environment in consideration of the various use environments such as the POD environment, the office environment and the like. Moreover, for example, in the market of the POD (print on demand), it is supposed that the large jobs or the biased jobs are often continuously brought into the device. Therefore, to eliminate such a situation, it is possible not to bias the kinds and/or attributes of the jobs. Moreover, for example, it is possible to suppress the above situation by changing the order of the already prepared jobs and/or scheduling the already prepared jobs.

Besides, in the market of the POD, unlike the office environment, the output of the input jobs need not necessarily follow the order of input of the jobs. That is, it only has to finish up a certain amount of jobs during a certain period of time. For this reason, it is supposed to be often flexible with the process at the operator's discretion. Then, according to the present invention, it is possible to flexibly deal with such a situation. In the above POD environment, it is possible to provide the method which is gentle or good for the device or the means which is highly effective to how to use the enduring device.

Moreover, for example, it is possible to deal with the various problems which may occur when a large amount of print jobs of the similar attributes are processed. Further, it is possible to prevent the deterioration of the image quality, and it is also possible to adjust the suitable job schedule so as to be able to smoothen the use condition of each unit of processing the print job and increase the durability of each unit. In addition, for example, it is possible to efficiently execute the high-reliability image process capable of acquiring the stable and high-quality print result in the image processing environment of massively processing a large amount of print jobs.

Hereinafter, the construction of the data processing program capable of being read by the print device according to the present invention will be explained with reference to a memory map shown in FIG. 35.

FIG. 35 is the diagram for explaining the memory map of the storage medium which stores the various data processing programs capable of being read by the print device according to the present invention.

Although it is not specifically shown in the drawings, the information for managing the program group to be stored in the storage medium, for example, the version information and the information in which the creator or the like is stored and depending on the OS (Operating System) or the like at the side of reading out the programs, for example, the icon or the like for discriminatingly displaying programs are also sometimes stored.

Further, the data subordinate to the various programs is managed by the above directory. In a case that the program used for installing the various programs into the computer or the program to be installed is compressed, the program used for extraction is also sometimes stored.

The functions shown in FIGS. 18, 21, 22, 26, 27, 30, 31, 33 and 34 in the embodiments may be executed by the host computer according to the programs installed from the external devices. In that case, the present invention is applicable in a case that the information group including the programs is supplied to the output device by the storage medium such as a CD-ROM, a flash memory, an FD (Floppy™ disk) or the like, or from the external storage medium through the network.

As above, it is needless to say that the object of the present invention can be achieved in a case where the storage medium recording the program codes of software for realizing the functions of the above embodiments is supplied to a system or an apparatus and then a computer (or CPU or MPU) in the system or the apparatus reads and executes the program codes stored in the storage medium.

In that case, the program codes themselves read from the storage medium realize the new functions of the present invention, and the storage medium storing such the program codes constitutes the present invention.

Therefore, any form of the program, such as an object code, a program executed by the interpreter, script data or the like to be supplied to the OS is available without inquiring a program form if having the function of a program.

As the storage medium for supplying the programs, for example, a flexible disk, a hard disk, an optical disk, a magnetooptical disk, an MO, a CD-ROM, a CD-R, a CD-RW, a magnetic tape, a nonvolatile memory card, a ROM, a DVD or the like can be used.

In that case, the program codes themselves read from the storage medium realize the functions of the above embodiments, and the storage medium storing such the program codes constitutes the present invention.

As another method of supplying the programs, which can be also supplied by downloading the computer program itself of the present invention or the file which is compressed and includes the automatic installing function into the storage medium such as the hard disk or the like from the homepage by connecting to the homepage on the Internet by using the browser of the client computer. Further, the supplying of the programs can be also realized by dividing the program codes constituting the program of the present invention into the plural files and downloading the respective files from different homepage. That is, a WWW server, an ftp (file transfer protocol) server or the like, which makes the plural users to download the program files for realizing the functional processes of the present invention by the computer, is also included in appended claims of the present invention.

The programs of the present invention which are encoded and stored in the storage media such as the CD-ROM or the like are distributed to the users, and the key information for solving the encoded programs is made to be downloaded for the specific user who clears the predetermined condition from the homepage through the Internet, and that user executes the encoded programs by using the key information to install the programs into the computer. Thus, the supplying of the programs can be also realized.

It is needless to say that the present invention also includes not only a case where the functions of the above embodiments are realized by the execution of the program codes read by the computer, but also a case where an OS (operating system) or the like functioning on the computer executes all the process or a part thereof according to the instructions of the program codes, thereby realizing the functions of the above embodiments.

Further, it is needless to say that the present invention includes a case where the program codes read from the storage medium are once written in the memory provided in a function expansion board inserted in the computer or a function expansion unit connected to the computer, then the CPU or the like provided in the function expansion board or the function expansion unit executes all the process or a part thereof according to the instructions of the program codes, thereby realizing the functions of the above embodiments.

The present invention is not limited to the above embodiments, but can be modified in various manners (including an organic combination of embodiments) on the basis of the spirit of the present invention, and the various modifications are not excluded from the scope of the present invention.

This application claims priority from Japanese Patent Application No. 2004-266880 filed Sep. 14, 2004, which is hereby incorporated by reference herein.

What is claimed is:

1. A job processing method of a system which includes an image processing device for executing a printing process of data of a job of a storage unit for storing data of plural jobs, said method comprising the steps of:

storing data of plural jobs on a storage unit,
wherein data includes at least one of a first job where a first processing condition was set, a second job where the first processing condition was set and a third job where a second processing condition different from the first processing condition was set;

analyzing an attribute of each print job stored in the storage unit;

adjusting an output schedule of each print job stored in the storage unit so that the print jobs respectively having similar attributes are not continuously printed;

said adjusting including:

judging whether or not there is a certain bias in the similarity of the attributes of the print jobs;

selecting the second sequence in a case where it is judged that there is the certain bias in the similarity of the attributes of the print jobs; and selecting the first sequence in a case where it is judged that there is no certain bias in the similarity of the attributes of the print jobs;

causing an image processing device to finish the printing process of the third job after both the printing process of the first job and the printing process of the second job are executed, in a case where the image processing device is operated in a first sequence of the first sequence and a second sequence; and causing the image processing device to start the printing process of the third job before at least the printing process of the second job is finished, in a case where the image processing device is operated in the second sequence of the first sequence and the second sequence.

2. A job processing method according to claim 1, further comprising the steps of:

causing the image processing device to finish the printing process of the third job after both the printing process of the first job and the printing process of the second job are executed, in both the case where the image processing device is operated in the first sequence and a case where the data of the third job is stored in the storage unit after the data of the first job and the data of the second job were stored in the storage unit; and causing the image processing device to start the printing process of the third job at least before the printing process of the second job is finished, in both the case where the image processing device is operated in the second sequence and the case where the data of the third job is stored in the storage unit after the data of the first job and the data of the second job were stored in the storage unit.

3. A job processing method according to claim 2, further comprising the steps of:

causing the image processing device to execute the printing process of the third job on the premise of causing the image processing device to execute the printing process of the second job after the first job, in the case where the image processing device is operated in the first sequence; and causing the image processing device to start the printing process of the third job after executing the printing process of the first job and before starting the printing process of the second job, in the case where the image processing device is operated in the second sequence.

4. A job processing method according to claim 2, wherein the first job includes a job that color printing has been set as the first processing condition, the second job includes a job that the color printing has been set as the first processing condition, and the third job includes a job that monochrome printing has been set as the second processing condition.

5. A job processing method according to claim 2, wherein the first job includes a job that a predetermined paper process has been set as the first processing condition, the second job includes a job that the predetermined paper process has been set as the first processing condition, and the third job includes a job that the predetermined paper process is not set as the second processing condition.

6. A job processing method according to claim 1, wherein the output schedule of each print job can be adjusted by selectively executing a first output sequence as the first sequence of outputting the print jobs in the order of storage in the storage unit and a second output sequence as the second sequence of outputting the print jobs in the order different from the order of storage in the storage unit.

7. A job processing method according to claim 1, wherein at least either one of judgment as to a use condition in an output mode indicated by the attribute of the print job stored in the storage unit and judgment as to a use condition of a predetermined unit operating in case of outputting the print job is executed.

8. A job processing method according to claim 7, wherein the output mode includes any one of a color output mode and a monochrome output mode.

9. A job processing method according to claim 7, wherein the predetermined unit includes plural paper feeding units of respectively feeding different-sized recording media and a post-processing unit of executing a predetermined post-process to the recording media.

10. A job processing method according to claim 1, wherein, in a case where the jobs of which the attributes of using one of plural units for a long period of time are similar are continuously output, it is judged that there is the certain bias in the similarity of the attributes of the print jobs.

11. A job processing method according to claim 1, wherein, in a case where the jobs of which the attributes of using one of plural output modes for a long period of time are similar are continuously output, it is judged that there is the certain bias in the similarity of the attributes of the print jobs.

12. A job processing method according to claim 1, wherein
an amount of consumption of each coloring agent to be developed is calculated by analyzing the print job, and
it is judged based on a calculated result that there is a certain bias in the amount of consumption of each coloring agent in a color output mode.

13. A job processing method according to claim 1, wherein it is judged that there is a bias in a use range of a predetermined unit based on a relative relationship between a transportation-direction width of the recording medium selected based on the attribute of the print job and a passing width of an effective fixing area of a heat fixing unit of executing a heat fixing process to the recording medium.

14. A job processing method according to claim 1, wherein
it is judged whether or not there is a bias in plural parameters of determining an output mode of the print job, and
output order of the respective print jobs is changed by setting priority order to the respective parameters, based on a result of the judgment of the bias.

15. A job processing method according to claim 1, wherein the image processing device can execute the printing process of the data of the job of the storage unit which stores data of plural jobs including at least any one of data of a job from an original reader and data of a job from an external device.

16. A job processing method according to claim 1, further comprising the step of causing a user interface unit to execute a list display concerning, from among the jobs stored in the storage unit, the job being a print target.

17. A job processing method according to claim 1, further comprising the step of causing a user interface unit to be able to select, from the first sequence and the second sequence, the sequence to be executed.

18. A job processing method according to claim 1, further comprising the step of:

causing a user interface unit to execute a list display concerning, from among the jobs stored in the storage unit, the job being a print target; and after causing the user interface unit to execute the list display, enabling from a user to receive through the user interface unit an indication to select either one of the first sequence and the second sequence.

19. An image processing device comprising:

a printer unit for executing a printing process of data of a job of a storage unit for storing data of plural jobs including at least one of a first job where a first processing condition was set, a second job where the first processing condition was set and a third job where a second processing condition different from the first processing condition was set; and a controller for causing said image processing device to finish the printing process of the third job after both the printing process of the first job and the printing process of the second job are executed, in a case where said image processing device is operated in a first sequence of the first sequence and a second sequence, and to cause said image processing device to start the printing process of the third job before at least the printing process of the second job is finished, in a case where said image processing device is operated in the second sequence of the first sequence and the second sequences;

said controller analyzes an attribute of each print job stored in the storage unit, and said controller adjusts an output schedule of each print job stored in the storage unit so that the print jobs respectively having similar attributes are not continuously printed; and wherein said adjusting by said controller includes:

said controller judges whether or not there is a certain bias in the similarity of the attributes of the print jobs, and said controller selects the second sequence in a case where it is judged that there is the certain bias in the similarity of the attributes of the print jobs, and selects the first sequence in a case where it is judged that there is no certain bias in the similarity of the attributes of the print jobs.

20. An image processing device according to claim 19, wherein said controller causes said image processing device to finish the printing process of the third job after both the printing process of the first job and the printing process of the second job are executed, in both the case where said image processing device is operated in the first sequence and a case where the data of the third job is stored in the storage unit after the data of the first job and the data of the second job were stored in the storage unit, and said controller causes said image processing device to start the printing process of the third job at least before the printing process of the second job is finished, in both the case where said image processing device is operated in the second sequence and the case where the data of the third job is stored in the storage unit after the data of the first job and the data of the second job were stored in the storage unit.

21. An image processing device according to claim 20, wherein said controller causes said image processing device to execute the printing process of the third job on the premise of causing said image processing device to execute the printing process of the second job after the first job, in the case where said image processing device is operated in the first sequence, and said controller causes said image processing device to start the printing process of the third job after executing the printing process of the first job and before starting the printing process of the second job, in the case where said image processing device is operated in the second sequence.

22. An image processing device according to claim 20, wherein the first job includes a job that color printing has been set as the first processing condition, the second job includes a job that the color printing has been set as the first processing condition, and the third job includes a job that monochrome printing has been set as the second processing condition.

23. An image processing device according to claim 20, wherein the first job includes a job that a predetermined paper process has been set as the first processing condition, the second job includes a job that the predetermined paper process has been set as the first processing condition, and the third job includes a job that the predetermined paper process is not set as the second processing condition.

24. An image processing device according to claim 19, wherein said controller can adjust the output schedule of each print job by selectively executing a first output sequence as the first sequence of outputting the print jobs in the order of storage in the storage unit and a second output sequence as the second sequence of outputting the print jobs in the order different from the order of storage in the storage unit.

25. An image processing device according to claim 19, wherein said controller executes at least either one of judgment as to a use condition in an output mode indicated by the attribute of the print job stored in the storage unit and judgment as to a use condition of a predetermined unit operating in case of outputting the print job is executed.

26. An image processing device according to claim 25, wherein the output mode includes any one of a color output mode and a monochrome output mode.

27. An image processing device according to claim 25, wherein the predetermined unit includes plural paper feeding units of respectively feeding different-sized recording media and a post-processing unit of executing a predetermined post-process to the recording media.

28. An image processing device according to claim 19, wherein, in a case where the jobs of which the attributes of using one of plural units for a long period of time are similar are continuously output, said controller judges that there is the certain bias in the similarity of the attributes of the print jobs.

29. An image processing device according to claim 19, wherein, in a case where the jobs of which the attributes of using one of plural output modes for a long period of time are similar are continuously output, said controller judges that there is the certain bias in the similarity of the attributes of the print jobs.

30. An image processing device according to claim 19, wherein said controller calculates an amount of consumption of each coloring agent to be developed, by analyzing the print job, and said controller judges based on a calculated result that there is a certain bias in the amount of consumption of each coloring agent in a color output mode.

31. An image processing device according to claim 19, wherein said controller judges that there is a bias in a use range of a predetermined unit based on a relative relationship between a transportation-direction width of the recording medium selected based on the attribute of the print job and a passing width of an effective fixing area of a heat fixing unit of executing a heat fixing process to the recording medium.

32. An image processing device according to claim 19, wherein
said controller judges whether or not there is a bias in plural parameters of determining an output mode of the print job, and
said controller changes output order of the respective print jobs by setting priority order to the respective parameters, based on a result of the judgment of the bias.

33. An image processing device according to claim 19, wherein said printer can execute the printing process of the data of the job of the storage unit which stores data of plural jobs including at least any one of data of a job from an original reader and data of a job from an external device.

34. An image processing device according to claim 19, wherein said controller causes a user interface unit to execute a list display concerning, from among the jobs stored in the storage unit, the job being a print target.

35. An image processing device according to claim 19, wherein said controller causes a user interface unit to be able to select, from the first sequence and the second sequence, the sequence to be executed.

36. An image processing device according to claim 19, wherein
said controller causes a user interface unit to execute a list display concerning, from among the jobs stored in the storage unit, the job being a print target, and
after causing the user interface unit to execute the list display, said controller enables from a user to receive through the user interface unit an indication to select either one of the first sequence and the second sequence.

37. An image forming system which includes an image processing device for executing a printing process of data of a job of a storage unit for storing data of plural jobs, wherein
said image forming system executes a job processing method comprising the steps of:
storing data of plural jobs on the storage unit,
wherein data includes at least one of a first job where a first processing condition was set, a second job where the first processing condition was set and a third job where a second processing condition different from the first processing condition was set;
causing the image processing device to analyze an attribute of each print job stored in the storage unit;
causing the image processing device to adjust an output schedule of each print job stored in the storage unit so that the print jobs respectively having similar attributes are not continuously printed;
said adjusting including:
judging whether or not there is a certain bias in the similarity of the attributes of the print jobs;
selecting the second sequence in a case where it is judged that there is the certain bias in the similarity of the attributes of the print jobs; and
selecting the first sequence in a case where it is judged that there is no certain bias in the similarity of the attributes of the print jobs;
causing the image processing device to finish the printing process of the third job after both the printing process of the first job and the printing process of the second job are executed, in a case where the image processing device is operated in a first sequence of the first sequence and a second sequence; and
causing the image processing device to start the printing process of the third job before at least the printing process of the second job is finished, in a case where the image processing device is operated in the second sequence of the first sequence and the second sequence.

38. A computer-readable storage medium which stores a program for executing a job processing method of a system which includes an image processing device for executing a printing process of data of a job of a storage unit for storing data of plural jobs, said job processing method comprising the steps of:
storing data of plural jobs on a storage unit,
wherein data includes at least one of a first job where a first processing condition was set, a second job where the first processing condition was set and a third job where a second processing condition different from the first processing condition was set;
causing an image processing device to analyze an attribute of each print job stored in the storage unit;
causing the image processing device to adjust an output schedule of each print job stored in the storage unit so that the print jobs respectively having similar attributes are not continuously printed;
said adjusting including:
judging whether or not there is a certain bias in the similarity of the attributes of the print jobs;
selecting the second sequence in a case where it is judged that there is the certain bias in the similarity of the attributes of the print jobs; and
selecting the first sequence in a case where it is judged that there is no certain bias in the similarity of the attributes of the print jobs;
causing the image processing device to finish the printing process of the third job after both the printing process of the first job and the printing process of the second job are executed, in a case where the image processing device is operated in a first sequence of the first sequence and a second sequence; and
causing the image processing device to start the printing process of the third job before at least the printing process of the second job is finished, in a case where the image processing device is operated in the second sequence of the first sequence and the second sequence.

* * * * *